(12) United States Patent
Norris

(10) Patent No.: US 12,254,271 B1
(45) Date of Patent: Mar. 18, 2025

(54) NATURAL LANGUAGE PROCESSING USING LANGUAGE NEUTRAL VERB EXPRESSION PATTERNS

(71) Applicant: Boardroom Venture Partners, LLC, Conifer, CO (US)

(72) Inventor: Victoria Lauren Norris, Conifer, CO (US)

(73) Assignee: Boardroom Venture Partners, LLC, Conifer, CO (US)

( * ) Notice: Subject to any disclaimer, the term of this patent is extended or adjusted under 35 U.S.C. 154(b) by 0 days.

(21) Appl. No.: 18/755,245

(22) Filed: Jun. 26, 2024

Related U.S. Application Data

(60) Provisional application No. 63/510,581, filed on Jun. 27, 2023.

(51) Int. Cl.
*G06F 40/289* (2020.01)
*G06F 40/253* (2020.01)
*G06F 40/58* (2020.01)

(52) U.S. Cl.
CPC .......... *G06F 40/289* (2020.01); *G06F 40/253* (2020.01); *G06F 40/58* (2020.01)

(58) Field of Classification Search
CPC .... G06F 40/289; G06F 16/3344; G06F 40/35; G06F 40/284; G06F 40/211; G06F 40/205; G06F 40/44; G06F 40/279; G06F 40/263; G06F 40/242; G06F 40/253; G06F 40/58; G06F 40/268; G06F 40/30; G06F 16/338; G06F 40/20; G06F 40/274; G06F 40/56; G06F 8/30; G06F 16/243; G06F 16/90332; G06F 16/90335; G06F 16/9038; G06F 40/295; G10L 15/1815; G10L 15/1822; G10L 15/19; G10L 2015/0633;
(Continued)

(56) References Cited

U.S. PATENT DOCUMENTS 11,675,790 B1 * 6/2023 Jami ..................... G06F 18/217
707/736
2010/0010800 A1 * 1/2010 Rehberg .................. G06F 40/30
704/10
(Continued)

FOREIGN PATENT DOCUMENTS

WO WO-2020055472 A1 * 3/2020 ........... G06F 17/274

OTHER PUBLICATIONS

Collins Spanish-English Dictionary, May 29, 2007, HarperCollins Publishers, https://www.amazon.com/Collins-Spanish-Dictionary-Language/dp/0061131024, 1 page.
(Continued)

*Primary Examiner* — Abdelali Serrou
(74) *Attorney, Agent, or Firm* — Baker Botts L.L.P.

(57) ABSTRACT

A method is provided for improved understanding of text or speech sequences utilizing language neutral verb expression patterns (LNVEP). The LNVEP system deconstructs the text or speech sequences to uncover the LNVEP, which includes one or more essential component categories with a certain verb to yield a universally understandable, appropriate verb expression. The LNVEP identifies the semantic meaning of the text or speech sequences. Each LNVEP corresponds to one of more LNVEP Model that identifies the syntax of the text or speech sequences.

4 Claims, 49 Drawing Sheets

(58) Field of Classification Search
CPC . G10L 2015/088; G10L 15/00; G10L 15/005; G10L 15/183
See application file for complete search history.

(56) References Cited

U.S. PATENT DOCUMENTS

| | | | | |
|---|---|---|---|---|
| 2012/0203540 | A1* | 8/2012 | Aue | G06F 40/58 704/8 |
| 2019/0373337 | A1* | 12/2019 | Martell | H04N 21/475 |
| 2020/0082017 | A1* | 3/2020 | Vann | G06F 40/268 |
| 2024/0095267 | A1* | 3/2024 | Tater | G06F 16/243 |

OTHER PUBLICATIONS

Oxford Spanish-English Dictionary, Oxford Languages, https://www.amazon.com/Oxford-Spanish-Dictionary-Dictionaries/dp/0199543402, downloaded on Jan. 15, 2025, 3 pages.
Larousse Spanish/English Unabridged Dictionary [Spanish], by Larousse and Larousse, Larousse Kingfisher Chambers, Apr. 1999, 2 pages. https://www.thriftbooks.com/w/english-spanish-dictionarygrand-diccionario-espanolingles_larousse/606135/item/7545013/?utm_source=google&utm_medium=cpc&utm_campaign-us_shopping_spanish_21644724687&utm_adgroup=&utm_term=&utm_content-711804649154&gad_source=1&gclid=Cj0KCQiAlp28BhCBARIsADP9HrNAnUbZvVKzelRxYtfQeaAx-a6c5UjwNlqfc6exxPTrKYGmScPRa30aAnBQEALw_wcB#idiq=7545013&edition=4682126.

\* cited by examiner

TO FIG. 4 CONT.-1

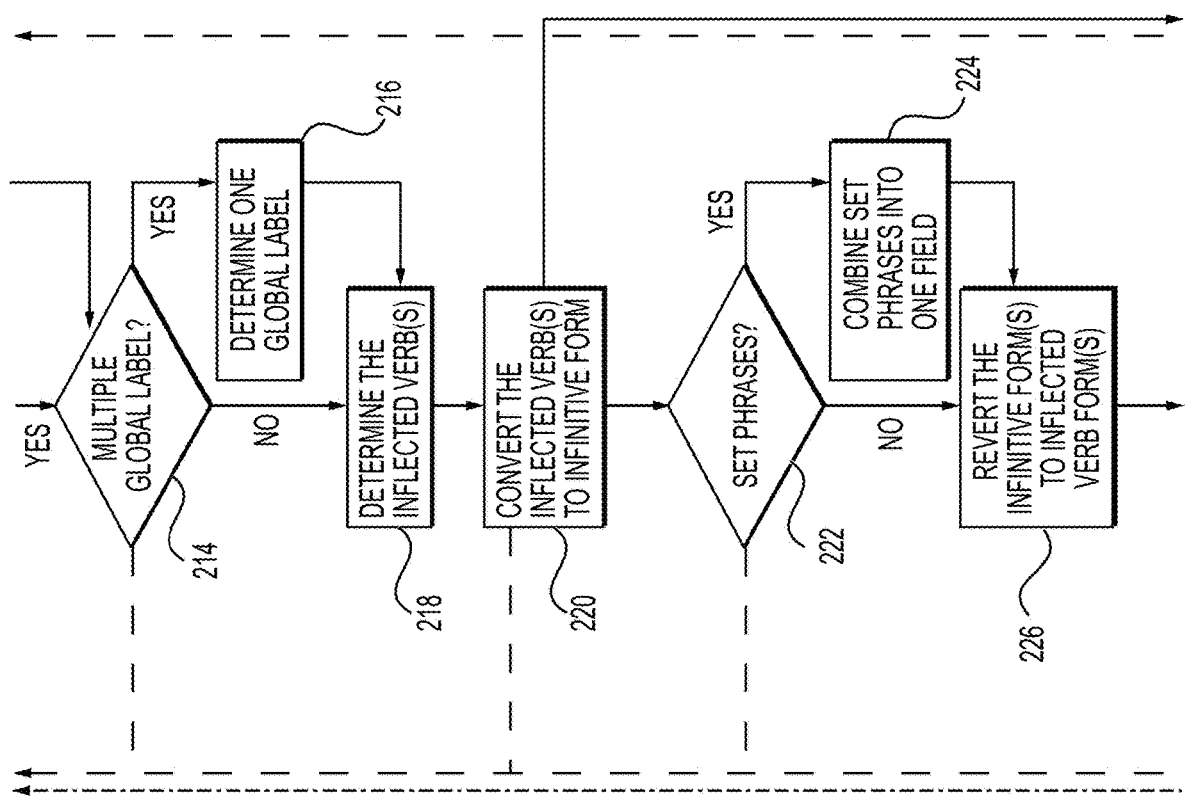

CONT. -5

PERMUTATIONS OF TOKENS FOR SET PHRASES

TOKEN 1   TOKEN 2   TOKEN 3   TOKEN 4   TOKEN 5   TOKEN 6   TOKEN 7
TOKEN 1   TOKEN 2   TOKEN 3   TOKEN 4   TOKEN 5   TOKEN 6
TOKEN 1   TOKEN 2   TOKEN 3   TOKEN 4   TOKEN 5
TOKEN 1   TOKEN 2   TOKEN 3   TOKEN 4
TOKEN 1   TOKEN 2   TOKEN 3
TOKEN 1   TOKEN 2
TOKEN 1
TOKEN 2   TOKEN 3   TOKEN 4   TOKEN 5   TOKEN 6   TOKEN 7
TOKEN 2   TOKEN 3   TOKEN 4   TOKEN 5   TOKEN 6
TOKEN 2   TOKEN 3   TOKEN 4   TOKEN 5
TOKEN 2   TOKEN 3   TOKEN 4
TOKEN 2   TOKEN 3
TOKEN 2
TOKEN 3   TOKEN 4   TOKEN 5   TOKEN 6   TOKEN 7
TOKEN 3   TOKEN 4   TOKEN 5   TOKEN 6
TOKEN 3   TOKEN 4   TOKEN 5
TOKEN 3   TOKEN 4
TOKEN 3
TOKEN 4   TOKEN 5   TOKEN 6   TOKEN 7
TOKEN 4   TOKEN 5   TOKEN 6
TOKEN 4   TOKEN 5
TOKEN 4
TOKEN 5   TOKEN 6   TOKEN 7
TOKEN 5   TOKEN 6
TOKEN 5
TOKEN 6   TOKEN 7
TOKEN 6
TOKEN 7

*FIG. 5*

EXAMPLE: A WORD REPLACES A FIELD WITHIN A GLOBAL LABEL SEQUENCE

| THE SPANISH WORD | LUNES | IS GLOBAL LABEL | NOUN DAY |
|---|---|---|---|
| | | GLOBAL LABEL SEQUENCE SPANISH | [ARTICLE DEFINITE+NOUN DAY] |
| | | THEREFORE: | [ARTICLE DEFINITE+LUNES] |
| THE ENGLISH WORD | MY | IS GLOBAL LABEL | ADJECTIVE POSSESSIVE LONG FORM |
| | | GLOBAL LABEL SEQUENCE ENGLISH | [ADJECTIVE POSSESSIVE LONG FORM + NOUN CONCRETE SINGULAR] |
| | | THEREFORE: | [MY + NOUN CONCRETE SINGULAR] |
| | | WHICH HAS AN EQUIVALENT GLOBAL LABEL SEQUENCE SPANISH | [ARTICLE DEFINITE + NOUN CONCRETE SINGULAR + ADJECTIVE POSSESSIVE LONG FORM] |
| | | THEREFORE, "MY + NOUN CONCRETE SINGULAR" IS EQUIVALENT TO: | [ARTICLE DEFINITE + NOUN CONCRETE SINGULAR + MÍO] |

SAMPLE LIST OF GLOBAL LABELS

| ADJECTIVE COLOR | PRONOUN AFTER PREPOSITION REFLEXIVE | NOUN ABSTRACT | ADVERB EMPHASIS |
|---|---|---|---|

| Adjective/Article | Pronoun | Noun | Adverb |
|---|---|---|---|
| ADJECTIVE COMPARATIVE | PRONOUN AFTER PREPOSITION | NOUN BODY | ADVERB INDEFINITE |
| ADJECTIVE DEMONSTRATIVE | PRONOUN DEMONSTRATIVE | NOUN CLOTHING | ADVERB LINK |
| ADJECTIVE DESCRIBING | PRONOUN INDEFINITE EL DE | NOUN COLOR | ADVERB LY |
| ADJECTIVE EXPECTED | PRONOUN NOMINALIZER | NOUN CONCRETE PLURAL | ADVERB MANNER |
| ADJECTIVE INDEFINITE | PRONOUN OBJECT CONJUNCTIVE | NOUN CONCRETE SINGULAR | ADVERB MANNER STYLE |
| ADJECTIVE NUMBER | PRONOUN PASSIVE SE | NOUN COUNTRY | ADVERB MANNER WAY |
| ADJECTIVE POSSESSIVE LONG FORM | PRONOUN POSSESSIVE | NOUN DAY | ADVERB NEGATION |
| ADJECTIVE POSSESSIVE SHORT FORM | PRONOUN RELATIVE | NOUN DIRECTION | ADVERB PLACE |
| ADJECTIVE POSSESSIVE WITH EMPHASIS | PRONOUN RELATIVE PERSON | NOUN HOME | ADVERB QUANTITY |
| ADJECTIVE QUANTITY | PRONOUN RELATIVE SEPARATED FROM ANTECEDENT | NOUN MASS PLURAL | ADVERB RELATES TO WHOLE STATEMENT |
| QUANTIFIER OF NOT COUNTABLE NOUN | PRONOUN RELATIVE USED AFTER PREPOSITION | NOUN MASS | ADVERB SPEED |
| | PRONOUN SUBJECT | NOUN MONTH | ADVERB TIME |
| | PRONOUN SUBJECT REFLEXIVE | NOUN MOTION | ADVERB AFFIRMATION |
| ARTICLE DEFINITE | PRONUN INDEFINITE | NOUN NUMBER | ADVERB COMPARATIVE |

FROM FIG. 6

TO FIG. 6 CONT. -2

FROM FIG. 6 CONT.-1

- ARTICLE INDEFINITE
- RECIPROCAL PHRASE
- REFLEXIVE PHRASE
- EXCLAMATION HEAD
- QUESTION WORD PLACE
- QUESTION WORD WHO
- QUESTION WORD HOW
- QUESTION WORD WHY
- QUESTION WORD WHAT
- QUESTION WORD WHERE
- QUESTION WORD HOW MUCH
- QUESTION WORD WHEN
- CONJUNCTION
- CONJUNCTION SUBORDINATING WITH FOLLOWING INFINITIVE
- CONJUNCTION SUBORDINATING WITH FOLLOWING SUBJUNCTIVE
- PRONOUN INDEFINITE NEGATIVE
- DIRECT OBJECT MARKER
- PREPOSITION INDIRECT OBJECT A
- PREPOSITION
- PREPOSITIONAL PHRASE
- PREPOSITION
- PREPOSITIONAL PHRASE RECIPROCAL
- PREPOSITION WITH SUBJECT PRONOUN
- INTERJECTION
- TAG
- EXPRESSION
- NOUN PLACE
- NOUN PROFESSION
- NOUN QUANTITY
- NOUN SEASON
- NOUN SYMMETRICAL
- NOUN TIME
- NOUN TITLE
- PROPER NAME
- COMMAND
- COMMAND TÚ AFFIRMATIVE
- COMMAND TÚ NEGATIVE
- COMMAND USTED
- COMMAND NOSOTROS
- COMMAND VOSOTROS
- COMMAND WITH CONJUNCTIVE PRONOUN
- ADVERB DOUBT
- VERB INDICATIVE
- VERB SUBJUNCTIVE
- GERUND
- GERUND CONJUNCTIVE PRONOUN
- INFINITIVE
- INFINITIVE PRONOM
- PAST PARTICIPLE ACTION
- PAST PARTICIPLE POSITION

*FIG. 6 CONT. -2*

DETERMINATION OF THE ONE VALID GLOBAL LABEL FOR A WORD WITH MORE THAN ONE GLOBAL LABEL

SAMPLE INPUT    LA COMES                                        COMES           VERB INDICATIVE

LA

POSSIBLE GLOBAL LABELS    PRONOUN OBJECT CONJUNCTIVE

ARTICLE DEFINITE

TO DETERMINE WHICH GLOBAL LABEL TO APPLY TO LA, THE GLOBAL LABEL SEQUENCE SPANISH IS REQUIRED TO BE:

[PRONOUN OBJECT CONJUNCTIVE +          [ARTICLE DEFINITE + NOUN CONCRETE SINGULAR]
                VERB INDICATIVE]

THEREFORE:      SINCE, "COMES" IS A "VERB INDICATIVE",
                LA CAN ONLY BE THE GLOBAL LABEL
                PRONOUN OBJECT CONJUNCTIVE

*FIG. 7*

PERMUTATIONS OF GLOBAL LABEL SEQUENCES

EXAMPLE GLOBAL LABEL POSSIBILITIES:

| TOKEN 1 | TOKEN 2 | TOKEN 3 | TOKEN 4 | TOKEN 5 | TOKEN 6 |
|---|---|---|---|---|---|
| GLOBAL LABEL 1 | GLOBAL LABEL 1 | GLOBAL LABEL 1 | GLOBAL LABEL 1 | GLOBAL LABEL 1 | GLOBAL LABEL 1 |
| GLOBAL LABEL 2 | GLOBAL LABEL 2 | GLOBAL LABEL 2 | GLOBAL LABEL 2 | GLOBAL LABEL 2 | GLOBAL LABEL 2 |
|  | GLOBAL LABEL 3 |  | GLOBAL LABEL 3 |  |  |
|  |  |  | GLOBAL LABEL 4 |  |  |

TOKEN 1 PREMUTATIONS

|  | TOKEN 1 | TOKEN 2 |
|---|---|---|
| EXAMPLE GLOBAL LABEL POSSIBILITIES: | GLOBAL LABEL 1 | GLOBAL LABEL 1 |
|  | GLOBAL LABEL 2 | GLOBAL LABEL 2 |
|  |  | GLOBAL LABEL 3 |

| ARRAY OF PERMUTATIONS: | GLOBAL LABEL 1 | GLOBAL LABEL 1 |
|---|---|---|
|  | GLOBAL LABEL 1 | GLOBAL LABEL 2 |
|  | GLOBAL LABEL 1 | GLOBAL LABEL 3 |
|  | GLOBAL LABEL 2 | GLOBAL LABEL 1 |
|  | GLOBAL LABEL 2 | GLOBAL LABEL 2 |
|  | GLOBAL LABEL 2 | GLOBAL LABEL 3 |

TOKEN 2 PREMUTATIONS

|  | TOKEN 1 | TOKEN 2 | TOKEN 3 |
|---|---|---|---|
|  | GLOBAL LABEL 1 | GLOBAL LABEL 1 | GLOBAL LABEL 1 |
|  | GLOBAL LABEL 2 | GLOBAL LABEL 2 | GLOBAL LABEL 2 |
|  |  | GLOBAL LABEL 3 | GLOBAL LABEL 3 |
|  |  |  | GLOBAL LABEL 4 |

FROM FIG. 8

| ARRAY OF PERMUTATIONS: | GLOBAL LABEL 1 | GLOBAL LABEL 1 | GLOBAL LABEL 1 |
|---|---|---|---|
| | GLOBAL LABEL 1 | GLOBAL LABEL 1 | GLOBAL LABEL 2 |
| | GLOBAL LABEL 1 | GLOBAL LABEL 1 | GLOBAL LABEL 3 |
| | GLOBAL LABEL 1 | GLOBAL LABEL 1 | GLOBAL LABEL 4 |
| | GLOBAL LABEL 2 | GLOBAL LABEL 1 | GLOBAL LABEL 1 |
| | GLOBAL LABEL 2 | GLOBAL LABEL 1 | GLOBAL LABEL 2 |
| | GLOBAL LABEL 2 | GLOBAL LABEL 1 | GLOBAL LABEL 3 |
| | GLOBAL LABEL 2 | GLOBAL LABEL 1 | GLOBAL LABEL 4 |
| | GLOBAL LABEL 1 | GLOBAL LABEL 2 | GLOBAL LABEL 1 |
| | GLOBAL LABEL 1 | GLOBAL LABEL 2 | GLOBAL LABEL 2 |
| | GLOBAL LABEL 1 | GLOBAL LABEL 2 | GLOBAL LABEL 3 |
| | GLOBAL LABEL 1 | GLOBAL LABEL 2 | GLOBAL LABEL 4 |
| | GLOBAL LABEL 2 | GLOBAL LABEL 2 | GLOBAL LABEL 1 |
| | GLOBAL LABEL 2 | GLOBAL LABEL 3 | GLOBAL LABEL 2 |
| | GLOBAL LABEL 2 | GLOBAL LABEL 2 | GLOBAL LABEL 3 |
| | GLOBAL LABEL 2 | GLOBAL LABEL 2 | GLOBAL LABEL 4 |
| | GLOBAL LABEL 1 | GLOBAL LABEL 3 | GLOBAL LABEL 1 |
| | GLOBAL LABEL 1 | GLOBAL LABEL 3 | GLOBAL LABEL 2 |
| | GLOBAL LABEL 1 | GLOBAL LABEL 3 | GLOBAL LABEL 3 |
| | GLOBAL LABEL 1 | GLOBAL LABEL 3 | GLOBAL LABEL 4 |
| | GLOBAL LABEL 2 | GLOBAL LABEL 3 | GLOBAL LABEL 1 |
| | GLOBAL LABEL 2 | GLOBAL LABEL 3 | GLOBAL LABEL 2 |
| | GLOBAL LABEL 2 | GLOBAL LABEL 3 | GLOBAL LABEL 3 |
| | GLOBAL LABEL 2 | GLOBAL LABEL 3 | GLOBAL LABEL 4 |

*FIG. 8*
CONT. -1

PERMUTATIONS OF GLOBAL LABEL SEQUENCES FOR PHRASE PATTERNS

| TOKEN 1 | TOKEN 2 | TOKEN 3 | TOKEN 4 | TOKEN 5 | TOKEN 6 |
|---|---|---|---|---|---|
| GLOBAL LABEL 1 | GLOBAL LABEL 2 | GLOBAL LABEL 3 | GLOBAL LABEL 4 | GLOBAL LABEL 5 | GLOBAL LABEL 6 |
| GLOBAL LABEL 1 | GLOBAL LABEL 2 | GLOBAL LABEL 3 | GLOBAL LABEL 4 | GLOBAL LABEL 5 | |
| GLOBAL LABEL 1 | GLOBAL LABEL 2 | GLOBAL LABEL 3 | GLOBAL LABEL 4 | | |
| GLOBAL LABEL 1 | GLOBAL LABEL 2 | GLOBAL LABEL 3 | | | |
| GLOBAL LABEL 1 | GLOBAL LABEL 2 | | | | |
| GLOBAL LABEL 1 | | | | | |
| GLOBAL LABEL 2 | GLOBAL LABEL 3 | GLOBAL LABEL 4 | GLOBAL LABEL 5 | GLOBAL LABEL 6 | |
| GLOBAL LABEL 2 | GLOBAL LABEL 3 | GLOBAL LABEL 4 | GLOBAL LABEL 5 | | |
| GLOBAL LABEL 2 | GLOBAL LABEL 3 | GLOBAL LABEL 4 | | | |
| GLOBAL LABEL 2 | GLOBAL LABEL 3 | | | | |
| GLOBAL LABEL 2 | | | | | |
| GLOBAL LABEL 3 | GLOBAL LABEL 4 | GLOBAL LABEL 5 | GLOBAL LABEL 6 | | |
| GLOBAL LABEL 3 | GLOBAL LABEL 4 | GLOBAL LABEL 5 | | | |
| GLOBAL LABEL 3 | GLOBAL LABEL 4 | | | | |
| GLOBAL LABEL 3 | | | | | |
| GLOBAL LABEL 4 | GLOBAL LABEL 5 | GLOBAL LABEL 6 | | | |
| GLOBAL LABEL 4 | GLOBAL LABEL 5 | | | | |
| GLOBAL LABEL 4 | | | | | |
| GLOBAL LABEL 5 | GLOBAL LABEL 6 | | | | |
| GLOBAL LABEL 5 | | | | | |
| GLOBAL LABEL 6 | | | | | |

*FIG. 9*

| SPECIFICATIONS AND TOPICS: | ABSTRACT CONCEPT | | |
|---|---|---|---|
| | APPLIANCE | | |
| | APPLICATION (COMPUTER) | | |
| | ART | | |
| | ATTACK | | |
| | BODY | | |
| | BUSINESS | | |
| | CAN SWALLOW, CANNOT SWALLOW | | |
| | CASE, EVENT, THEORY, CONDITION, CAUSE | | |
| | CHECK | | |
| | CLOTHING | | |
| | CLUB | | |
| | COLOR | | |
| | CONTAINER | | |
| | COUPLE | | |
| | | NUMBER 1 | NUMBER 2 |
| | | PERSON 1 | PERSON 2 |
| | | PHYSICAL THING 1 | PHYSICAL THING 2 |
| | | ABSTRACT CONCEPT | ABSTRACT CONCEPT |
| | | APPLIANCE | APPLIANCE |
| | | APPLICATION (COMPUTER) | APPLICATION (COMPUTER) |
| | | ART | ART |
| | | ATTACK | ATTACK |
| | | BODY | BODY |
| | | BUSINESS | BUSINESS |
| | | CAN SWALLOW, CANNOT SWALLOW | CAN SWALLOW, CANNOT SWALLOW |
| | | CASE, EVENT, THEORY, CONDITION, CAUSE | CASE, EVENT, THEORY, CONDITION, CAUSE |
| | | CHECK | CHECK |
| | | CLOTHING | CLOTHING |
| | | CLUB | CLUB |
| | | COLOR | COLOR |
| | | CONTAINER | CONTAINER |
| | | COUPLE | COUPLE |

FROM FIG. 10

(From FIG. 10 CONT. -2 / To FIG. 10 CONT. -4)

| | | |
|---|---|---|
| GAME PIECE | GAME PIECE | GAME PIECE |
| GAS | GAS | GAS |
| GIFT | GIFT | GIFT |
| HARD PHYSICAL THING | HARD PHYSICAL THING | HARD PHYSICAL THING |
| SOFT PHYSICAL THING | SOFT PHYSICAL THING | SOFT PHYSICAL THING |
| HOLE | HOLE | HOLE |
| INVOICE | INVOICE | INVOICE |
| ISSUE | ISSUE | ISSUE |
| KITCHEN TOOL | KITCHEN TOOL | KITCHEN TOOL |
| LEISURE | LEISURE | LEISURE |
| LETTER | LETTER | LETTER |
| LETTER | LETTER | LETTER |
| LIGHT | LIGHT | LIGHT |
| LIQUID | LIQUID | LIQUID |
| LUCK | LUCK | LUCK |
| MACHINE | MACHINE | MACHINE |
| MAKE-UP | MAKE-UP | MAKE-UP |
| ALCOHOL | ALCOHOL | ALCOHOL |
| MEAL COURSE | MEAL COURSE | MEAL COURSE |
| DISEASE | DISEASE | DISEASE |
| MEDICINE | MEDICINE | MEDICINE |
| RECREATIONAL DRUG | RECREATIONAL DRUG | RECREATIONAL DRUG |

MEETING
METAL
MILITARY, ARMY, SOLDIER
MONEY
MOOD, CHARACTER
MOTOR
NATURAL DISASTER
OUTERWEAR
PAIN
PAINT MEDIUM
PAPER
PARTICLE
PAYMENT
PEN
PERMIT
PHYSICAL CHARACTERISTIC
PHYSICAL THING
PLACE
PLANS
PLANT
PLANT
POSITION
POSSESSION
PROFESSION
QUANTITY OF FOOD
QUANTITY, CATEGORY
RECEIPT, PRESCRIPTION

MEETING
METAL
MILITARY, ARMY, SOLDIER
MONEY
MOOD, CHARACTER
MOTOR
NATURAL DISASTER
OUTERWEAR
PAIN
PAINT MEDIUM
PAPER
PARTICLE
PAYMENT
PEN
PERMIT
PHYSICAL CHARACTERISTIC
PHYSICAL THING
PLACE
PLANS
PLANT
PLANT
POSITION
POSSESSION
PROFESSION
QUANTITY OF FOOD
QUANTITY, CATEGORY
RECEIPT, PRESCRIPTION

FROM FIG. 10 CONT. -3

MEETING
METAL
MILITARY, ARMY, SOLDIER
MONEY
MOOD, CHARACTER
MOTOR
NATURAL DISASTER
OUTERWEAR
PAIN
PAINT MEDIUM
PAPER
PARTICLE
PAYMENT
PEN
PERMIT
PHYSICAL CHARACTERISTIC
PHYSICAL THING
PLACE
PLANS
PLANT
PLANT
POSITION
POSSESSION
PROFESSION
QUANTITY OF FOOD
QUANTITY, CATEGORY
RECEIPT, PRESCRIPTION

RESTRICTION
ROAD
ROUTINE
RUMOR
SCHOOLWORK, CLASS
SHAPE
SHARP PHYSICAL THING
DULL PHYSICAL THING
SIGNAL
SLEEP
SOUND
SPORT
STAGE
STRENGTH
SUBSTANCE
DESTRUCTIVE SUBSTANCE
SURFACE
TANK
TEMPERATURE
TEMPTATION
THING YOU CAN READ
THING YOU LOOK THROUGH
TIME
TOOL
TRANSPORTATION
TRIP
COLOR TYPE

RESTRICTION
ROAD
ROUTINE
RUMOR
SCHOOLWORK, CLASS
SHAPE
SHARP PHYSICAL THING
DULL PHYSICAL THING
SIGNAL
SLEEP
SOUND
SPORT
STAGE
STRENGTH
SUBSTANCE
DESTRUCTIVE SUBSTANCE
SURFACE
TANK
TEMPERATURE
TEMPTATION
THING YOU CAN READ
THING YOU LOOK THROUGH
TIME
TOOL
TRANSPORTATION
TRIP
COLOR TYPE

FROM FIG. 10 CONT. -4

RESTRICTION
ROAD
ROUTINE
RUMOR
SCHOOLWORK, CLASS
SHAPE
SHARP PHYSICAL THING
DULL PHYSICAL THING
SIGNAL
SLEEP
SOUND
SPORT
STAGE
STRENGTH
SUBSTANCE
DESTRUCTIVE SUBSTANCE
SURFACE
TANK
TEMPERATURE
TEMPTATION
THING YOU CAN READ
THING YOU LOOK THROUGH
TIME
TOOL
TRANSPORTATION
TRIP
COLOR TYPE

FROM FIG. 10 CONT. -5

HOT OR COLD
FABRIC
ENTRANCE PAPER
PLACE TYPE
PLANT TYPE
SHAPE TYPE
TEMPERATURE

THING YOU READ
WEATHER
SEASON
WOOD
USE
VICE
WORK
WHEEL

HOT OR COLD
FABRIC
ENTRANCE PAPER
PLACE TYPE
PLANT TYPE
SHAPE TYPE
TEMPERATURE

THING YOU READ
WEATHER
SEASON
WOOD
USE
VICE
WORK
WHEEL

HOT OR COLD
FABRIC
ENTRANCE PAPER
PLACE TYPE
PLANT TYPE
SHAPE TYPE
TEMPERATURE

THING YOU READ
WEATHER
SEASON
WOOD
USE
VICE
WORK
WHEEL

GLOBAL LABELS

GERUND
INFINITIVE
PRONOUN POSSESSIVE
PRONOUN INDEFINITE
NEGATIVE
PRONOUN DEMONSTRATIVE

PRONOUN INDEFINITE EL DE
PRONOUN NOMINALIZER
PRONOUN PASSIVE SE

PRONOUN POSSESSIVE

ADJECTIVE
PAST PARTICPLE ACTION
PAST PARTICPLE POSITION
PRONOUN RELATIVE

PRONOUN AFTER PREPOSITION
REFLEXIVE
PRONOUN AFTER PREPOSITON
PRONOUN DEMONSTRATIVE
PRONOUN RELATIVE
SEPARATED FROM
ANTECEDENT
PRONOUN RELATIVE USED
AFTER PREPOSITION
INFINITIVE
INFINITIVE PRONOUM
GERUND CONJUNCTIVE
PRONOUN
GERUND
CONJUNCTION
CONJUNCTION SUBORDINATING
WITH FOLLOWING INFINITIVE
CONJUNCTION SUBORDINATING
WITH FOLLOWING
SUBJUNCTIVE

FROM
FIG. 10
CONT. -6

ADJECTIVE
PAST PARTICPLE ACTION
PAST PARTICPLE POSITION
PRONOUN RELATIVE

PRONOUN AFTER PREPOSITION
REFLEXIVE
PRONOUN AFTER PREPOSITON
PRONOUN DEMONSTRATIVE
PRONOUN RELATIVE
SEPARATED FROM
ANTECEDENT
PRONOUN RELATIVE USED
AFTER PREPOSITION
INFINITIVE
INFINITIVE PRONOUM
GERUND CONJUNCTIVE
PRONOUN
GERUND
CONJUNCTION
CONJUNCTION SUBORDINATING
WITH FOLLOWING INFINITIVE
CONJUNCTION SUBORDINATING
WITH FOLLOWING
SUBJUNCTIVE

FIG. 10
CONT. -7

PERMUTATIONS FOR LNVEP DETERMINATION

PERMUTATIONS:

MATCHED ESSENTIAL COMPONENT DATA ORG CATEGORY 1

MATCHED ESSENTIAL COMPONENT DATA ORG CATEGORY 1 + MATCHED ESSENTIAL COMPONENT DATA ORG CATEGORY 2

MATCHED ESSENTIAL COMPONENT DATA ORG CATEGORY 1 + MATCHED ESSENTIAL COMPONENT DATA ORG CATEGORY 2 + MATCHED ESSENTIAL COMPONENT DATA ORG CATEGORY 3

MATCHED ESSENTIAL COMPONENT DATA ORG CATEGORY 1 + MATCHED ESSENTIAL COMPONENT DATA ORG CATEGORY 3 + MATCHED ESSENTIAL COMPONENT DATA ORG CATEGORY 2

MATCHED ESSENTIAL COMPONENT DATA ORG CATEGORY 2 + MATCHED ESSENTIAL COMPONENT DATA ORG CATEGORY 3

MATCHED ESSENTIAL COMPONENT DATA ORG CATEGORY 2 + MATCHED ESSENTIAL COMPONENT DATA ORG CATEGORY 1 + MATCHED ESSENTIAL COMPONENT DATA ORG CATEGORY 3

MATCHED ESSENTIAL COMPONENT DATA ORG CATEGORY 2 + MATCHED ESSENTIAL COMPONENT DATA ORG CATEGORY 3 + MATCHED ESSENTIAL COMPONENT DATA ORG CATEGORY 1

MATCHED ESSENTIAL COMPONENT DATA ORG CATEGORY 3 + MATCHED ESSENTIAL COMPONENT DATA ORG CATEGORY 2 + MATCHED ESSENTIAL COMPONENT DATA ORG CATEGORY 1

FIG. 11

REQUEST FOR CLARIFYING INFORMATION
PLEASE CLARIFY BY MARKING THE APPROPRIATE OPTION THAT WILL CLARIFY THE INPUT.
CHECK VERB SELECTION: A MORE SPECIFIC VERB MAY BE APPROPRIATE TO CONVEY A NUANCED MEANING:

| | AMAR | QUERER | APRECIAR | TENER CARIÑO A | WRITE IN OTHER OPTION |
|---|---|---|---|---|---|
| A [PERSON] HAS AFFECTION FOR [LOVE] ANOTHER [PERSON]. LOVE CONVEYS DEEP AFFECTION, CARE, WARMTH, PROTECTIVENESS, ATTRACTION, AND ENDEARMENT TOWARDS SOMEONE OR SOMETHING. LOVE CAN REFER TO THE DEEP ROMANTIC OR PASSIONATE FEELINGS BETWEEN INDIVIDUALS, TO THE BOND BETWEEN FAMILY MEMBERS, TO THE DEEP FRIENDSHIP WITHOUT ROMANTIC UNDERTONES, OR TO A STRONG LIKING OR ENTHUSIASM FOR SOMETHING. | AMAR EXPRESSES THE ACTION "TO LOVE" WITH A FOCUS ON DEEP AFFECTION OR DEEP ROMANTIC LOVE • AMAR APPLIES TO A FAMILY MEMBER OR SPOUSE • AMAR IS A MORE FORMAL LOVE THAN QUERER • CAN SOUND AFFECTED | QUERER EXPRESSES THE ACTION TO LOVE' WITH A MORE GENERAL OR CASUAL [INFORMAL] SENSE THAN AMAR | APRECIAR EXPRESSES THE ACTION 'TO BE FOND OF AS IN 'TO LIKE' WITH A FOCUS ON THE FONDNESS, RESPECT, OR ADMIRATION FOR THE PERSON • DOES NOT CARRY THE FULL WEIGHT OF 'TO LOVE' • EQUIVALENT TO 'TENER CARIÑO A' • USED EARLY IN A RELATIONSHIP WHERE QUERER IS TOO INTENSE OR PREMATURE | TENER CARIÑO A TENER CARIÑO A EXPRESSES THE ACTION 'TO BE FOND OF AS IN 'TO LIKE' WITH A FOCUS ON THE FONDNESS, RESPECT, OR ADMIRATION FOR THE PERSON • DOES NOT CARRY THE FULL WEIGHT OF 'TO LOVE' • USED EARLY IN A RELATIONSHIP WHERE QUERER IS TOO INTENSE OR PREMATURE • EQUIVALENT TO 'APRECIAR' | |

FROM FIG. 12B

TO FIG. 12B CONT. -2

| CHECK COUNTRY OF USE OF PRONOUN OBJECT | TE SPAIN, CUBA, SANTO DOMINGO, PUERTO RICO, MEXICO, CENTRAL PERU (WHEN REPLACES VOS: ARGENTINA, PARAGUAY, COLUMBIA, PARTS OF ECUADOR, PARTS OF CHILE) | LO LATIN AMERICA AND SPAIN | LA LATIN AMERICA AND SPAIN |

*FIG. 12B*
CONT. -1

THERE ARE CONSTRUCTION INCONSISTENCIES. PLEASE CLARIFY BY MARKING THE APPROPRIATE OPTION THAT WILL CLARIFY THE INPUT.

| | | | |
|---|---|---|---|
| CHECK FORMALITY AND GENDER OF PRONOUN OBJECT | INFORMAL, SPOKEN AND WRITTEN FORMATS • TE IS THE CONJUNCTIVE OBJECT PRONOUN FORM OF TU AND VOS (A PERSONAL PRONOUN THAT REPLACE THE PROPER NAMES OF A MALE OR FEMALE PERSON THAT THE SPEAKER IS TALKING TO) • THE SPEAKER AND THE PERSON ARE 1) FAMILIAR WITH EACH OTHER, 2) APPROXIMATELY THE SAME AGE, OR 3) DO NOT HAVE ANY REASON TO BESTOW A LEVEL OF RESPECT | IN COUNTRIES THAT USE "TE," FORMAL WHEN REFERRRING TO A MALE PERSON IDENTIFIED AS USTED • IN COUNTRIES THAT DO NOT USE "TE", FORMAL IF SPEAKER AND MALE PERSON ARE NOT FAMILIAR WITH EACH OTHER OR ARE NOT APPROXIMATELY THE SAME AGE OR HAVE SOME REASON TO BESTOW A LEVEL OF RESPECT • IN COUNTRIES THAT DO NOT USE "TE", INFORMAL IF SPEAKER AND THE MALE PERSON ARE FAMILIAR WITH EACH OTHER OR ARE APPROXIMATELY THE SAME AGE OR HAVE NO REASON TO BESTOW A LEVEL OF RESPECT | IN COUNTRIES THAT USE "TE," FORMAL WHEN REFERRRING TO A FEMALE PERSON IDENTIFIED AS USTED • IN COUNTRIES THAT DO NOT USE "TE", FORMAL IF SPEAKER AND THE FEMALE PERSON ARE NOT FAMILIAR WITH EACH OTHER OR ARE NOT APPROXIMATELY THE SAME AGE OR HAVE SOME REASON TO BESTOW A LEVEL OF RESPECT • IN COUNTRIES THAT DO NOT USE "TE", INFORMAL IF SPEAKER AND THE FEMALE PERSON ARE FAMILIAR WITH EACH OTHER OR ARE APPROXIMATELY THE SAME AGE OR HAVE NO REASON TO BESTOW A LEVEL OF RESPECT |
| X | | | |

FROM FIG. 12B CONT.-1

*FIG. 12B CONT. -2*

WELL-FORMED SENTENCE DETECTION
YOU DID NOT ENTER A WELL-FORMED, GRAMMATICALLY CORRECT SENTENCE. RAMMARG MADE CORRECTIONS.

INITIAL INPUT                TI YO QUIERO
CORRECTION                   YO TE QUIERO

IDENTIFICATION AND CORRECTION OF GRAMMAR ERRORS

ERROR 1
TI IS THE PRONOUN AFTER PREPOSITION FORM WHEN TÚ IS THE OBJECT (DIRECT). IN OTHER WORDS, TI CAN ONLY BE USED AFTER A PREPOSITION.

CORRECTION 1
TE IS THE PRONOUN OBJECT FORM IS USED WHEN 1) TÚ IS THE OBJECT (DIRECT) OF THE TRANSITIVE VERB AND THE OBJECT (DIRECT) IS NOT EMPHASIZED, 2) TÚ IS THE OBJECT (INDIRECT) OF THE ANY SUBSET OF VERB AND THE OBJECT (INDIRECT) IS NOT EMPHASIZED, OR 3) TÚ IS THE PRONOUN (PRONOMINAL) TO EXPRESS A NUANCED MEANING OF THE VERB ACTION

ERROR 2
THE PRONOUN (SUBJECT) IS PLACED BEFORE ANY PRONOUNS (OBJECT)

CORRECTION 1
PRONOUN (SUBJECT) + PRONOUN (OBJECT) + VERB

*FIG. 12C*

| | FROM FIG. 12D |
|---|---|
| MATCHING ESSENTIAL COMPONENTS FOR INFINITIVE | PERSON 1     QUERER     PERSON 2 |
| LANGUAGE NEUTRAL VERB EXPRESSION PATTERN | [PERSON 1] [LOVE] [PERSON 2] |
| VERB TYPE OF LNVEP | TRANSITIVE VERB WITH OBJECT (DIRECT) OF PERSON WHERE [PERSON 2] IS A SPECIFIC PERSON REPRESENTED AS THE GLOBAL LABEL PRONOUN [SUBJECT] |
| DATA MAPPING FOR LNVEP BASE MODEL OF VERB TYPE | ECC 1 LNVEP 1     ECC 2 LNVEP 1     VERB TRANSITIVE LNVEP 1 |
| RECONSTRUCTION TO NEW TRANSFORMED SEQUENCE | YO     TE     QUIERO |
| SEMANTIC AND SYNTACTIC MEANING OF LNVEP | THE SUBJECT OF A [PERSON 1] HAS AFFECTION FOR [LOVES] THE DIRECT OBJECT OF [ANOTHER PERSON 2] |
| SEMANTIC AND SYNTACTIC MEANING OF INPUT | THE SUBJECT [YO] HAS AFFECTION FOR [LOVES] THE DIRECT OBJECT OF [TE] |
| TRANSLATION TO TARGET LANGUAGE ENGLISH | I LOVE YOU |
| SEMANTIC AND SYNTACTIC MEANING OF TRANSLATION | THE SUBJECT [I] HAS AFFECTION FOR [LOVES] THE DIRECT OBJECT OF [YOU] WITH NO EMPHASIS ON ANY GRAMMATICAL FUNCTION USAGE IN INFORMAL WRITTEN AND SPOKEN FORMATS ONLY |

*FIG. 12D CONT. -1*

TRANSLATION
SPANISH    YO TE QUIERO
ENGLISH    I LOVE YOU
MULTIPLE OPTIONS FOR GRAMMATICALLY CORRECT CONSTRUCTIONS, EACH WITH A NUANCED MEANING OF THE TRANSLATION

| MULTIPLE OPTION | FORMAT USAGE | COUNTRY OF USE | COMMON TONE USAGE | NUANCE OF MEANING |
|---|---|---|---|---|
| YO TE QUIERO | THE LNVEP IS RESERVED FOR INFORMAL FORMATS ONLY | SPAIN, CUBA, SANTO DOMINGO, PUERTO RICO, MEXICO, CENTRAL PERU (WHEN REPLACES VOS: ARGENTINA, PARAGUAY, COLUMBIA, PARTS OF ECUADOR, PARTS OF CHILE) | COMMON | CAREFUL: AFTER THE FIRST USE BY THE SPEAKER, REDUNDANT USE OF YO CAN THEN SOUND SOUND BOASTFUL, ARROGANT, COMPETUOUS, THREATENING, OR SURPRISING SINCE THE STRESS IS ON "I" |
| | | | | THE USE OF THE PRONOUN OBJECT (DIRECT) IS USED WHEN THE OBJECT (DIRECT) IS NOT EMPHASIZED |
| TE QUIERO | THE LNVEP IS RESERVED FOR INFORMAL FORMATS ONLY | SPAIN, CUBA, SANTO DOMINGO, PUERTO RICO, MEXICO, CENTRAL PERU (WHEN REPLACES VOS: ARGENTINA, PARAGUAY, COLUMBIA, PARTS OF ECUADOR, PARTS OF CHILE) | COMMON | THE USE OF THE PRONOUN OBJECT (DIRECT) IS USED WHEN THE OBJECT (DIRECT) IS NOT EMPHASIZED |

| | | | |
|---|---|---|---|
| TE QUIERO YO | THE LNVEP IS RESERVED FOR INFORMAL FORMATS ONLY | SPAIN, CUBA, SANTO DOMINGO, PUERTO RICO, MEXICO, CENTRAL PERU (WHEN REPLACES VOS: ARGENTINA, PARAGUAY, COLUMBIA, PARTS OF ECUADOR, PARTS OF CHILE) | COMMON HEAVY STRESS ON THE SUBJECT | THE USE OF THE PRONOUN OBJECT (DIRECT) IS USED WHEN THE OBJECT (DIRECT) IS NOT EMPHASIZED |
| YO TE QUIERO A TI | THE LNVEP IS RESERVED FOR INFORMAL FORMATS ONLY | SPAIN, CUBA, SANTO DOMINGO, PUERTO RICO, MEXICO, CENTRAL PERU (WHEN REPLACES VOS: ARGENTINA, PARAGUAY, COLUMBIA, PARTS OF ECUADOR, PARTS OF CHILE) | COMMON CAREFUL: AFTER THE FIRST USE BY THE SPEAKER, REDUNDANT USE OF YO CAN THEN SOUND BOASTFUL, ARROGANT, COMPETITUOUS, THREATENING, OR SURPRISING SINCE THE STRESS IS ON 'I' | THE USE OF THE [A + PRONOUN AFTER PREPOSITION] CONSTRUCTION IS USED WHEN THE OBJECT (DIRECT) IS EMPHASIZED • THE USE OF THE PRONOUN OBJECT (DIRECT) BEFORE THE VERB IS A REDUNDANT MARKER OF THE OBJECT (DIRECT) AND IS REQUIRED WHEN THE [A + PRONOUN AFTER PREPOSITION] IS USED (THE REDUNDANT MARKER NEITHER EMPHASIZES OR NOT EMPHASIZES THE OBJECT (DIRECT) |

*FIG. 12E*
CONT. -1

FROM FIG. 12E CONT. -1

TE QUIERO A TI | THE LNVEP IS RESERVED FOR INFORMAL FORMATS ONLY | SPAIN, CUBA, SANTO DOMINGO, PUERTO RICO, MEXICO, CENTRAL PERU (WHEN REPLACES VOS: ARGENTINA, PARAGUAY, COLUMBIA, PARTS OF ECUADOR, PARTS OF CHILE) | COMMON | THE USE OF THE [A + PRONOUN AFTER PREPOSITION] CONSTRUCTION IS USED WHEN THE OBJECT (DIRECT) IS EMPHASIZED • THE USE OF THE PRONOUN OBJECT (DIRECT) BEFORE THE VERB IS A REDUNDANT MARKER OF THE OBJECT (DIRECT) AND IS REQUIRED WHEN THE [A + PRONOUN AFTER PREPOSITION] IS USED (THE REDUNDANT MARKER NEITHER EMPHASIZES OR NOT EMPHASIZES THE OBJECT (DIRECT)

| | | | |
|---|---|---|---|
| TE QUIERO A TI YO | THE LNVEP IS RESERVED FOR INFORMAL FORMATS ONLY | SPAIN, CUBA, SANTO DOMINGO, PUERTO RICO, MEXICO, CENTRAL PERU (WHEN REPLACES VOS: ARGENTINA, PARAGUAY, COLUMBIA, PARTS OF ECUADOR, PARTS OF CHILE) | COMMON | HEAVY STRESS ON THE SUBJECT • THE SUBJECT IS SHIFTED TO AFTER THE VERB TO SPECIALLY EMPHASIZE THE SUBJECT • WORD ORDER IMPLIES A CONTRAST TO A DIFFERENT PERSON • THE USE OF THE [A + PRONOUN AFTER PREPOSITION] CONSTRUCTION IS USED WHEN THE OBJECT (DIRECT) IS EMPHASIZED • THE USE OF THE PRONOUN OBJECT (DIRECT) BEFORE THE VERB IS A REDUNDANT MARKER OF THE OBJECT (DIRECT) AND IS REQUIRED WHEN THE [A + PRONOUN AFTER PREPOSITION] IS USED (THE REDUNDANT MARKER NEITHER EMPHASIZES OR NOT EMPHASIZES THE OBJECT (DIRECT) |

FROM FIG. 12E CONT. -2

*FIG. 12E CONT. -3*

GRAMMAR EXPLANATION FOR SPECIFIC QUERY

YO TE QUIERO

WRITE IN SPECIFIC WORD OR PHRASE

| TE |

WHY IS PLACED THERE?
HOW IS FORMED?
IS REQUIRED?

ANSWER:
WHEN THE OBJECT (DIRECT) OF THE TRANSITIVE VERB IS A PERSON REPRESENTED BY A PRONOUN (SUBJECT), SPANISH DOES NOT ALLOW THE PRONOUN (SUBJECT) TO BE PLACED DIRECTLY BEFORE THE VERB • INSTEAD, WHEN THE OBJECT (DIRECT) IS NOT EMPHASIZED, SPANISH PLACES THE PRONOUN OBJECT (DIRECT) THAT IS EQUIVALENT TO THE PRONOUN (SUBJECT) BEFORE THE VERB OR WHEN THE OBJECT (DIRECT) IS EMPHASIZED, SPANISH PLACES THE "PERSONAL A" BETWEEN THE VERB AND THE PRONOUN AFTER PREPOSITION THAT IS EQUIVALENT TO THE PRONOUN (SUBJECT)

*FIG. 12F*

EXPLORE THE GRAMMAR RULES OF A UNIVERSAL VERB EXPRESSION PATTERN MODEL
YO TE QUIERO
I LOVE YOU

| | | | | |
|---|---|---|---|---|
| TRANSLATION | SPANISH | YO | TE | QUIERO |
| | ENGLISH | I | YOU | LOVE |
| GRAMMAR | VERB TYPE | TRANSITIVE VERB WITH DIRECT OBJECT OF A PERSON | | |
| | GRAMMATICAL FUNCTIONS | SUBJECT | OBJECT DIRECT | TRANSITIVE VERB |
| | | THE PERSON THAT DOES THE VERB ACTION IS PLACED BEFORE THE PRONOUN OBJECT (DIRECT) IN ORDER TO KEEP THE PRONOUN OBJECT (DIRECT) CLOSE TO THE TRANSITIVE VERB | WHEN THE OBJECT (DIRECT) OF A TRANSITIVE VERB IS A PERSON REPRESENTED BY A PRONOUN (SUBJECT), SPANISH DOES NOT ALLOW THE PRONOUN (SUBJECT) TO BE PLACED DIRECTLY AFTER THE VERB. INSTEAD, SPANISH PLACES THE EQUIVALENT PRONOUN IN THE OBJECT (DIRECT) FORM BEFORE THE TRANSITIVE VERB | THE VERB IS IN THE TRANSITIVE USE AND, THEREFORE, REQUIRES A SUBJECT AND AN OBJECT (DIRECT) |
| WORD ORDER MEANING | | INFORMATION PLACED AT THE HEAD IS TYPICALLY THE TOPIC (INFORMATION ALREADY KNOWN TO THE LISTENER AND REINFORCES WHAT THE SENTENCE IS ABOUT) • SINCE THE SUBJECT IS EXPECTED TO BE PLACED AT THE HEAD OF A SENTENCE, THE SUBJECT OF THE VERB MAY NOT BE THE TOPIC | THE USE OF THE PRONOUN OBJECT (DIRECT) BEFORE THE VERB IS A NEUTRAL CONSTRUCTION USED WHEN IDENTIFYING THE PERSON IS NOT REQUIRED FOR CLARITY, EMPHASIS, OR CONTRAST | WHILE SPANISH PLACES THE NEWEST INFORMATION AT THE END OF A SEQUENCE, SINCE THE SUBJECT AND PRONOUN OBJECT (DIRECT) ARE EXPECTED TO BE PLACED BEFORE THE VERB, THE TRANSITIVE VERB IS PLACED AT THE END OF THIS SEQUENCE IS NOT NECESSARILY THE NEWEST INFORMATION. |

TO FIG. 12GA CONT.-1 →

*FIG. 12G<sub>A</sub>*

| WORD MATCHING | THE SUBJECT DETERMINES THE ENDING OF THE INFLECTED VERB | THE PRONOUN OBJECT (DIRECT) MATCHES THE GENDER AND NUMBER OF THE OBJECT (DIRECT) | THE ENDING OF THE INFLECTED VERB MATCHES THE SUBJECT AND TENSE OF THE VERB EXPRESSION |
|---|---|---|---|
| WORD FORM | | THE PERSON REPRESENTED BY YO BECOMES ME • THE PEOPLE REPRESENTED BY NOSOTROS OR NOSOTRAS BECOME NOS • THE PERSON REPRESENTED BY TÚ BECOMES TE • THE PEOPLE REPRESENTED BY VOSOTROS OR VOSOTRAS BECOME OS • THE MALE PERSON REPRESENTED BY EL OR USTED BECOMES LO • THE PEOPLE (AT LEAST ONE OF WHICH IS MALE) REPRESENTED BY ELLOS OR USTEDES BECOME LOS • THE FEMALE PERSON REPRESENTED BY ELLA OR USTED BECOMES LA • THE PEOPLE (ALL FEMALE) REPRESENTED BY ELLAS OR USTEDES BECOME LAS | |

*FIG. 12G<sub>A</sub> CONT. -1*

GRAMMAR EXPLANATION FOR PHRASE PATTERN

TE

PRONOUN OBJECT

GRAMMAR: A PRONOUN OBJECT (DIRECT, INDIRECT, OR PRONOMINAL) CAN NEVER BE A STAND ALONE WORD • IT MUST BE PLACED EITHER BEFORE THE VERB (BUT AFTER THE SUBJECT) OR ATTACHED TO THE VERB (IN CERTAIN CIRCUMSTANCES)

THE PRONOUN REPLACES THE NAME OF THE NOUN TO AVOID REPEATING THE NAME OF THE NOUN

USAGE: TE IS THE PRONOUN OBJECT FORM IS USED WHEN 1) TÚ IS THE OBJECT (DIRECT) OF THE TRANSITIVE VERB AND THE OBJECT (DIRECT) IS NOT EMPHASIZED, 2) TÚ IS THE OBJECT (INDIRECT) OF THE ANY SUBSET OF VERB AND THE OBJECT (INDIRECT) IS NOT EMPHASIZED, OR 3) TÚ IS THE PRONOUN (PRONOMINAL) TO EXPRESS A NUANCED MEANING OF THE VERB ACTION

FORM OF WORD: IF THE PRONOUN OBJECT REPLACES THE NOUN OF THE OBJECT (DIRECT), THE PRONOUN OBJECT MATCHES THE GENDER AND NUMBER OF THE OBJECT (DIRECT) • IF THE PRONOUN OBJECT REPLACES THE NOUN OF THE OBJECT (INDIRECT), THE PRONOUN OBJECT MATCHES THE GENDER AND NUMBER OF THE OBJECT (INDIRECT) • IF THE PRONOUN OBJECT MODIFIES THE VERB ACTION, THE PRONOUN IS (PRONOMINAL) AND THE PRONOUN (PRONOMINAL) MATCHES THE GENDER AND NUMBER OF THE SUBJECT

FORMAT OF USE: INFORMAL, SPOKEN AND WRITTEN FORMATS • TE IS THE PRONOUN OBJECT FORM OF TÚ AND VOS (A PERSONAL PRONOUN THAT REPLACE THE PROPER NAMES OF A MALE OR FEMALE PERSON THAT THE SPEAKER IS TALKING TO) • THE SPEAKER AND THE PERSON ARE 1) FAMILIAR WITH EACH OTHER, 2) APPROXIMATELY THE SAME AGE, OR 3) DO NOT HAVE ANY REASON TO BESTOW A LEVEL OF RESPECT

*FIG. 12G<sub>B</sub>*

YOU
TRANSLATE TO SPANISH THE ENGLISH SENTENCE "TIME FLIES LIKE AN ARROW; FRUIT FLIES LIKE A BANANA"

CHATGPT
THE ENGLISH SENTENCE "TIME FLIES LIKE AN ARROW; FRUIT FLIES LIKE A BANANA" CAN BE TRANSLATED TO SPANISH AS:

"EL TIEMPO VUELA COMO UNA FLECHA; LAS MOSCAS DE LA FRUTA COMO UN PLÁTANO."

---

≡ GOOGLE TRANSLATE ⚙ ⋮⋮⋮ [SIGN IN]

[🖹ᴬ TEXT] [🖼 IMAGES] [🗎 DOCUMENTS] [🌐 WEBSITES]

DETECT LANGUAGE  ENGLISH  SPANISH  FRENCH  >    ⇅    SPANISH  ENGLISH  ARABIC  >

| TIME FLIES LIKE AN ARROW; FRUIT FLIES LIKE A BANANA  × | EL TIEMPO VUELA COMO UNA FLECHA; MOSCAS DE LA FRUTA COMO UN PLÁTANO |
| --- | --- |
| 51/5000 | |

CHATGPT 4 ⌄

(LA) YOU
WHAT IS THE MEANING OF "ME" IN 'YO ME COMO LAS MANAZANS'?

(❋) CHATGPT
IN THE SPANISH SENTENCE "YO ME COMO LAS MANZANAS." THE WORD "ME" IS A REFLEXIVE PRONOUN. IT'S USED HERE TO INDICATE THAT THE ACTION OF THE VERB IS PERFORMED BY AND AFFECTS THE SPEAKER. THE SENTENCE TRANSLATES TO "I EAT THE APPLES" IN ENGLISH, BUT THE USE OF "ME" EMPHASIZES THE ACTION BEING DONE BY THE SPEAKER, ALMOST IMPLYING "I MYSELF EAT THE APPLES" OR ADDING A SENSE OF COMPLETENESS TO THE ACTION. THIS USE OF REFLEXIVE PRONOUNS IS COMMON IN SPANISH TO HIGHLIGHT THE SUBJECT'S ROLE IN THE ACTION OR TO INDICATE ACTIONS THAT ARE DONE TO ONESELF.

(LA) YOU
WHAT IS THE MEANING OF 'ME' IN 'YO ME COMO LAS UÑAS'?

(❋) CHATGBT
IN THE SPANISH SENTENCE "YO ME COMO LAS UNAS," THE WORD "ME" FUNCTIONS SIMILARLY AS A REFLEXIVE PRONOUN, INDICATING THAT THE ACTION OF THE VERB AFFECTS THE SPEAKER. THE SENTENCE TRANSLATES TO "I BITE MY NAILS" IN ENGLISH. HERE, "ME" SHOWS THAT THE ACTION OF BITING (COMER, IN THIS CONTEXT MEANING TO BITE RATHER THAN TO EAT) IS DIRECTED AT THE SPEAKER'S OWN NAILS. THIS REFLEXIVE CONSTRUCTION IS COMMONLY USED IN SPANISH WHEN THE SUBJECT IS PERFORMING AN ACTION ON THEMSELVES.

*FIG. 13G*

 ANONYMOUS
IN THE SENTENCE "THE BALL BOUNCED INTO THE HOLE BECAUSE IT WAS SMALL", WHAT DOES "IT" REFER TO?

 CHATGPT
IN THE SENTENCE "THE BALL BOUNCED INTO THE HOLE BECAUSE IT WAS SMALL," THE PRONOUN "IT" REFERS TO THE NOUN THAT IS LOGICALLY CAPABLE OF FITTING THE DESCRIPTION PROVIDED BY THE CLAUSE "BECAUSE IT WAS SMALL." HERE, THE NATURAL INTERPRETATION IS THAT "IT" REFERS TO "THE HOLE," SUGGESTING THAT THE HOLE'S SMALL SIZE IS THE REASON THE BALL WAS ABLE TO BOUNCE INTO IT.

THIS INTERPRETATION IS BASED ON A COMMON UNDERSTANDING OF CAUSALITY AND THE PHYSICAL WORLD: A BALL CAN BOUNCE INTO A HOLE IF THE HOLE IS APPROPRIATELY SIZED TO ALLOW THE BALL TO ENTER OR FIT. IF "IT" WERE INTENDED TO REFER TO "THE BALL," THE EXPLANATION WOULD NOT MAKE AS MUCH LOGICAL SENSE IN THIS CONTEXT, AS THE SIZE OF THE BALL BEING SMALL IS NOT A TYPICAL OR DIRECT EXPLANATION FOR WHY IT WOULD BOUNCE INTO A HOLE.

HOWEVER, RESOLVING PRONOUN REFERENCE (ALSO KNOWN AS ANAPHORA RESOLUTION) IN SENTENCES CAN BE CHALLENGING, ESPECIALLY FOR AI AND NLP MODELS, BECAUSE IT REQUIRES UNDERSTANDING BEYOND JUST GRAMMATICAL RULES; IT INVOLVES SEMANTIC KNOWLEDGE, COMMON-SENSE REASONING, AND CONTEXTUAL INFORMATION. MODELS TRAINED ON LARGE DATASETS, INCLUDING THOSE EMPLOYING ADVANCED TECHNIQUES LIKE DEEP LEARNING AND ATTENTION MECHANISMS, STRIVE TO BETTER UNDERSTAND THESE NUANCES BY LEARNING FROM EXAMPLES THAT ENCAPSULATE A WIDE VARIETY OF LINGUISTIC PATTERNS AND REAL-WORLD KNOWLEDGE.

IN COMPUTATIONAL LINGUISTICS, ACCURATELY DETERMINING THE ANTECEDENT OF A PRONOUN LIKE "IT" IN SUCH SENTENCES IS A TASK THAT MAY INVOLVE:

- SYNTACTIC ANALYSLS; UNDERSTANDING THE GRAMMATICAL STRUCTURE OF THE SENTENCE.
- SEMANTIC ANALYSIS; UNDERSTANDING THE MEANING OF THE SENTENCE AND THE RELATIONSHIPS BETWEEN ITS COMPONENTS.
- PRAGMATIC ANALYSLS; USING COMMON-SENSE KNOWLEDGE AND CONTEXT TO INFER WHICH NOUN THE PRONOUN MOST LIKELY REFERS TO.

DESPITE ADVANCEMENTS IN NLP, SENTENCES THAT REQUIRE A HIGH LEVEL OF SEMANTIC AND PRAGMATIC UNDERSTANDING STILL POSE SIGNIFICANT CHALLENGES, AND MODELS MAY NOT ALWAYS CORRECTLY RESOLVE SUCH AMBIGUITIES WITHOUT ADDITIONAL CONTEXT OR DOMAIN-SPECIFIC TRAINING.

*FIG. 13H*

NATURAL LANGUAGE PROCESSING USING LANGUAGE NEUTRAL VERB EXPRESSION PATTERNS

PRIORITY

This application claims the benefit under 35 U.S.C. § 119 (e) of U.S. Provisional Patent Application No. 63/610,581, filed 27 Jun. 2023, which is incorporated herein by reference.

TECHNICAL FIELD

This disclosure relates generally to natural language processing systems, and more particularly, to language neutral verb expression pattern based natural language processing of text or speech sequences.

BACKGROUND

A natural language processing (NLP) system may generally include an artificial intelligence (AI) system that utilizes one or more machine-learning models to enable computers to understand and communicate with human language. However, existing NLP systems often suffer from inaccuracies in understanding text or speech sequences.

BRIEF DESCRIPTION OF THE DRAWINGS

To provide a more complete understanding of the presently disclosed invention and certain features and advantages thereof, reference is made to the following description taken in conjunction with the accompanying drawings, in which:

FIG. 5 illustrates the creation of permutations associated with tokens.

FIG. 6 illustrates a list of global labels.

FIG. 7 illustrates an example of global labels within phrase patterns.

FIG. 8 illustrates the creation of permutations associated with global label determination.

FIG. 9 illustrates the creation of permutations associated with global label sequences for determination of phrase patterns.

FIG. 11 illustrates the creation of permutations associated with LNVEP determination.

FIG. 12B illustrates the identification of and options for resolution of issues that arise regarding construction inconsistencies, ambiguities, grammatical construction and/or analysis.

FIG. 12C illustrates the identification of whether the input is a well-formed sentence, the subsequent reconstruction, and the identification and explanation of the corrections.

FIG. 12E illustrates the identification and display of the multiple options of LNVEP Models, with explanation of nuanced meaning.

FIG. 12F illustrates the capability to answer specific questions related to the input.

FIG. 12G illustrates the identification and explanation of all of the specific grammar rules associated with one of the multiple options.

FIG. 13A-13H illustrate existing technology performance on the described language based task.

DESCRIPTION OF EXAMPLE EMBODIMENTS

System Overview

Figure 1:
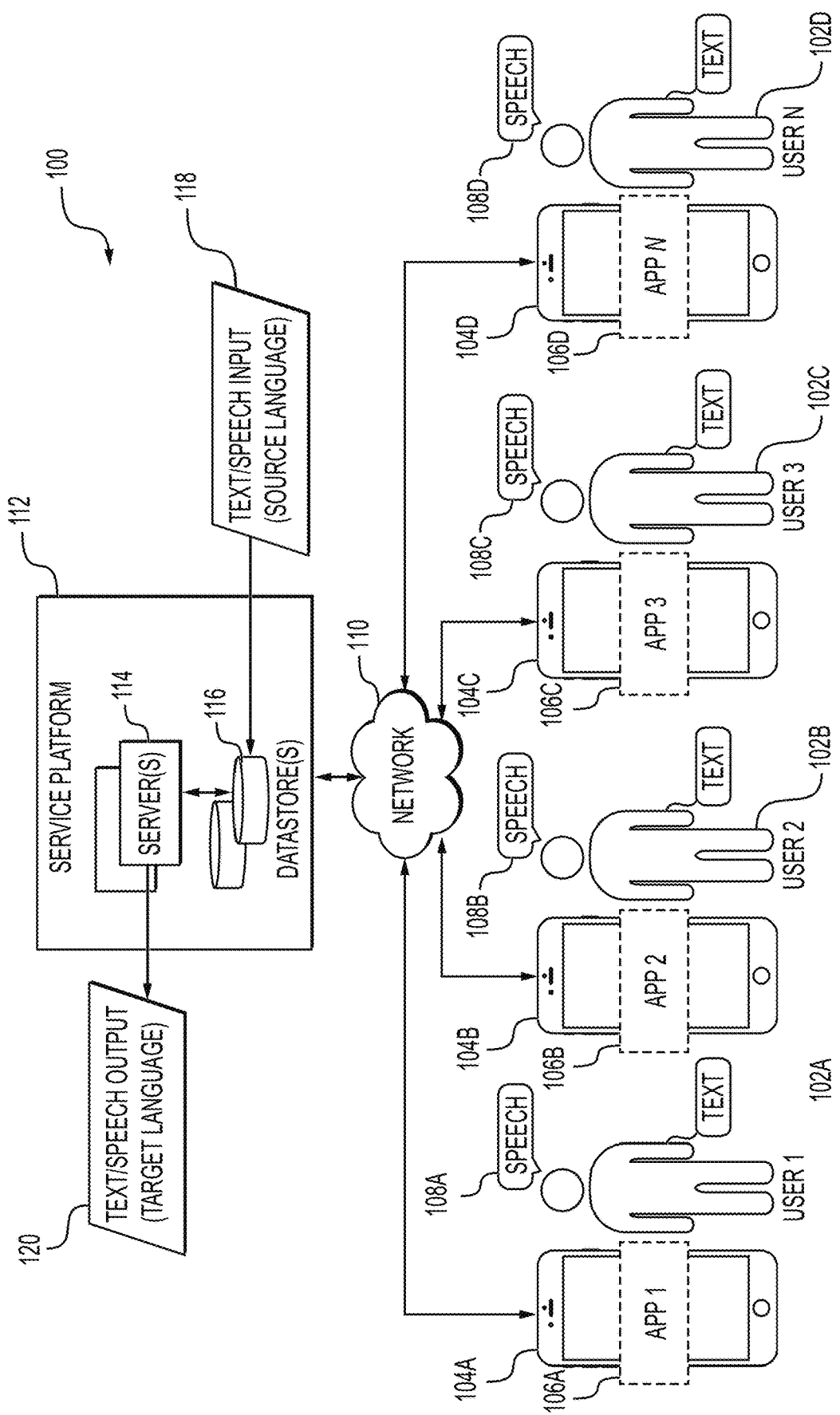
FIG. 1 illustrates an example network environment associated with a LNVEP system.

FIG. 1 illustrates an example embodiment of a service environment 100 that may be utilized in generating the language-based task based of translation of a text or speech sequence, using the one or more LNVEP determined within the text or speech sequence. As depicted, service environment 100 may include a number of users 102A, 102B, 102C, and 102D each associated with respective electronic devices 104A, 104B, 104C, and 104D that may be suitable for allowing the number of users 102A, 102B, 102C, and 102D to launch and engage respective applications 106A (e.g., "App 1"), 106B (e.g., "App 2"), 106C (e.g., "App 3"), and 106D (e.g., "App N").

In particular embodiments, as depicted by FIG. 1, the respective electronic devices 104A, 104B, 104C, and 104D may be coupled to a service platform 112 via one or more communication network(s) 110.

In particular embodiments, as depicted by FIG. 1, the service platform 112 may include, for example, a cloud-based computing architecture suitable for hosting and servicing the applications 106A (e.g., "App 1"), 106B (e.g., "App 2"), 106C (e.g., "App 3"), and 106D (e.g., "App N") executing on the respective electronic devices 104A, 104B, 104C, and 104D. For example, in one embodiment, the service platform 112 may include a Platform as a Service (PaaS) architecture, a Software as a Service (SaaS) architecture, an Infrastructure as a Service (IaaS) architecture, a Compute as a Service (CaaS) architecture, a Data as a Service (DaaS) architecture, a Database as a Service (DBaaS) architecture, or other similar cloud-based computing architecture (e.g., "X" as a Service (XaaS)).

In particular embodiments, as further depicted by FIG. 1, the service platform 112 may include one or more processing devices 114 (e.g., servers) and one or more data stores 116 (e.g., relational databases). For example, in some embodiments, the one or more processing devices 114 (e.g., servers) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), a deep learning processor (DLP), a tensor processing unit (TPU), a neuromorphic processing unit (NPU), or any other processing device(s) that may be suitable for processing various text data and/or speech data and making one or more decisions based thereon), software (e.g., instructions running/executing on one or more processors), firmware (e.g., microcode), or some combination thereof.

As depicted by FIG. 1, in one embodiment, service platform 112 may include one or more processing devices 114 (e.g., servers) and one or more data stores 116 (e.g., relational databases). For example, the one or more processing devices 114 (e.g., servers) may include one or more a general purpose processors, a graphic processing units (GPUs), application-specific integrated circuits (ASICs), systems-on-chip (SoCs), microcontrollers, field-programmable gate arrays (FPGAs), central processing units (CPUs), application processors (APs), visual processing units (VPUs), neural processing units (NPUs), neural decision processors (NDPs), deep learning processors (DLPs), tensor processing units (TPUs), neuromorphic processing units (NPUs), or any of various other processing device(s) or accelerators that may be suitable for providing processing and/or computing support for the applications 106A (e.g., "App 1"), 106B (e.g., "App 2"), 106C (e.g., "App 3"), and 106D (e.g., "App N"). Similarly, the data stores 116 may include one or more relational databases that may be utilized to store information.

As depicted by FIG. 1, in one embodiment, one or more of the number of users 102A, 102B, 102C, and 102D may input a text sequence or speech sequence 108A, 108B, 108C, 108D utilizing the applications 106A (e.g., "App 1"), 106B (e.g., "App 2"), 106C (e.g., "App 3"), and 106D (e.g., "App N") executing on the respective electronic devices 104A, 104B, 104C, and 104D. The one or more users may desire to translate or understand the grammatical construction of a text sequence or speech sequence (e.g., text strings, words, sentences, questions, commands, interjections, exclamations, partial or complete thoughts, clause, and so forth) from a source language (e.g., Spanish or other language) to a target language (e.g., English or other language), vice-versa, or to or from some combination of languages.

For example, in particular embodiments, the inputted text sequence or speech sequence 108A, 108B, 108C, 108D may include, for example, an input of a text sequence or speech sequence to be translated from a source language (e.g., Spanish or other language) to a target language (e.g., English or other language). In another embodiment, the inputted text sequence or speech sequence 108A, 108B, 108C, 108D may include an input of a text sequence or speech sequence including a mix of two or more languages (e.g., English and Spanish) to be translated unambiguously to a target language (e.g., English or other language). In another embodiment, one or more of the number of users 102A, 102B, 102C, and 102D may not input a text sequence or speech sequence themselves, and, instead, one or more of the number of users 102A, 102B, 102C, and 102D may desire to generate a translation of a displayed webpage, an e-book, an audio-book, an image, a video, physical book, or other physical document or electronic file that includes one or more written or verbal languages or can be interpreted into text. In another embodiment, an inputted data sequence may include a visual language sequence (e.g., sign language) or any data sequence in which one or more verbs are present or conveyed.

As depicted by FIG. 1, in one embodiment, upon one or more of the number of users 102A, 102B, 102C, and 102D completing the input of the text sequence or speech sequence 108A, 108B, 108C, 108D, one or more of the respective electronic devices 104A, 104B, 104C, and 104D may then transmit the text sequence or speech sequence input 118 to the translation service platform 112.

As depicted by FIG. 1, in one embodiment, the service platform 112 may be a hosting and servicing platform for the applications 106A (e.g., "App 1"), 106B (e.g., "App 2"), 106C (e.g., "App 3"), and 106D (e.g., "App N") executing on the respective electronic devices 104A, 104B, 104C, and 104D. For example, in the example embodiment, the applications 106A (e.g., "App 1"), 106B (e.g., "App 2"), 106C (e.g., "App 3"), and 106D (e.g., "App N") may each include, for example, translation mobile applications (e.g., mobile apps or web-based service applications) that may be utilized to allow the number of users 102A, 102B, 102C, and 102D to access real-time or near real-time language translation services remotely (e.g., from anywhere in the world).

As depicted by FIG. 1, in one embodiment, the one or more processing devices 114 (e.g., servers) may generate an output 120 of the translation, grammatical structure, and/or other information relating to the final input to one or more of the respective electronic devices 104A, 104B, 104C, and 104D.

In other embodiments, the one or more processing devices 114 (e.g., servers) may generate an output 120 that meets the needs of dependency parsers, well-formed sentence detection services, sentence autocorrection services, grammar and sentence ambiguity detection services, grammar and sentence ambiguity resolver services, cross-language pattern mapping services, textual translation services, audio translation services, audible translation services, visual translation services, language-learning services, tutor services, linguistics-learning services, and so forth.

Systems and Methods

Figure 2:
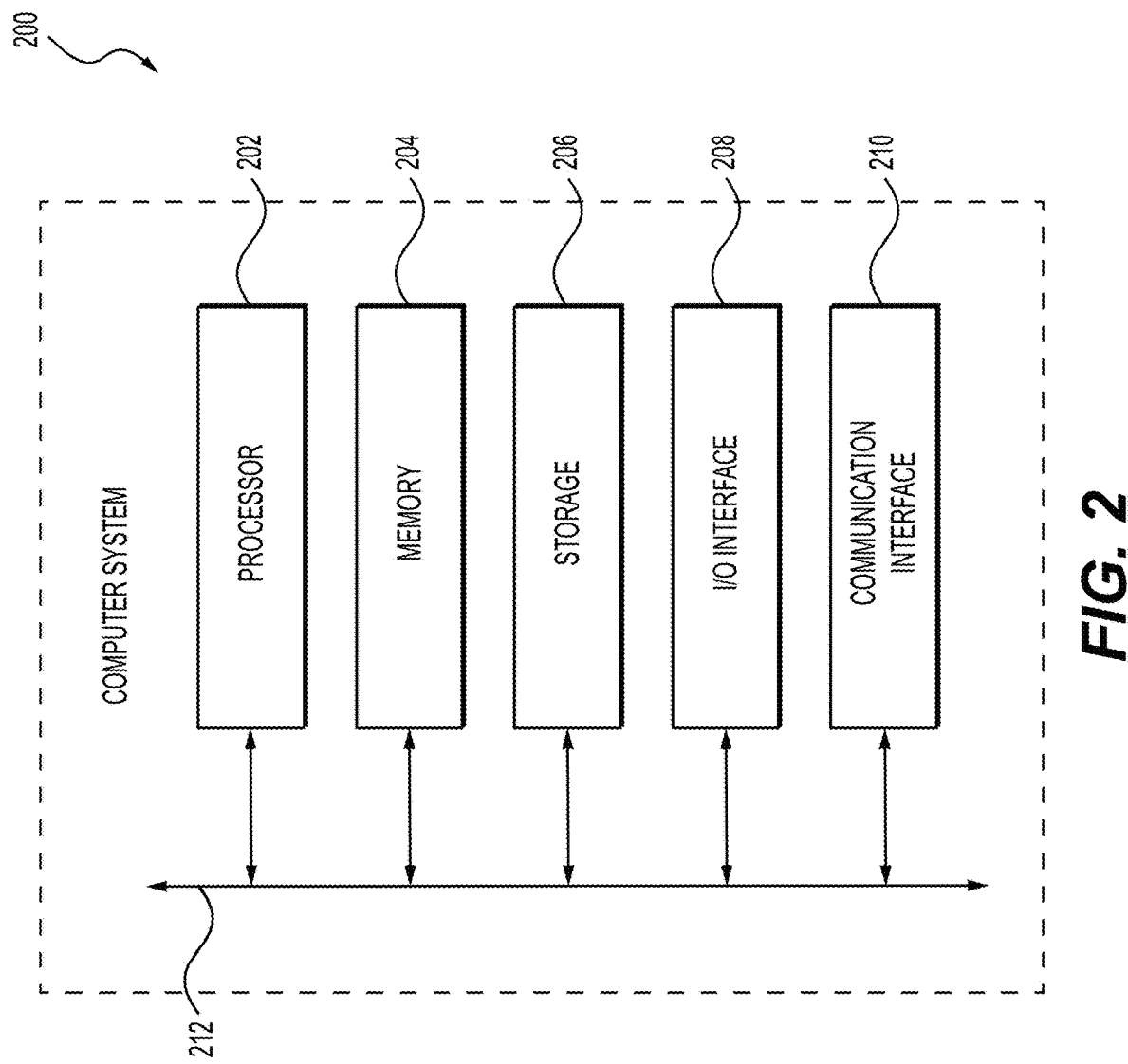
FIG. 2 illustrates an example computer system.

FIG. 2 illustrates an example computer system 200. In particular embodiments, one or more computer systems 200 perform one or more steps of one or more methods described or illustrated herein. In particular embodiments, one or more computer systems 200 provide functionality described or illustrated herein. In particular embodiments, software running on one or more computer systems 200 performs one or more steps of one or more methods described or illustrated herein or provides functionality described or illustrated herein. Particular embodiments include one or more portions of one or more computer systems 200. Herein, reference to a computer system may encompass a computing device, and vice versa, where appropriate. Moreover, reference to a computer system may encompass one or more computer systems, where appropriate.

This disclosure contemplates any suitable number of computer systems 200. This disclosure contemplates computer system 200 taking any suitable physical form. As example and not by way of limitation, computer system 200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a digital assistant (PDA), a server, a tablet computer system, an augmented/virtual reality device, or a combination of two or more of these. Where appropriate, computer system 200 may include one or more computer systems 200; be unitary or distributed; span multiple locations; span multiple machines; span multiple data centers; or reside in a cloud, which may include one or more cloud components in one or more networks. Where appropriate, one or more computer systems 200 may perform without substantial spatial or temporal limitation one or more steps of one or more methods described or illustrated herein.

As an example, and not by way of limitation, one or more computer systems 200 may perform in real time or in batch mode one or more steps of one or more methods described or illustrated herein. One or more computer systems 200 may perform at different times or at different locations one or more steps of one or more methods described or illustrated herein, where appropriate. In particular embodiments, computer system 200 includes a processor 202, memory 204, storage 206, an input/output (I/O) interface 208, a communication interface 210, and a bus 212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 202 includes hardware for executing instructions, such as those making up a computer program. As an example, and not by way of limitation, to execute instructions, processor 202 may retrieve (or fetch) the instructions from an internal register, an internal cache, memory 204, or storage 206; decode and execute them; and then write one or more results to an internal register, an internal cache, memory 204, or storage 206. In particular embodiments, processor 202 may include one or more internal caches for data, instructions, or addresses. This disclosure contemplates processor 202 including any suitable number of any suitable internal caches, where appropriate. As an example, and not by way of limitation, processor 202 may include one or more instruction caches, one or more data caches, and one or more translation lookaside buffers (TLBs). Instructions in the instruction caches may be copies of instructions in memory 204 or storage 206, and the instruction caches may speed up retrieval of those instructions by processor 202.

Data in the data caches may be copies of data in memory 204 or storage 206 for instructions executing at processor 202 to operate on; the results of previous instructions executed at processor 202 for access by subsequent instructions executing at processor 202 or for writing to memory 204 or storage 206; or other suitable data. The data caches may speed up read or write operations by processor 202. The TLBs may speed up virtual-address translation for processor 202. In particular embodiments, processor 202 may include one or more internal registers for data, instructions, or addresses. This disclosure contemplates processor 202 including any suitable number of any suitable internal registers, where appropriate. Where appropriate, processor 202 may include one or more arithmetic logic units (ALUs); be a multi-core processor; or include one or more processors 202. Although this disclosure describes and illustrates a particular processor, this disclosure contemplates any suitable processor.

In particular embodiments, memory 204 includes main memory for storing instructions for processor 202 to execute or data for processor 202 to operate on. As an example, and not by way of limitation, computer system 200 may load instructions from storage 206 or another source (such as, for example, another computer system 200) to memory 204. Processor 202 may then load the instructions from memory 204 to an internal register or internal cache. To execute the instructions, processor 202 may retrieve the instructions from the internal register or internal cache and decode them. During or after execution of the instructions, processor 202 may write one or more results (which may be intermediate or final results) to the internal register or internal cache. Processor 202 may then write one or more of those results to memory 204. In particular embodiments, processor 502 executes only instructions in one or more internal registers or internal caches or in memory 204 (as opposed to storage 206 or elsewhere) and operates only on data in one or more internal registers or internal caches or in memory 204 (as opposed to storage 206 or elsewhere).

One or more memory buses (which may each include an address bus and a data bus) may couple processor 202 to memory 204. Bus 212 may include one or more memory buses, as described below. In particular embodiments, one or more memory management units (MMUs) reside between processor 202 and memory 204 and facilitate accesses to memory 204 requested by processor 202. In particular embodiments, memory 204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 204 may include one or more memories 204, where appropriate. Although this disclosure describes and illustrates particular memory, this disclosure contemplates any suitable memory.

In particular embodiments, storage 206 includes mass storage for data or instructions. As an example, and not by way of limitation, storage 206 may include a hard disk drive (HDD), a floppy disk drive, flash memory, an optical disc, a magneto-optical disc, magnetic tape, or a Universal Serial Bus (USB) drive or a combination of two or more of these. Storage 206 may include removable or non-removable (or fixed) media, where appropriate. Storage 206 may be internal or external to computer system 200, where appropriate. In particular embodiments, storage 206 is non-volatile, solid-state memory. In particular embodiments, storage 206 includes read-only memory (ROM).

Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 206 taking any suitable physical form. Storage 206 may include one or more storage control units facilitating communication between processor 202 and storage 206, where appropriate. Where appropriate, storage 206 may include one or more storages 206. Although this disclosure describes and illustrates particular storage, this disclosure contemplates any suitable storage.

In particular embodiments, I/O interface 208 includes hardware, software, or both, providing one or more interfaces for communication between computer system 200 and one or more I/O devices. Computer system 200 may include one or more of these I/O devices, where appropriate. One or more of these I/O devices may enable communication between a user and computer system 200. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 208 for them. Where appropriate, I/O interface 208 may include one or more device or software drivers enabling processor 202 to drive one or more of these I/O devices. I/O interface 208 may include one or more I/O interfaces 208, where appropriate. Although this disclosure describes and illustrates a particular I/O interface, this disclosure contemplates any suitable I/O interface.

In particular embodiments, communication interface 210 includes hardware, software, or both providing one or more interfaces for communication (such as, for example, packet-based communication) between computer system 200 and one or more other computer systems 200 or one or more networks. As an example, and not by way of limitation, communication interface 210 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 210 for it.

As an example, and not by way of limitation, computer system 200 may communicate with an ad hoc network, an area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 200 may include any suitable communication interface 210 for any of these networks, where appropriate. Communication interface 210 may include one or more communication interfaces 210, where appropriate. Although this disclosure describes and illustrates a particular communication interface, this disclosure contemplates any suitable communication interface.

In particular embodiments, bus 212 includes hardware, software, or both coupling components of computer system 200 to each other. As an example, and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 212 may include one or more buses 212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

LNVEP System

The presently disclosed invention of the language neutral verb expression patterns improves Natural Language Processing (NLP) whereby understanding a text or speech sequence is based on the identification of one or more language neutral verb expression patterns within a text or speech sequence through analyzing and reducing each text or speech sequence into one or more language neutral verb expression patterns and then utilizing the language neutral verb expression patterns to 1) inform the referent of pronouns, prepositional phrases, and other grammatical constructions, 2) inform the meaning of words that have more than one meaning and/or grammatical function, and 3) inform the required words that must associate with a verb action to produce universally understandable (not nonsense) combinations of verb expressions and then utilizing the verb type associated with each of the language neutral verb expression patterns to 1) inform the construction of the grammatically correct reconstruction of the text or speech sequence, 2) inform allowable grammatical construction variations that convey nuanced meanings of the base grammatically correct reconstruction, 3) inform translation of the text or speech sequence to a target language, and 4) inform allowable construction variations of the target language that convey nuanced meanings of the base grammatically correct construction. Moreover, since the language neutral verb expression pattern directs the understanding of the input, the reconstructions autocorrect text or speech sequences that contain errors and omission such as misused words, incorrect placement of word orders within phrase patterns, incorrect placement of grammatical functions, incorrect gender and noun agreement, incorrect verb usage, incorrect verb form, omissions of grammatical functions, and/or omissions of words. Herein, "language neutral verb expression patterns" will be referred to as "LNVEP."

Figure 3:
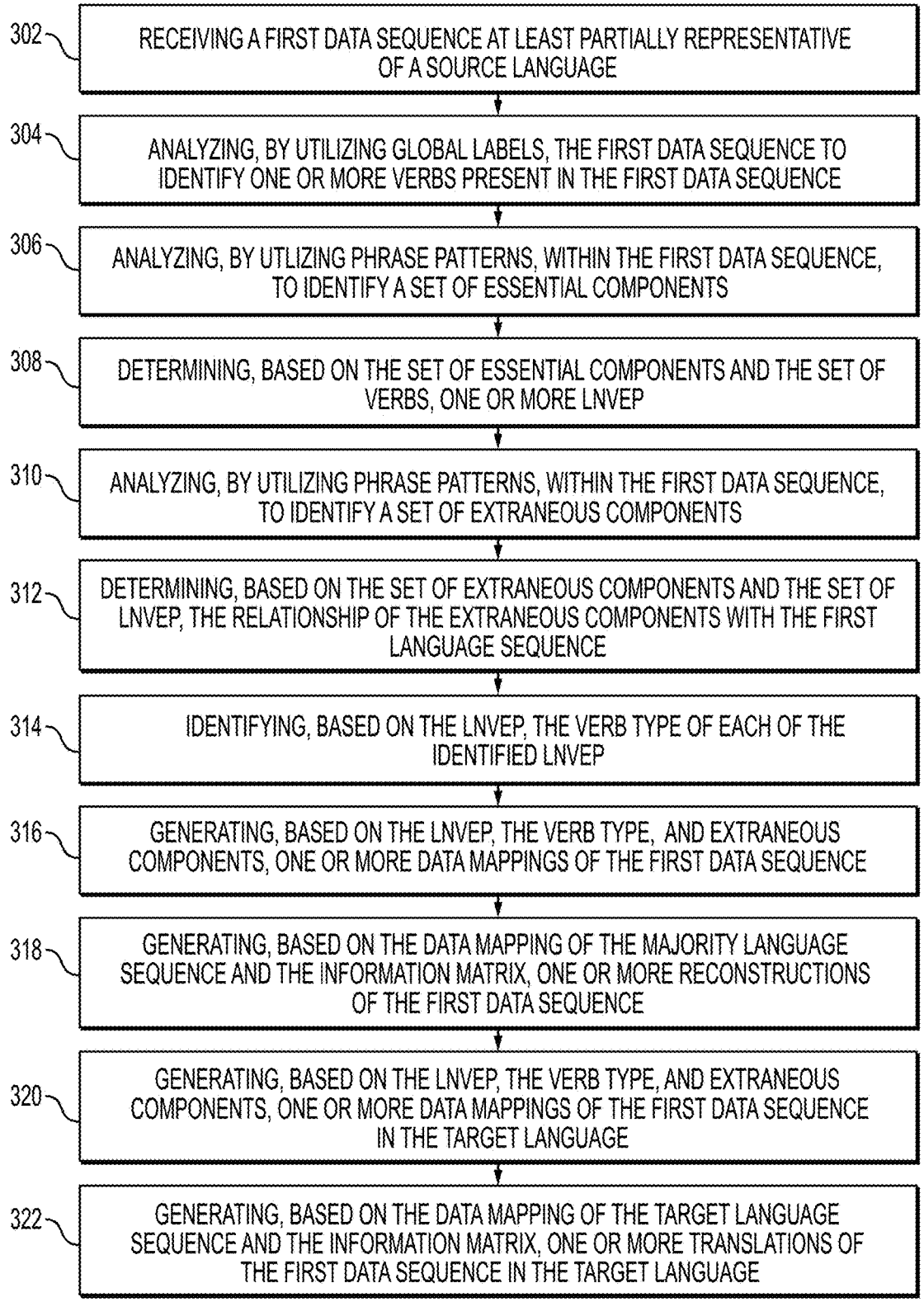
FIG. 3 illustrates an example method of using the LNVEP system.

FIG. 3 illustrates an example method for using the LNVEP system 160. At step 302, LNVEP system 160 receives an input of a first data sequence, at least partially representative of a source language, and a query for the performance of the language-based task of translation to a specified target language. At step 304, LNVEP system 160 analyzes the first data sequence, utilizing global labels, to identify the one or more stated verbs or verb phrases or an implied verb. At step 306, LNVEP system 160 analyzes the first data sequence, utilizing phrase phrases, to identify the one or more essential components within the first data sequence. At step 308, LNVEP system 160 determines, based on the set of verbs and the set of essential components, a valid LNVEP that associates each of the identified one or more verbs and the identified essential components.

At step 310, LNVEP system 160 analyzes the first data sequence, utilizing phrase patterns, to identify the extraneous components. At step 312, LNVEP system 160 determines the relationships of the extraneous components to the LNVEP. At step 314, LNVEP system 160 identifies the verb type of each identified LNVEP. At step 316, LNVEP system 160 generates, based on the LNVEP, verb type, and extraneous information, one or more data mappings of the first data sequence. At step 318, LNVEP system 160 generates, based on the data mappings and the information matrix, one or more reconstructions of the first data sequence. At step 320, LNVEP system 160 generates based on the LNVEP, verb type, and extraneous components, one or more data mappings of the first data sequence for the target language. At step 318, LNVEP system 160 generates, based on the data mappings of the target language and the information matrix, one or more translations of the first data sequence.

Figure 4:
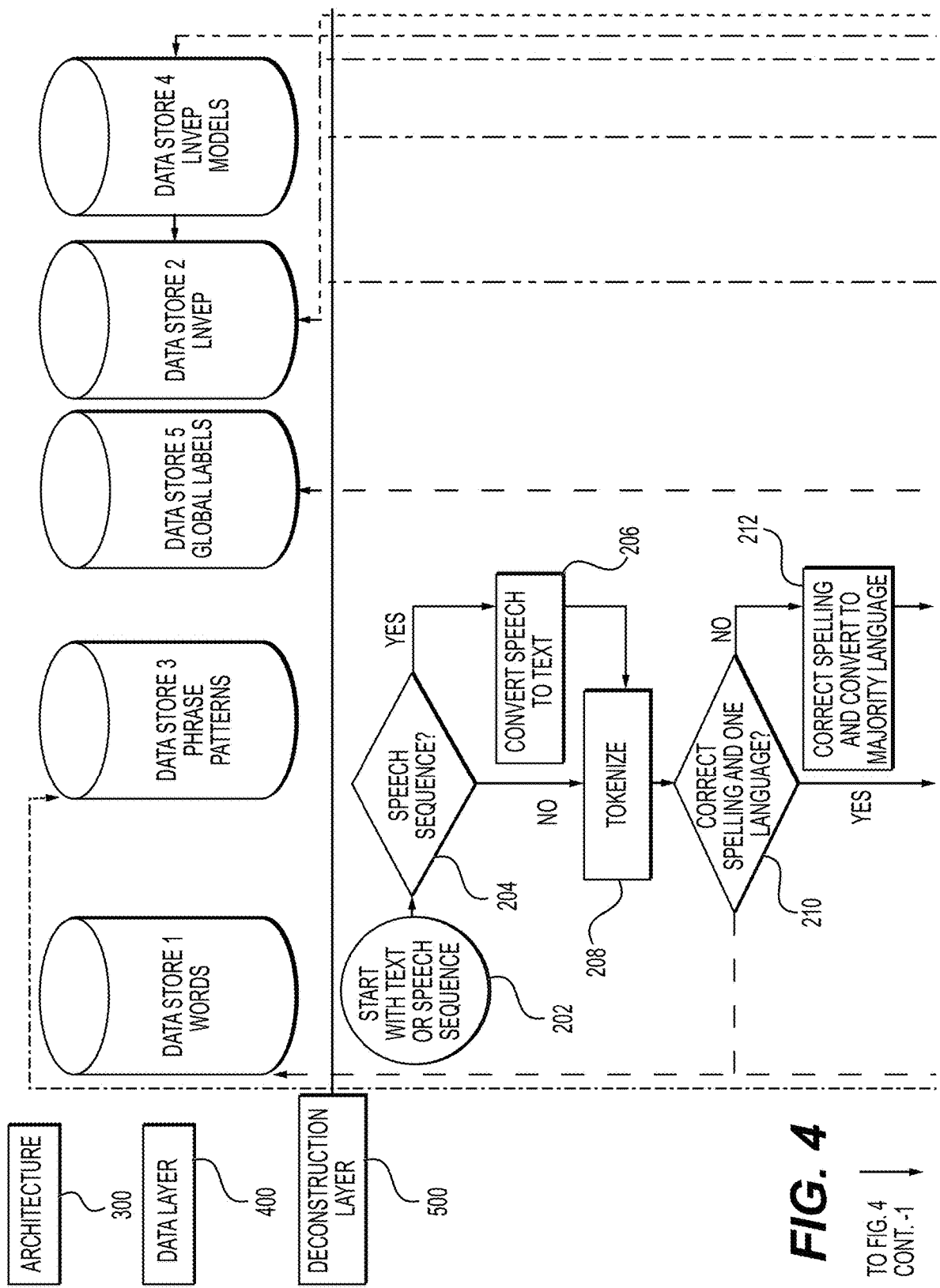
FIG. 4 illustrates a flow diagram of a method using the LNVEP system.
Figure 4:
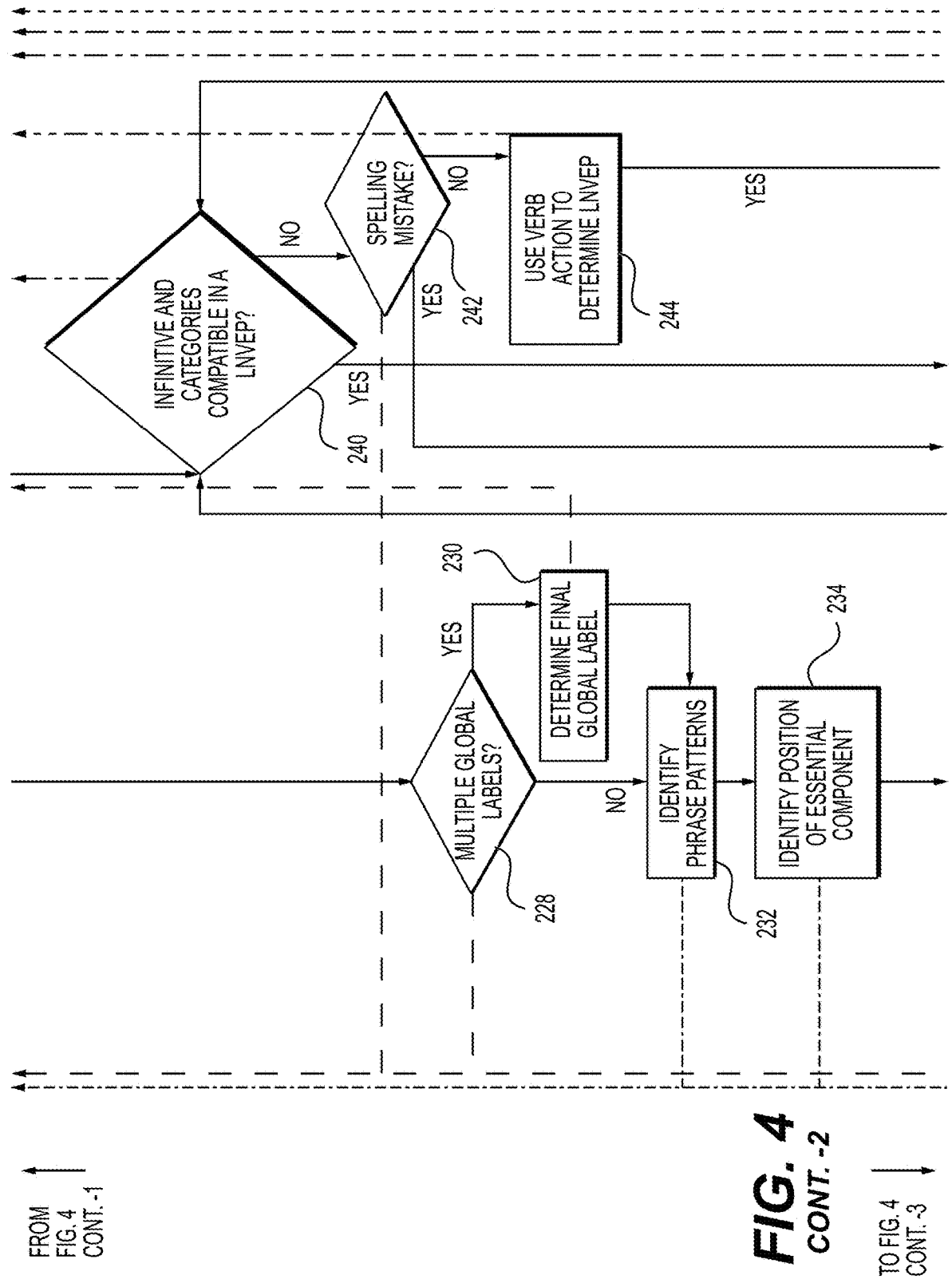
Figure 4:
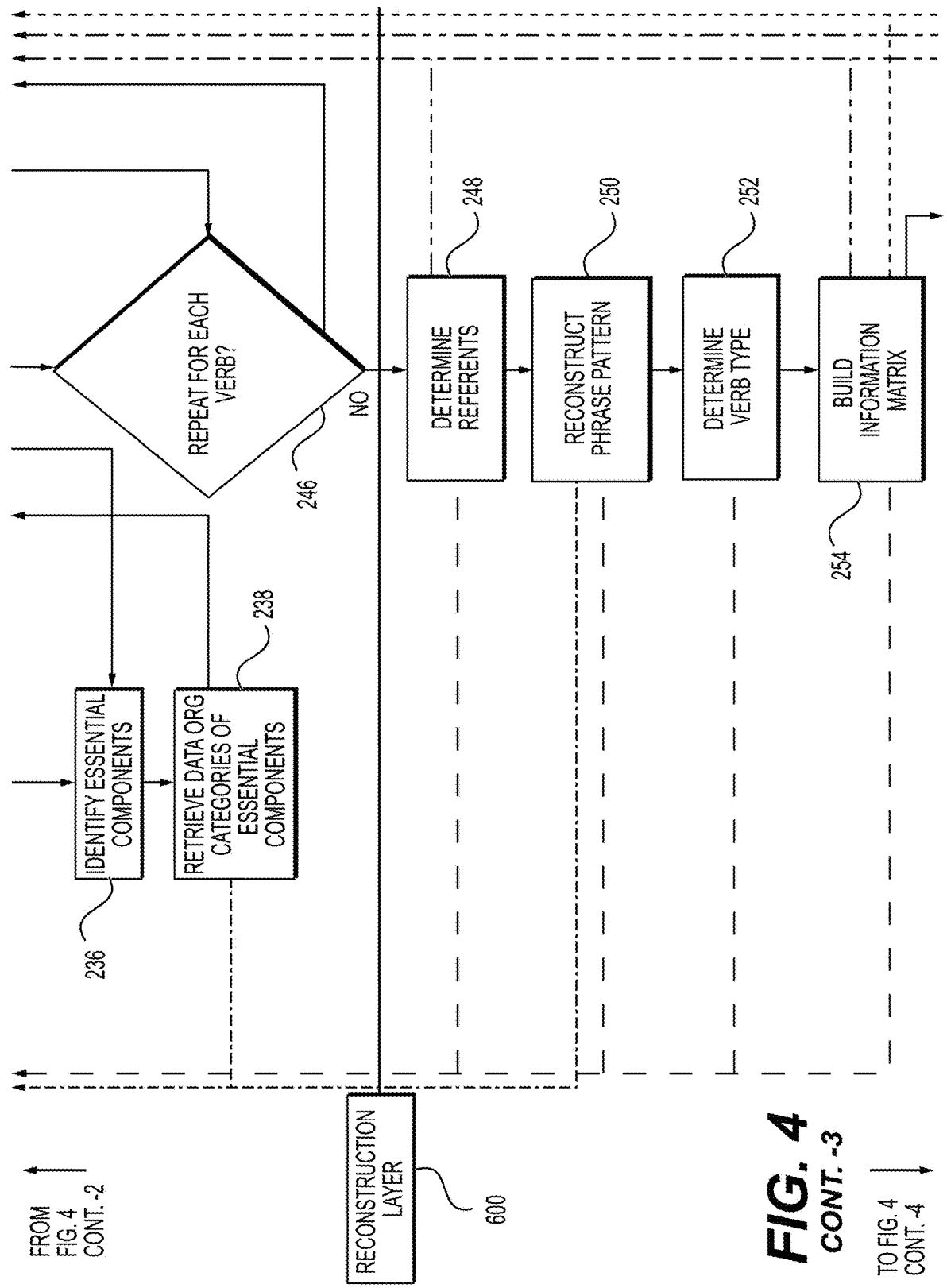
Figure 4:
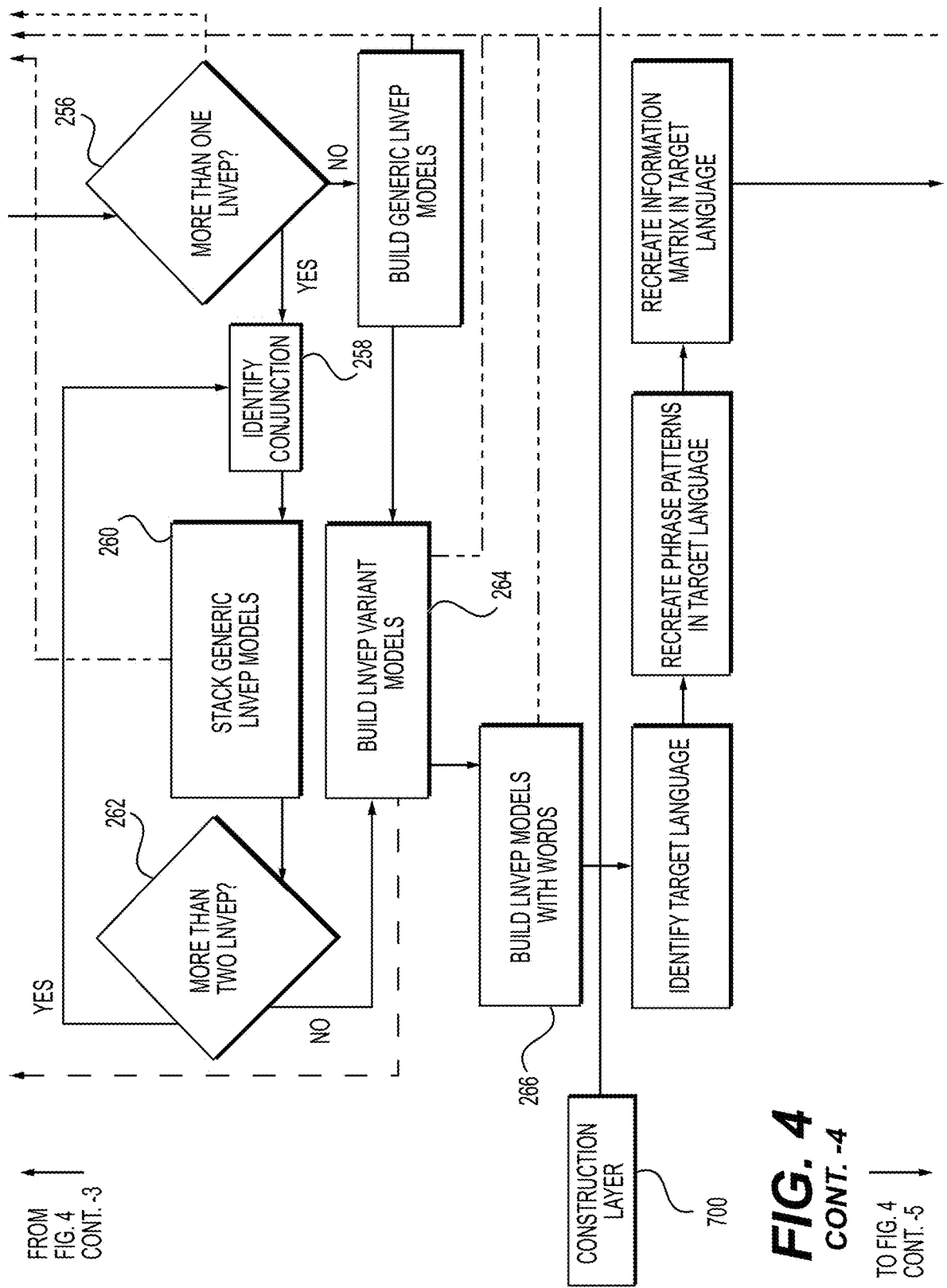
Figure 4:
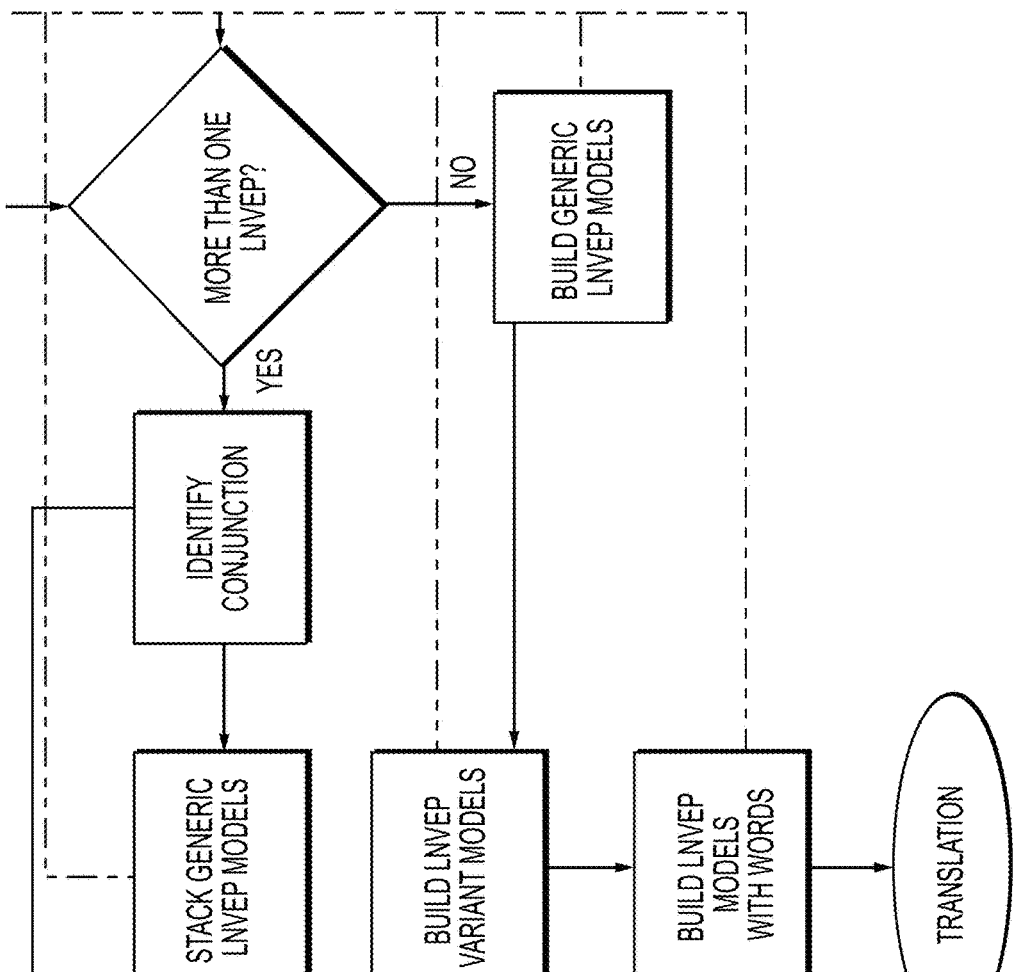

FIG. 4 is a flow diagram of just one example of the LNVEP system 160 utilized to generate a translation related to a text or speech sequence and based on identified one or more LNVEP. Other embodiments may be used without departing from the scope of the present disclosure.

The LNVEP system 160 depicted in FIG. 4 is understood as within an example architecture 300. The LNVEP system has four layers (Data, Deconstruction, Reconstruction, and Construction) which provide different but coordinated information. Architecture 300 includes a Data Layer 400 that contains predetermined and predefined information contained in repositories, a Deconstruction Layer 500 that utilizes Data Layer 400 to determine the one or more LNVEP, a Reconstruction Layer 600 that utilizes Data Layer 400 and Deconstruction Layer 500 to reconstruct the input 118 into one or more LNVEP Models and Construction Layer 700 that performs the query of a language-based task. Layers 400, 500, 600, and 700 may be directly or indirectly coupled to one another and/or components of each used as applicable.

The Data Layer

Architecture 300 includes Data Layer 400. Data Layer 400 includes Data Store 1, Data Store 2, Data Store 3, Data Store 4, and Data Store 5. Data Layer 400 contains the relational databases that store information used in Deconstruction Layer 500, Reconstruction Layer 600 and/or Construction Layer 700.

Data Store 1 is a set of words and set phrases with corresponding characteristics, such as gender, number, global label, component categories, association with prepositions, tone, formality level, country of use, pronunciation, syllabification, aligned word forms, and/or additional information. If a word or set phrase has more than one global label, each word or set phrase is separately entered. Data Store 1 is organized by language neutral words and set phrases with language equivalents. For example, the language neutral word "apple" (a fruit from the apple tree) has a Spanish language equivalent of "manzana" and an English language equivalent of "apple."

Data Store 2 is a set of language neutral verb expression pattern (LNVEP) with the associated verb type, LNVEP Base Models and/or additional information related to the LNVEP including, but not limited to, association with prepositions and adverbs, country of use, tone, format of use, and/or description of nuance of meaning. Data Store 2 is organized by language neutral LNVEP verb expression with language equivalent LNVEP. For example, the language neutral LNVEP verb expression "[person] [eat] [food]" expresses the language-neutral verb expression of a "person ingest an edible item through the mouth" has an English equivalent LNVEP of "[person] [eat] [food]" and a Spanish equivalent LNVEP of "[person] [comer] [food]."

Data Store 3 is a set of phrase patterns, organized by pattern sequences with language equivalents.

Data Store 4 is a set of LNVEP Models (Base and Word Order Variants). Data Store 4 is organized by language neutral verb type whereby the LNVEP Model associated with the verb type of one language has a language equivalent LNVEP Model. For example, the language neutral verb type of "transitive verb consumption" has the associated LNVEP Base Model English of "[EEC 1] [verb transitive] [EEC 2]" with an equivalent LNVEP Base Model Spanish of "[EEC 1] [verb transitive] [EEC 2]" such that the verb type designation further identifies additional construction variant possibilities such as, but not limited to, an LNVEP Model English "[EEC 1] [verb transitive] [all of] [EEC 2]" with an equivalent LNVEP Model Spanish of "[EEC 1] [Pronoun Prom EEC 1] [verb transitive] [EEC 2]"

Data Store 5 is a set of sequences of global labels.

The Deconstruction Layer

Architecture 300 includes Deconstruction Layer 500. The Deconstruction Layer 500 deconstructs the text or speech sequence input 118 in order to determine the one or more LNVEP.

Figure 12A:
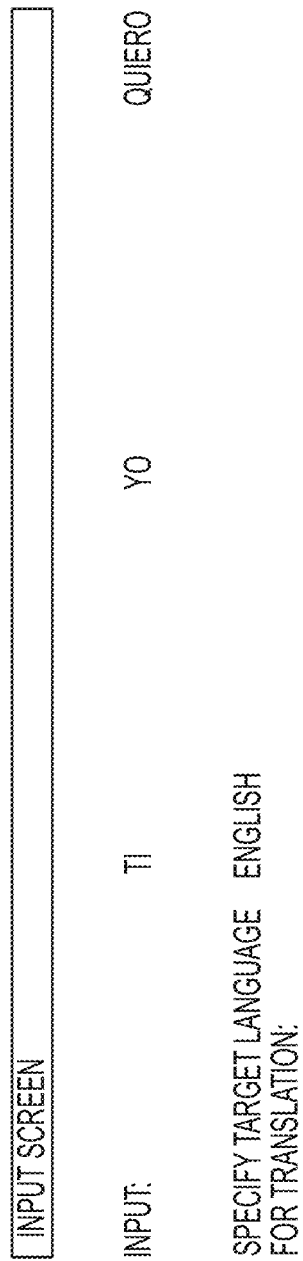
FIG. 12A illustrates an input screen.

In particular embodiments, the workflow 200B begins by receiving and using as an input, a text or speech sequence input 118 from a user. For example, a computing system receives a text sequence (e.g., text strings, words, sentences, questions, commands, interjections, exclamations, partial or complete thoughts, clauses, and so forth) or receives an utterance of a speech sequence into an application executing on an electronic device."). FIG. 12A illustrates an input screen.

In particular embodiments, a user of LNVEP system 160 submits a query to LNVEP system 160 for the performance of a language-based task. In particular embodiments, the query is a request for well-formed sentence detection of input 118. In particular embodiments, the query is a request for an autocorrection of the input 118 into a semantically and syntactically correct construction. In particular embodiments, the query is a request for an identification, resolution and/or explanation of semantic and/or syntactic ambiguities within input 118. In particular embodiments, the query is a request for the identification and/or explanation of the grammatical structure within the text or speech input 118. In particular embodiments, the query is a request for translation of input 118 to a specified target language. In particular embodiments, the query is a request for the numeric representations of the words within the text or speech input 118 to be used within or replace existing word embedding models. In particular embodiments, the query is a request to train language learner or AI-powered Models, using the information derived in LNVEP system.

The workflow 200B continues with the identification and conversion of a speech sequence into a text sequence.

The workflow 200B continues with the separation of the text sequence into one field for each individual word by calling function TokenizeSequence which accepts the input 118 and then creates an array of tokens.

The workflow 200B continues with the autocorrection of misspelled words (words without orthographic marks or common misspellings) within the array of tokens by the one or more processing devices 114 (e.g., servers) accessing relational database Data Store 1 to autocorrect misspelled tokens. The result is the corrected array of tokens.

Language Determination Module within the Deconstruction Layer

If the input 118 consists of more than one language, the Language Determination Module deconstructs input 118 to determine the majority language of the input. This technical advantage is particularly valuable to tutor technology, grammar services, and translation services where users may not have a complete vocabulary of the source or target language.

The workflow 200B continues to the Language Determination Module which begins with the application of function DetermineMajorityLanguage which accepts the corrected array of tokens and then, for each token within the corrected array of tokens, by the one or more processing devices 114 (e.g., servers) accessing relational database Data Store 1, identifies the language of the token and then the function computes the highest occurring language within the corrected array of tokens. The majority language is determined as the highest occurring language. If there is no highest occurring language, the majority language is determined as the language of the first token in the corrected array of tokens.

If the token equals the majority language, the token in the corrected array of tokens is unchanged.

If the token does not equal the majority language, the token requires conversion to the majority language. Since languages do not necessarily have a word-for-word equivalency (in other words, a word may be more than one word in another language or vice versa), in order to convert a token to the majority language, conversion is based on an analysis of the language neutral usage of the word. As an example, and not be way of limitation, in the sequence "Every morning, without fail, I use pasta de dientes," the Spanish "pasta de dientes" is determined to be the Spanish equivalent of the language neutral of "toothpaste" and the conversion to the English majority language equivalent of "toothpaste" reconfigures the three tokens to one token representing the language neutral "toothpaste." By converting the tokens to the language neutral equivalents, the LNVEP system 160 avoids a word-by-word understanding of input 118.

The Language Determination Module continues with the application of function CreatePermutations which accepts the corrected array of tokens and then creates arrays of permutations which are all of the possible sequences of tokens, in the specific order that set phrases may appear within the array of tokens. FIG. 5 illustrates the array of permutations for an array of seven tokens.

The Language Determination Module continues with the application of function MatchSequence which accepts the array of permutations and the set of tokens to be converted to the majority language and, then, starting with the first token of the set of tokens to be converted, by the one or more processing devices 114 (e.g., servers) accessing relational database Data Store 1, the function iterates the array of permutations to find unique matches with set phrases defined in Data Store 1. If the first token matches the first token of set phrases within Data Store 1, a match is found and the match is placed in a set for that token. The function iterates through the array of permutations for the first token. The result is a set of matched sequences of majority language set phrases.

If the set is not empty, the function then calls DetermineLongestSequence which accepts the set of matched sequences of majority language set phrases for the token and then determines the longest sequence in the set. The function MatchSequence then repeats, skipping forward by the number of tokens of the longest sequence in the set.

If the set of matched sequences for the first token is empty, the function MatchSequence moves to the second token in the set of tokens to be converted and repeats the above determination. The function MatchSequence repeats for the set of tokens to be converted to the majority language. The set of longest sequences within the corrected array of tokens is returned.

The Language Determination Module continues with the application of function CorrectLongestSequence which accepts the set of longest sequences and, for each longest sequence, by the one or more processing devices 114 (e.g., servers) accessing relational database Data Store 2, the longest sequence is corrected to the form of the words (i.e, gender, number and/or other constructions) required by the majority language set phrase. The set of autocorrected longest sequences is returned.

The Language Determination Module ends with the application of function ReconfigureNewArrayofTokens which accepts the corrected array of tokens and the set of autocorrected longest sequences and then reconfigures the array of tokens such that the words comprising majority language set phrases are reconfigured into one token. For each token in the corrected array of tokens, beginning with the first token, if the token is not equal to the first token of the autocorrected longest sequence, the token is added to the new majority language array. If the token is equal to the first token of the autocorrected longest sequence, then the autocorrected longest sequence is added to the new majority language array as one token and then the function skips forward by the length of the autocorrected longest sequence and repeats the process. The function returns a majority language array.

Verb Identification Module within the Deconstruction Layer

Figure 13A:
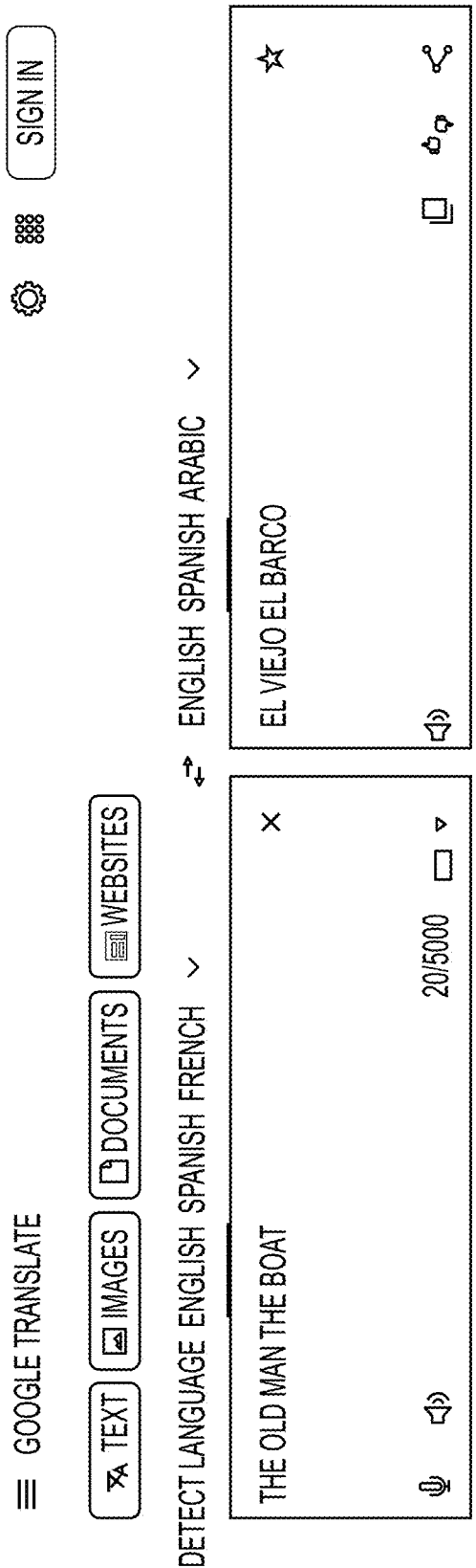

The Verb Identification Module further deconstructs the majority language array to determine the one or more verbs within the array. There may be one verb ("I eat the apple"), more than one verb ("While I ate, the girl read the book), one or more verb phrase (I ate like a king), or an implied verb ("Here" referring to an implied verb such as "come" or "sit"). Since all complete thoughts contain at least one verb or implied verb, by deconstructing the majority language array to identify the verbs, the LNVEP system has the technical advantage of avoiding nonsense understandings of text or speech sequences. For example, by deconstructing the sequence "the old man the boat" to identify the verb is "man," the sequence is universally understandable as a grammatically correct complete thought containing a verb ([the old]+ [man]+ [the boat]) rather than the alternate (and incorrect) understanding by existing technologies of "the old man+the boat" which is both nonsense and grammatically incorrect. (FIG. 13A)

However, since language is the inherently complex interaction of formal grammatical rules with exceptions, and exceptions to exceptions (particularly when language is used informally), identifying the one or more verbs is a complex computer programming task for several reasons: 1) a verb can be one word or a verb may begin a verb set phrase where the combined words form a distinct verb action, 2) words can have multiple grammatical functions, one of which may be as a verb, and 3) the meaning of a verb depends on the surrounding words and/or grammatical functions. Therefore, the LNVEP system 160 improves the identification of the one or more verbs by analyzing the majority language array though the use of global labels.

Every word or set phrase in Data Store 1 is assigned one or more global labels that reflect exactly how and/or when the word or set phrase is used within global label sequences that create grammatically correct sequences of noun phrases, adverbial phrases, prepositional phrases and other constructions such that a word with a global label replaces the global label of the sequence of the grammatically correct construction. As an example, and not by way of limitation, FIG. 6 displays how a word with a global label replaces the field of a grammatical correct sequence of global labels and a list of sample global labels.

Moreover, when the sequences of global labels creating noun phrases, adverbial phrases, prepositional phrases and other constructions global labels combine with one or more verbs, the result is a grammatically correct sentence, question, exclamation, and/or command. Therefore, given that every complete thought contains one or more verbs, the Verb Identification Module analyzes the global label sequence of the input 118 to determine the one or more verbs through the interaction with the global label sequences. There is only one allowable global label sequence that creates a grammatically correct construction. In other words, formal rules of grammatical construction remove any ambiguity of global label assignment. For example, as depicted in FIG. 7, the Spanish word "la" is, absolutely (without ambiguity), the global label of "pronoun object conjunctive" if within the sequence [pronoun object conjunctive+verb indicative], while "la" is the global label of "article definite" (absolutely without ambiguity) when placed within such sequences (but not limited to) as [article definite+noun concrete singular] and [article definite+adjective describing].

The workflow 200B continues to the Verb Identification Module which begins with the application of function GetPossibleGlobalLabelsForAToken which accepts a token from the majority language array and, by the one or more processing devices 114 (e.g. servers) accessing relational database Data Store 1, identifies an array of all possible global labels for that token. If the first value in the array is 0, the function identifies the global label of the token as "Proper Name." The function returns an array of all possible global labels for each token.

The Verb Identification Module continues with the application of function CreateAnArrayofTokensEachWithAnArrayOfGlobalLabels which accepts the majority language array and the array of all possible global labels for each token and creates an array of arrays which is the array of the majority language array with the array of all possible global labels for each token.

If the array of arrays contains only one global label for each token, the one global label for each token is identified and the one or more verbs within the sequence is revealed.

If the array of arrays contains only one global label that reveals the token is a subset of a verb, the one global label for each token that is a verb is identified as the verb and the remaining global labels for each token are also revealed. For example, in the example sequence used to test the performance of NLP systems to differentiate words with more than one meaning of "the old man the boat," when all possible global labels are identified, there is only token that carries the global label within the subset of "verb:"

| the | old | man | the | boat |
|---|---|---|---|---|
| article definite | adjective describing | noun concrete singular or verb indicative | article definite | noun concrete singular |

Therefore, the LNVEP system has the technical advantage of naturally and automatically disambiguating sequences through the initial identification of the verb. The verb is "man" and the final global label sequence is correctly understood as [the old] (where an adjective modified by an article definite creates a noun phrase referring to "people that are old") does the verb action of [man] (or "be in charge of") to a direct object of [the boat]):

| the | old | man | the | boat |
|---|---|---|---|---|
| article definite | adjective describing | verb indicative | article definite | noun concrete singular |

In contrast, existing NLP and AI-powered Models struggle with sentences that contain words with more than one meaning, particularly when the learned context clues are not present. (FIG. 13A)

If the array of arrays contains more than one global label of a subset of a verb, the Verb Identification Module continues with function CreatePermutationsGlobalLabels which accepts the array of arrays and then creates arrays of permutations. The permutations are the possible sequences of the global labels in the specific order that they must appear for grammatically correct sequences as well as incorrect sequences whereby the incorrect global label has an associated autocorrection to create a grammatically correct sequence of global labels. FIG. 8 illustrates the arrays of permutations for global label determination for tokens 1 and 2.

The Verb Identification Module continues with the application of function MatchTheOneGlobalLabelForAToken which accepts the array of arrays and the arrays of permutations and then, for each token, compares the global label sequences of the array to the arrays of permutations to determine the one valid sequence match, and returns the one valid global label for the token. In other words, starting with the first global label of the first token, the function determines the permutation that matches the sequence of global labels in the array of arrays.

For example, in the sequence "Fruit flies like a banana" both "flies" and "like" may be the verb:

| fruit | flies | like | a | banana |
|---|---|---|---|---|
| noun mass or noun attributive | verb indicative or noun concrete plural | verb indicative or adverb or preposition | article indefinite | noun concrete singular |

Therefore, the sequences of global labels are analyzed for grammatically correct sequence:

| | | |
|---|---|---|
| [Noun mass + verb indicative] | yes | |
| [Noun mass + verb indicative + verb indicative] | no | Return to next first token |
| [Noun attributive + verb indicative] | no | Return to second token |
| [Noun attributive + noun concrete plural] | yes | |
| [Noun attributive + noun concrete plural + verb indicative] | yes | |
| [Noun attributive + noun concrete plural + verb indicative + article indefinite] | yes | |

Therefore, the one final global sequence is:

| fruit | flies | like | a | banana |
|---|---|---|---|---|
| noun attributive | noun concrete plural | verb indicative | article indefinite | noun concrete singular |

(In contrast, FIG. 13B illustrates existing technologies create a nonsense understanding of a "Fruit flies+like a banana" which is a sequence of two phrases ("noun phrase+prepositional phrase") where "como" is the preposition "like" as in "similar to" and not the verb "like."

When a match is determined, by the one or more processing devices 114 (e.g., servers) accessing relational database Data Store 5, the function returns the corresponding value that is the global label that must be used within the global label sequence. The result is the set of one global labels for each token.

In other words, the LNVEP system autocorrects grammar errors of misused words within an input. For example, a user input 118 contains a correctly spelled but grammatically incorrect usage. For example, the input of "ti yo quiero" contains a misuse of the word "ti." "Ti" carries a global label of "pronoun after preposition" and "yo" carries the global label "pronoun subject." When the function iterates through the permutations, the sequence of global label match is

[pronoun after preposition+pronoun subject+verb indicative] where the function accesses database 5 to return the corrected global label for the first token of "pronoun object conjunctive."

| | | |
|---|---|---|
| [pronoun after preposition + pronoun subject] | no | Return to first token |
| [pronoun after preposition + pronoun subject + verb indicative] | yes | Replace first token |

The corrected global label sequence is [pronoun object conjunctive+pronoun subject+verb indicative].

The function MatchTheOneGlobalLabelForAToken continues by calling function CorrectInput which accepts the majority language array and the one valid global label for the token and then identifies, by the one or more processing devices 114 (e.g., servers) accessing relational database Data Store 1, the corrected form of the token that reflects the use as the global label. The result is the correct majority language token. For example, for the above example, the "pronoun conjunctive object" form of "ti" is "the" and, therefore, the correction overrides the incorrect token of the majority language array, thereby autocorrecting grammar errors of misused words within inputs.

The function MatchTheOneGlobalLabelForAToken repeats for each token in the array of arrays and returns the set of one global label for each token as a corrected majority language array.

The Verb Identification Module continues with the application of function TellIfGlobalLabelIsAVerb which accepts the set of one global label for each token and, by the one or more processing devices 114 (e.g., servers) accessing relational database Data Store 1, identifies if the one global label is within the grammatical function of verb. The global labels within the grammatical function of verb include, but are not limited to, verb indicative, verb infinitive, verb subjunctive, verb gerund with pronouns, verb command, verb command with pronouns, verb past participle, and verb past participle with pronouns. If the one global label for each token is within the subset of "verb," the token is identified as a verb. If the one global label for a token is not within the subset "verb," the token is identified as 0. The set of inflected verbs is returned.

The Verb Identification Module continues with the application of function ConvertVerbToInfinitive which accepts the set of inflected verbs and, by the one or more processing devices 114 (e.g., servers) accessing relational database Data Store 1, identifies the infinitive form of the inflected verb and then returns the set of infinitives. The inflected form is the form of the infinitive whereby the form includes an inflected ending that expresses, depending on the language, the subject, subject number, subject gender, action tense, action mood, action aspect, and/or other information. In other words, the infinitive is the form that does not express subject, subject number, subject gender, action tense, action mood, action aspect, and/or other information.

The Verb Identification Module continues with the application of function SubstituteTokenOfVerbWithInfinitive which accepts the corrected majority language array, set of inflected verbs, and set of infinitives and then, for each token within the corrected majority language array, if the token is identified as a verb, the function substitutes the infinitive from the set of infinitives. If the token is not identified as a verb, the function returns the token. The function returns an infinitive majority language array.

The Verb Identification Module continues with the application of function CreatePermutations which accepts the corrected infinitive majority language array and then creates the arrays of permutations of all of the possible sequences of tokens that may combine to form a set phrase where the first word in the sequence is the infinitive, creating an infinitive verb set phrase which expresses a distinct verb action. For example, the sequence "I ate like a king" converted to include the infinitive as "I eat like a king" whereby "eat like a king" is an infinitive verb set phrase.

The Verb Identification Module continues by calling functions, as previously described, MatchSequence, DetermineLongestSequence and ReconfigureNewArrayofTokens to determine the infinitive verb set phrases within the infinitive majority language array and returns an infinitive array.

The Verb Identification Module continues with the application of function IdentifyInfinitives which accepts the set of longest sequences of infinitive verb set phrases and returns the final set of infinitives that includes the infinitives and infinitive verb set phrases.

If the final set of infinitives is empty, the Verb Identification Module continues to the Phrase Pattern Module in order to determine the implied verb (as described below).

The Verb Identification Module ends with the application of function IdentifyInflectedVerbs which accepts the set of longest sequences of infinitive verb set phrases and the set of inflected verbs and then substitutes the infinitive within the corresponding inflected verb from. The function returns the updated set of inflected verbs.

Phrase Pattern Module within the Deconstruction Layer

The Phrase Pattern Module deconstructs the infinitive array to determine the one or more phrase patterns within the global label sequences. Phrase patterns are the grammatically correct sequences of global sequences that form noun phrases, prepositional phrases, adverbial phrases, adjectival clauses, and other constructions. Global labels are used in the construction of phrase pattern sequences such that a word with the corresponding global label replaces the global label within the phrase pattern. In other words, since each word is assigned a global label that reflects how and/or when the word is used within phrase patterns, proper word usage within specific phrase patterns is ensured.

The workflow 200B continues to the Phrase Pattern Module which begins with the application of the functions, as previously described, CreatePermutations, MatchSequence, DetermineLongestSequence and ReconfigureNewArrayofTokens which returns the final array within which word set phrases are reconfigured into one token where word set phrases express a distinct meaning.

The Phrase Pattern Module continues with the application of functions, as previously described, GetPossibleGlobalLabelsForAToken, Create AnArrayofTokensEach WithAnArrayOfGlobalLabels, CreatePermutationsGlobalLabels, MatchTheOneGlobalLabelForAToken, and CreateNewArray which creates the array of final global labels for the final array.

The Phrase Pattern Module continues with the application of function CreatePermutationsPhrasePatterns which accepts the array of final global labels for the final array and then creates the arrays of permutations which represent all of the possible sequences of global labels that combine to form phrase patterns.

The Phrase Pattern Module continues with the application of functions, as previously described, MatchSeqeunces and DetermineLongestSequence which accepts the arrays of permutations of global labels and then determines the phrase patterns within the array of final global labels. The set of longest phrase patterns is returned.

The Phrase Pattern Module continues with the application of function AutocorrectPhrasePatterns which accepts the set of longest phrase patterns and then, by the one or more processing devices 114 (e.g., servers) accessing relational database Data Store 3, autocorrects the phrase pattern sequence such that when the phrase pattern is reconstructed in the Reconstruction Layer, the sequence of global labels will reflect the phrase pattern construction for the majority language. A set of autocorrected phrase patterns is returned. For example, for an input 118 that has a majority language of Spanish but a conversion of the English language tokens of "the apple red," the function autocorrects the phrase pattern of [article definite+adjective expected+noun concrete singular] to the majority language equivalent of [article definite+noun concrete singular+adjective describing]. Therefore, the LNVEP system has the technical advantage of autocorrecting grammar errors of misplaced word orders within phrase patterns.

The Phrase Pattern Module continues with the application of function IdentifyPhrasePatternUsage which accepts the set of autocorrected phrase patterns and, by the one or more processing devices 114 (e.g., servers) accessing relational database Data Store 3, identifies the usage of each identified phrase pattern as either within the LNVEP or as extraneous information. The function returns a set of LNVEP phrase patterns and a set of extraneous information phrase patterns.

If the set of LNVEP phrase patterns is not empty, the Phrase Pattern Module ends.

If the set of LNVEP phrase patterns is empty, the input 118 contains an implied verb. The Phrase Pattern Module ends with the application of function DetermineImpliedVerb calls functions IdentifyPositionOfComponent and IdentifyComponents WithinFinalArray (as described below) to determine the extraneous component and the function IdentifyAllComponentCategories (as described below) to determine the data organization category which the implied verb must associate. (In other words, the data organization category of the phrase pattern component associates with an implied verb. For example, for an input 118, "Here," the phrase pattern is "adverb place" where the extraneous component is "here" and the data organization category is "place" and, therefore, an implied verb must associate with the category "place" (for example, "come" or "sit" which use a location to convey additional information). Using the function RequestClarification (as described below), the LNVEP system returns a message such as "the input contains an implied verb that uses the [extraneous component data organization category] to give additional information about an implied verb. An implied verb can only be used when stating the verb would be redundant and unnecessary." The LNVEP system also returns specific verbs that associate with the extraneous component.

LNVEP Module within the Deconstruction Layer

Figure 12D:
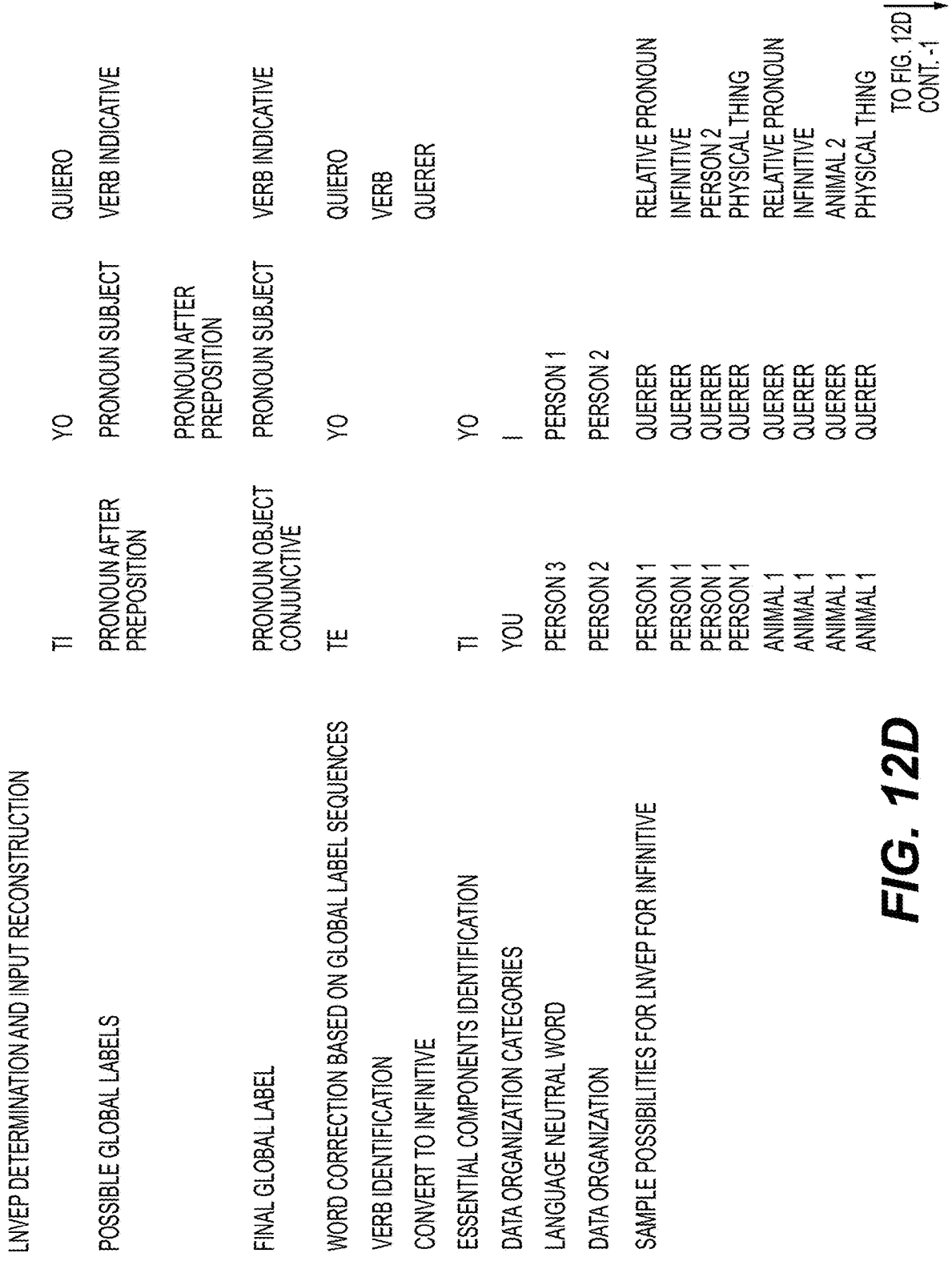
FIG. 12D illustrates the identification of the one or more LNVEP for and subsequent reconstruction to the LNVEP Models Majority Language.

The LNVEP Module deconstructs the set of LNVEP phrase patterns to determine the one main component within each of the identified LNVEP phrase patterns and then, using the set of components, determines how (the order) the set of components associates with the final set of infinitives and infinitive verb set phrases to identify the one or more LNVEP within the input 118. There is one valid LNVEP that associates an infinitive or infinitive verb set phrase with one or more of the set of components. For each infinitive and infinitive verb set phrases in the final set of infinitives, the LNVEP Module determines a LNVEP. FIG. 12D illustrates the identification of one or more LNVEP within an example input. As explained above, the input contains an error of a misused word that is a misspelling of a similar sounding word ("ti" instead of "the") and an error of incorrect word order of grammatical functions.

The workflow 200B continues to the LNVEP Module which begins with the application of function CreateEssentialComponentMatrix which creates a matrix of information related to the set of essential components. Herein, the Essential Component Matrix will be referred to as the "EC Matrix." Herein, the one main component within the LNVEP phrase patterns will be referred to as the "essential component" because the component is essential to the determination of LNVEP. (The one main component of the extraneous information phrase patterns will be referred to as an "extraneous component" because the component is not essential to the determination of the LNVEP. The extraneous component will be analyzed later to determine its association with an LNVEP or an essential component.)

The LNVEP Module continues with the application of function BuildECMatrix which builds the EC Matrix.

For each phrase pattern within the set of LNVEP phrase patterns, the function BuildECMatrix calls function IdentifySetofEssentialComponentsFromLNVEPPhrasePatterns which calls function IdentifyPositionOfComponent which accepts the set of LNVEP phrase patterns and, by the one or more processing devices 114 (e.g., servers) accessing relational database Data Store 3, identifies the position of the essential component within the LNVEP phrase pattern. The result is the position of the essential component.

The function IdentifySetofEssentialComponentsFromLNVEPPhrasePatterns then calls function IdentifyComponents which accepts the position of the essential component, the LNVEP phrase pattern, and the final array and then determines the corresponding token within the final array that is the essential component. The result is the essential component. For example, in the sequence "I want four ladders," there is an LNVEP phrase pattern of the sequence of global labels for "four ladders" of [adjective number+noun concrete plural] where the position of the essential component is "2" for an essential component identification of [ladders].

The function IdentifySetofEssentialComponentsFromLNVEPPhrasePatterns repeats for each phrase pattern in the set of LNVEP phrase patterns. The result is the set of essential components from within LNVEP phrase patterns.

The function BuildECMatrix continues with the application of function IdentifyPronounSubjectUsage which determines whether the pronoun subject incorporated within the inflected verbs of the majority language array should be added to the set of essential components. To do so, for each verb in the set of inflected verbs, the function calls the function IdentifyInflectedVerbs to identify an inflected verb within the set of inflected verbs. The function then calls function AnalyzeInflectedVerbForPronounSubject which accepts the inflected verb and, by the one or more processing devices 114 (e.g., servers) accessing relational database Data Store 1, identifies the person and number designation of the inflected verb. For example, the inflected verb "quiero" has the person and number of "first person singular" whereby the verb ending-o reflects the one male or female speaker. The function then calls function ConvertPersonAndNumberToPronounSubject which accepts the person and number designation and, by the one or more processing devices 114 (e.g., servers) accessing relational database Data Store 1, identifies the implied pronoun subject. For example, "first person singular" has a corresponding pronoun subject of "yo." The function then calls function CheckIfPronounSubjectIsWithinLNVEPPhrasePatterns which accepts the identified pronoun subject and the set of LNVEP phrase patterns and then determines if the global label sequence "pronoun subject" is within the set of LNVEP phrase patterns. If the pronoun subject is not within the set of LNVEP phrase patterns, the function includes the pronoun subject in the set of essential components.

Figure 13C:
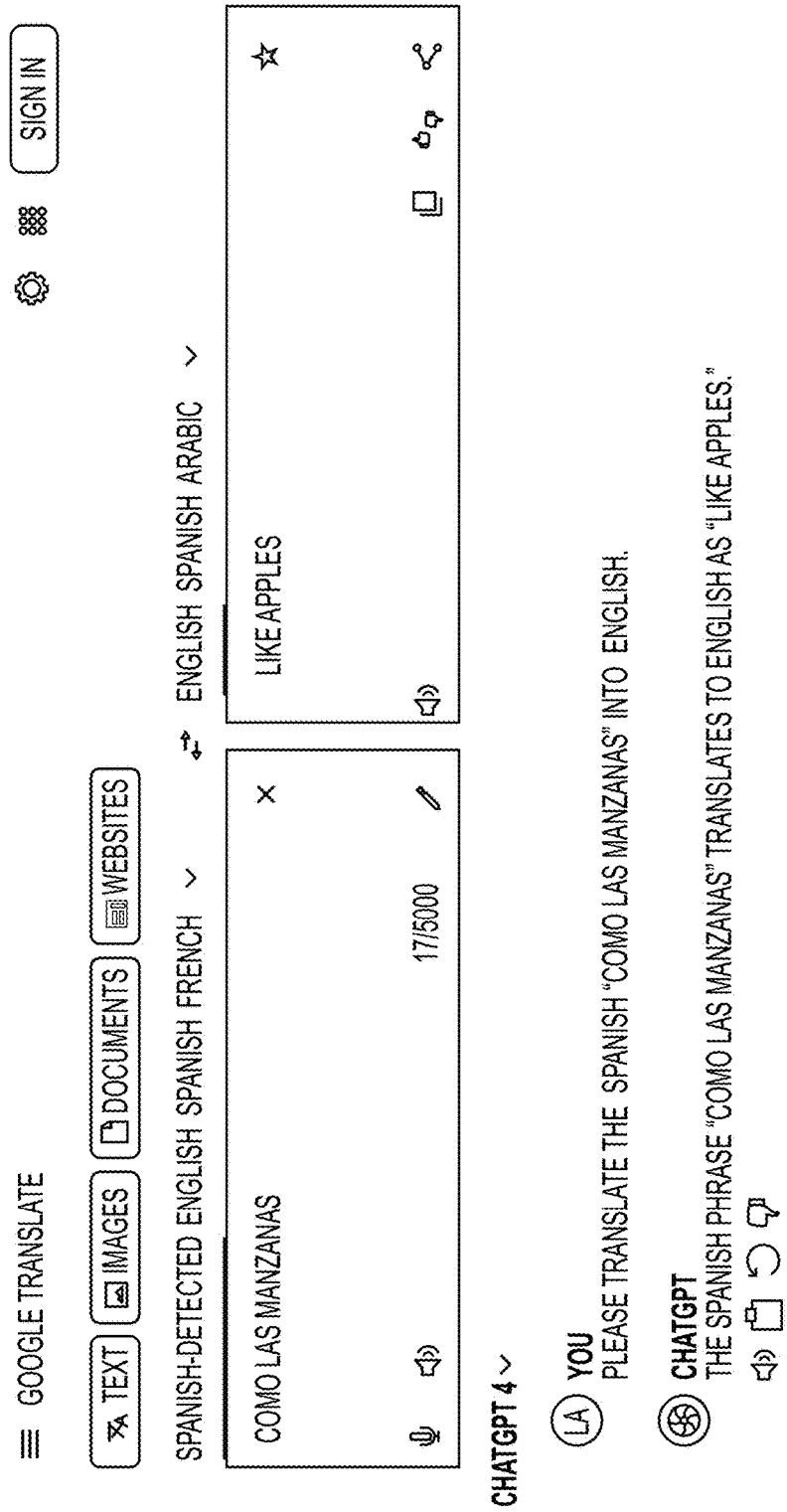

Therefore, the LNVEP system has the technical advantage of correctly understanding user inputs that do not include a stated subject. While the English language requires a stated subject, for other languages, once the subject has been mentioned, so as to not redundantly state the subject, an inflected verb is used which expresses the pronoun subject in the verb ending. For example, the sequence "como las manzanas" contains the word "como," which has several global label sequences (adverb linking ("as"), preposition ("like"), and verb indicative ("I eat")). The LNVEP system 160 identifies that "como" is the only word in the global label sequence that carries the global label of a subset of a verb. The remaining words comprise a phrase pattern of [article definite+noun concrete plural] for a determination of the essential component of "manzanas" whereby the set of essential components only includes "manzanas." However, the inflected verb "como" contains the pronoun subject "yo" which is not included in the set of essential components. Therefore, LNVEP system 160 includes the pronoun subject in the set of essential components, such that the valid LNVEP of [person] [eat] [food] is determined for a correct understanding of the sequence as "I eat the apples." FIG. 13C illustrates the existing technologies incorrectly understand "como" as the preposition "like."

The function BuildECMatrix continues by calling function IdentifyLanguageNeutralDataOrgCategory which, for each essential component within the final set of essential components, by the one or more processing devices 114 (e.g., servers) accessing relational database Data Store 1, identifies the language neutral equivalent of the essential component. The language neutral equivalent is returned as the first data organization category. For example, the language neutral equivalent of the plural "manzanas" is "apples."

The function BuildECMatrix continues by calling the function IdentifyInfinitiveDataOrgCategory which, using the final global labels of each token of the final array, determines whether the essential component has a final global label of "infinitive" or "infinitive pronom." If the final global label is "infinitive" or "infinitive pronom," "Infinitive" or "infinitive pronom" is returned as the second data organization category. While an infinitive is a type of verb, a final global of label of "infinitive" or "infinitive pronom" indicates the usage of an infinitive as an essential component within a LNVEP Therefore, the infinitive resides in both the set of essential components as well as the final set of infinitives. For example, "to swim" is the "infinitive" within "I want to swim." The first verb is determined to be [want] and the set of essential components are determined to [I] and [to swim] for a determination of the LNVEP 1 of [person] [want] [infinitive]. However, since an infinitive is also a subset of a type of verb, the infinitive also requires a determination of its LNVEP for a determination of LNVEP 2. For the above example, [person] [swim] is LNVEP 2. The conditions of both LNVEP 1 and LNVEP 2 must be satisfied for the proper usage of the infinitive. In this example, the conditions are satisfied (no additional words following the infinitive are required.)

The function BuildECMatrix ends by calling function IdentifyDataOrgCategories which accepts the final set of essential components and, for each essential component, by the one or more processing devices 114 (e.g., servers) accessing relational database Data Store 1, identifies the set of data organization categories that associate with the essential component. The function returns the set of final essential component data organization categories.

Figure 10:
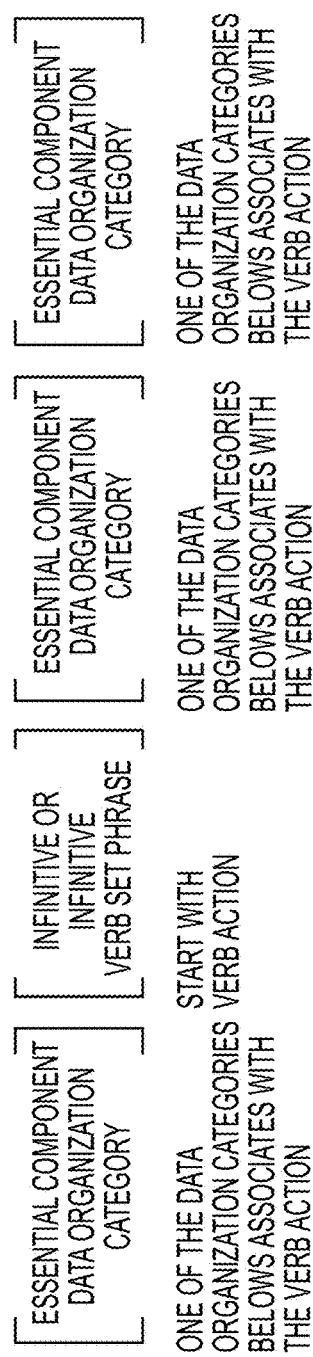
FIG. 10 illustrates the creation of LNVEP.
Figure 10:
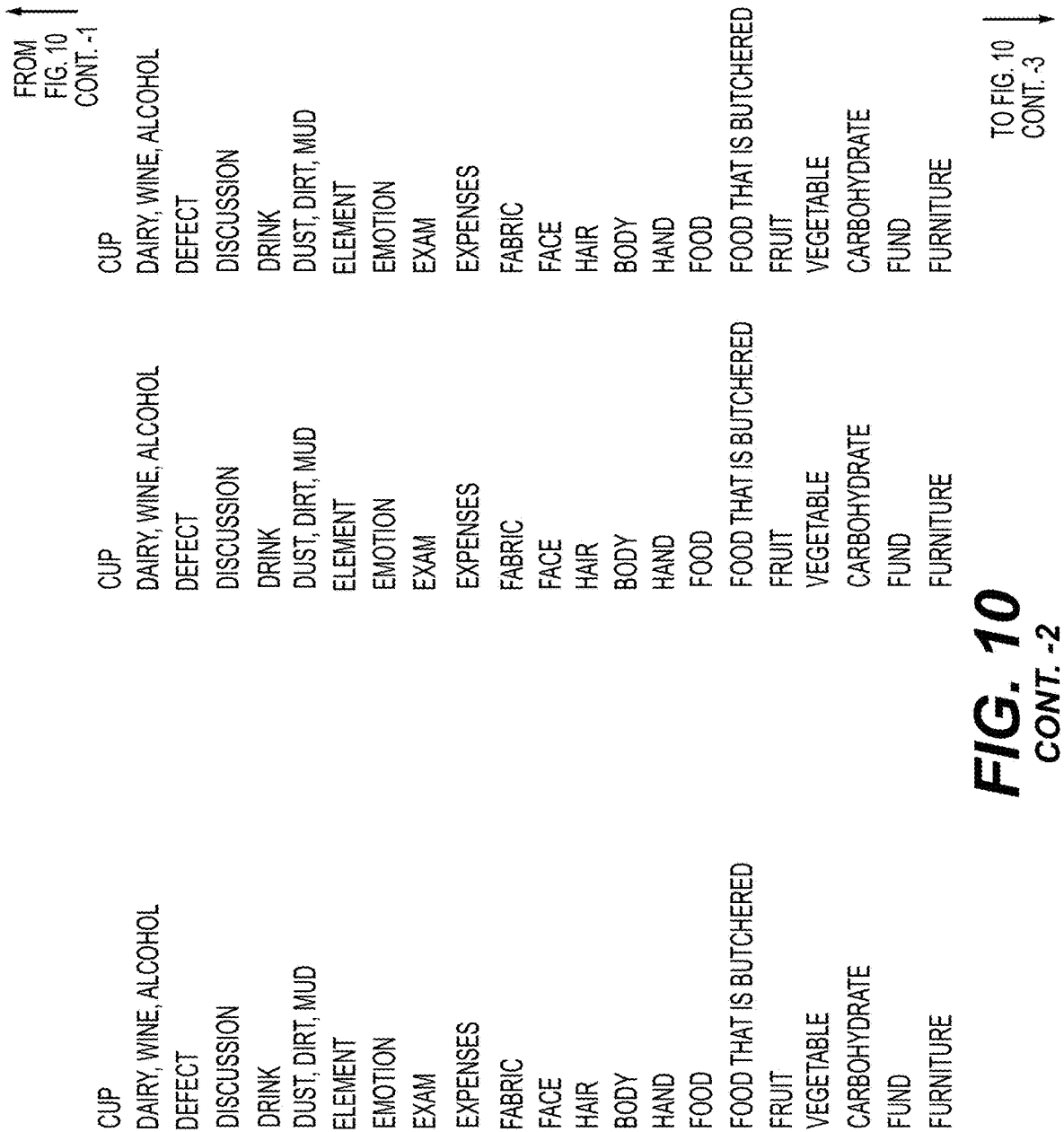

Each language neutral word or set phrase in Data Store 1 has an associated set of one or more data organization categories. Data organization categories include such categories as, among others, the word, one or more generalization of the word, one or more word type, one or more word topic, one or more specific grammatical function used within LNVEPs, LNVEP Models (as described below), and/or extraneous information such as infinitive, relative pronoun, adverb, preposition, past participle, adjective, gerund, or other grammatical constructions as well as any other categorization required by LNVEP and LNVEP Models and/or extraneous information. Data organization categorization is not limited to the traditional categorization techniques that group words based on semantic similarity (for example, "cake" is a "food") but is uniquely based on how and when the word can be used within LNVEP, LNVEP Models, and/or extraneous information. For example, the component categories of "cake" are "cake," "food," "dessert food", "caloric food", "sweet," "soft physical thing", "physical thing," among others, so as to be included in such LNVEPs as "[person] [eat] [food]" or "[person] [smash] [soft physical thing]." FIG. 10 illustrates data organization categories and the association with infinitives or infinitive verb set phrases to create a LNVEP.

The LNVEP Module continues with the application of function RetrieveInfinitive which retrieves the first in the final set of infinitives and infinitive verb set phrases.

The LNVEP Module begins the LNVEP Determination Process with the application of function IdentifyPossibleLNVEP which accepts the infinitive or infinitive verb set phrase and, by the one or more processing devices 114 (e.g., servers) accessing relational database Data Store 2, identifies the set of all possible LNVEP that contain the infinitive or infinitive verb set phrase.

The LNVEP Module continues with the application of function IdentifyPossibleLNVEPEssentialComponentDataOrgCategories which accepts the set of possible LNVEP that contain the infinitive or infinitive verb set phrase and, for each identified LNVEP, by the one or more processing devices 114 (e.g., servers) accessing relational database Data Store 2, identifies the one of more data organization categories that must be present for the LNVEP to be valid. The set of possible data organization categories associate with an essential component of the possible LNVEP is returned.

The LNVEP Module continues with the application of function DetermineMostSpecificEssentialComponentDataOrgCategory which accepts the set of final essential component data organization categories and the set of possible essential component data organization categories for each possible LNVEP that contain the infinitive or infinitive verb set phrase and then, for each essential component, iterates through the set of essential component data organization categories for the essential component and the set of possible essential component data organization categories for each possible LNVEP that contain the infinitive or infinitive verb set phrase to determine the most specific essential component data organization category of the essential component that is also within the set of possible LNVEP essential component data organization categories for the infinitive or infinitive verb set phrase. If there is a match, the essential component data organization category is returned. If there is no match, the function returns "xxx." The result is a set of matched essential component data organization categories.

The LNVEP Module continues with the application of function CreatePermutationsLNVEP which accepts the set of matched essential component data organization categories and then creates arrays of permutations representing possible sequences of essential component data organization categories, in the specific order that the sequences must appear in LNVEP. In other words, the permutations represent the order of the essential components data organization categories that is required to convey a certain LNVEP. FIG. 11 illustrates the creation of the permutations for the determination of a LNVEP.

The LNVEP Module continues with the application of function DetermineLNVEPInitial which accepts the array of permutations and the set of matched essential component data organization categories and then, for each array of permutations, the function loops through the set of matched essential component data organization categories to find the correct combination of essential component data organization categories that create a unique match. The correct combination is the LNVEP Initial. Indeed, there is only one way each verb may correctly and accurately be utilized to convey a certain verb expression. A verb expression is the specific verb or verb phrase that must be used with specific surrounding data organization categories, in the specific order, whereby any word that associates with the data organization category is the essential component of the phrase pattern. For example, for the LNVEP of [person] [eat] [food], any word with an associated data organization categories of [person] and [food] replaces the essential component of noun phrase patterns such as [I] eat [the [apples]] or [The hungry [girl]] eats [the whole [cake]].

Moreover, the importance of the use of global labels in the identification of the essential component of the phrase patterns is illustrated in an example sequence of "I want four waters." "Water" is a noun mass which is a subset of a noun concrete (a noun that can be perceived by one of the five senses) but, according to formal grammar rules, the noun mass cannot be divided and counted (such as "air" or "dirt") and, therefore, 1) cannot be pluralized and 2) cannot be quantifiable by a number. However, the sequence of "I want four waters" is a valid usage of language, whereby the container in which the water is contained is implied and omitted ("I want four {bottles of} water"). Therefore, since the word "waters" is assigned the global label "noun mass plural" and the phrase pattern [number+noun mass plural] is identified within the repository, the LNVEP system, without using rule-based overrides, identifies the essential component within the LNVEP phrase pattern is [container] which has the associated data organization category of [physical thing]. Therefore, the valid LNVEP is determined as [person] [want] [physical thing] whereby the [physical thing] is the [container of water] (not [water]).

Moreover, the LNVEP determination is not contingent on a left-to-right word order of the input 118. It is the LNVEP that determines the specific order of the essential component data organization categories to express a particular verb expression. This has technical advantages for the correct understanding text or speech sequences consisting of word orders that are different than the English SVO structure where a stated subject(S) must be placed before the verb (V) and an object (O) follows the verb, including word order variations used in informal formats as well as incorrect orders of grammatical functions within inputs.

Figure 13D:
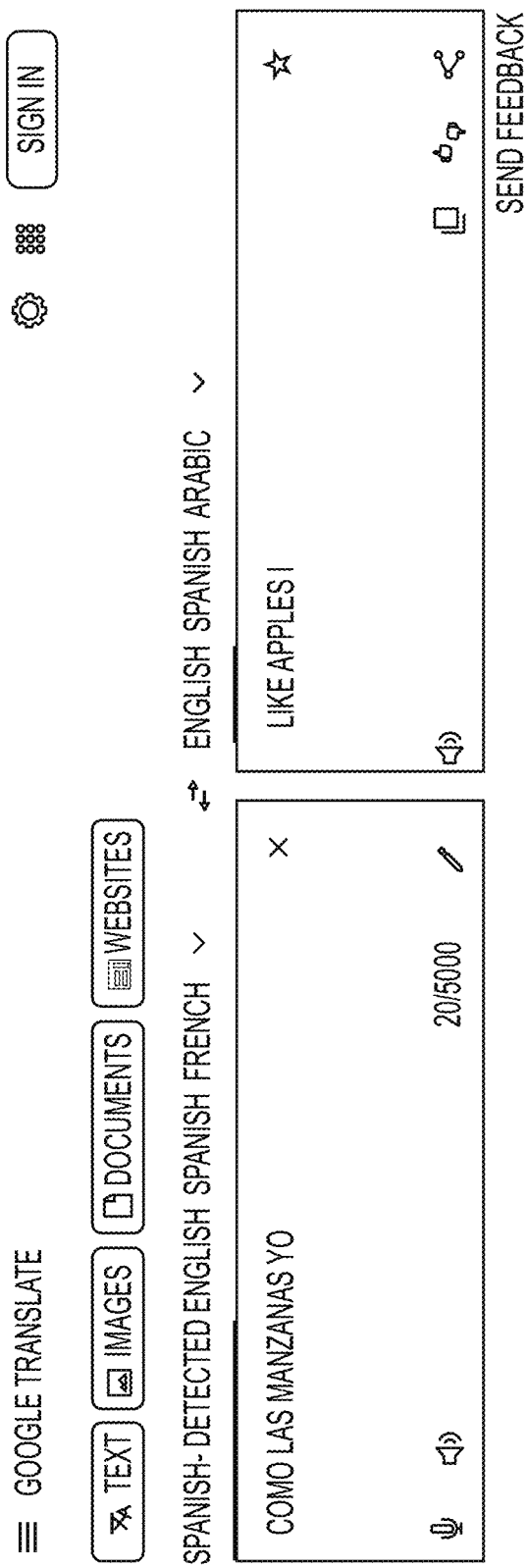

For example, while languages such as English use vocal stress, other languages prefer word order variations to stress words (reserving vocal stress for the construction of questions from statement), particularly in the informal constructions found of spoken formats (television, movies, in-person gatherings, etc.) and written formats (online platforms, books, comics, etc.). For example, the Spanish text or speech sequence "como las manzanas yo" shifts the subject ("yo") to after the verb to emphasize the subject. In this example, the set of final essential components are 1) "manzanas" (with data organization categories including [food]) and 2) "yo" (with data organization categories including [person]) for an LNVEP of [person] [eat] [food] with a LNVEP Base Model understanding of the initial sequence of "I eat the apples" (whereby through the verb type, as will be discussed shortly, the LNVEP Base Model allows a shift to convey the additional nuanced information of emphasis on the subject, as used in informal, usually spoken formats). FIG. 13D illustrates existing technologies do not accurately understand informal formats.

Or, for example, the LNVEP determination correctly understands incorrect orders of grammatical functions within inputs such as "como yo las manzanas" where the subject "yo" is incorrectly shifted to after the verb but before the direct object. Since the LNVEP determination is based on the set of essential components, and not the order of the input of the essential components, the LNVEP is determined, as described above, and the LNVEP system identifies to the user the grammar error, autocorrects the error, and continues with the workflow.

Figure 13E:
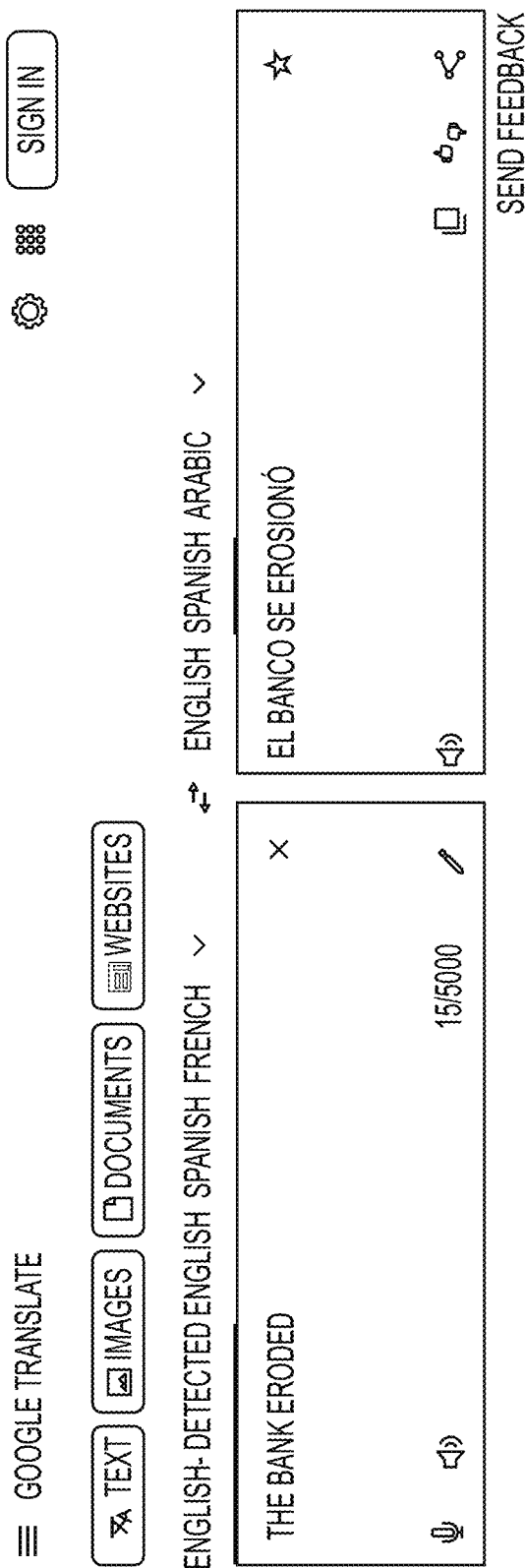

If an LNVEP Initial is determined, the workflow 200B repeats the above LNVEP determination process, using the verb action of the LNVEP Initial as the control. Since inaccurate inputs will yield subpar results on language-based tasks, the LNVEP system checks the verb and the essential components for inaccuracies. As described earlier, a verb expression is the combination of a specific verb or verb set phrase with specific words (wherein the specific word is within a specific data organization category), in a specific order, that creates a universally understood combination of words. For example, while there are many verbs to express "start" ("begin", "turn on," "proceed," etc), the choice of verb is dependent on the surrounding words. For example, "[I] [begin] to [talk]" is correct while "The [race] [turns on] at the [starting line]" is incorrect. Or, for example, while nouns may have more than one meaning, the noun can only have one meaning depending on the association with the verb action. Therefore, words with more than one meaning are disambiguated at this step in the LNVEP system. For example, in the sequence "The bank eroded," the word "bank" has two of the same global labels of "noun concrete singular" where "bank" may carry the meaning of a "the ground adjacent to a river" or a "financial institution." Based on the identified verb of "erode" and the essential component of "bank", the LNVEP of [dirt] [erode] is determined. By comparing the data organization categories of both meanings of "bank" with the essential component data organization category of [dirt], there is only one meaning of "bank" that also contains the data organization category of "dirt" ("bank" meaning "river bank"). Therefore, for the language-based task of translation to Spanish, the majority language "The bank eroded" where "bank" is a "riverbank" is converted to the target language as "La orrilla de río se erosion." FIG. 13E illustrates existing technologies translate "the bank eroded" into Spanish as "el banco se erosionó" which reflects the semantic understanding of "bank" as a "financial institution" for a literal translation of "the bank (financial institution) eroded."

To autocorrect verb inaccuracies, the LNVEP Module continues with the application of function DetermineLNVEPVerbAction which begins by accepting the LNVEP Initial and, by the one or more processing devices 114 (e.g., servers) accessing relational database Data Store 2, identifies the verb action associated with the LNVEP Initial. The function then calls the functions, as previously explained, IdentifyPossibleLNVEP IdentifyPossibleLNVEPEssentialComponentDataOrgCategories, DetermineMostSpecificEssentialComponentDataOrgCategory and CreatePermutationsLNVEP, and then calls function DetermineLNVEP Verb Action which accepts the array of permutations and the set of matched essential component data organization categories and then, for each array of permutations, the function loops through the set of matched essential component data organization categories to find the correct combination of essential component data organization categories that create a unique match. The correct combination is the LNVEP Verb Action.

The LNVEP Module continues with the application of function Check VerbUsage which accepts the LNVEP Initial and the LNVEP Verb Action and then compares the equivalency of infinitives and/or infinitive verb set phrases. If the infinitives and/or infinitive verb set phrases of the LNVEP Initial and LNVEP Verb Action are not the same, then the verb action requires a more specific infinitive and/or infinitive verb set phrase, for the set of essential components.

This repetition of the LNVEP determination process using the verb action identifies if the verb of input 118 is an accurate reflection of the majority language usage of the verb. For example, for the task of translation to English, the input of a Spanish text sequence "Yo comienzo el coche" contains the verb action "start" with essential component data organization categories of [person] and [transportation motor] for a LNVEP Initial of [person] [start] [transportation motor]. However, the LNVEP Verb Action identifies an improved infinitive of "arrancar," which reflects the majority language usage of the verb expression where "start" refers to an engine. Therefore, the LNVEP system 160 automatically overrides the infinitive to the infinitive within the LNVEP Verb Action. The LNVEP system identifies the inaccuracy to the user and, if requested, explains the mandatory usage of the improved verb.

If the LNVEP Verb Action contains more than one equivalent LNVEP that conveys the same verb expression, then the LNVEP Module identifies there are one or more infinitives or infinitive verb set phrases that may be used within the LNVEP whereby each infinitive or infinitive verb set phrase option conveys a nuanced meaning. For example, while the infinitive "comer" is used in the LNVEP of [person] [eat] [food] where the [food] is "lunch", fluent users of Spanish typically use a specific infinitive for the verb action "to eat for lunch" ("almorzar"). FIG. 12B illustrates an output display of the identification of and options to change the verb based on user intention. In this example, the LNVEP of [person 1] [love] [person 2], the user input the verb "quiero" which is confined to informal usage and is a casual expression of love. The LNVEP system identifies the other infinitives that also utilize the LNVEP of [person 1] [love] [person 2] and displays these options as well as an explanation for the nuances of use.

To resolve ambiguity of an essential component with more than one meaning and the word is not a verb in the third person, the LNVEP Module continues with the application of function CheckEssentialComponentUsage which accepts the final set of essential components and the array of final global labels and then determines if the final global label of a token of an essential component has two of the same global labels. If the essential component has one global label, then the function returns the essential component. If the essential component has more than one global label, then the function has identified that the essential component has more than one meaning and then calls the function DisambiguateEssentialComponent which accepts the essential component and then, by the one or more processing devices 114 (e.g., servers) accessing relational database Data Store 1, identifies the data organization categories associated with each global label. The function continues by determining which instance of word contains the data organization category of the essential component data organization category of the LNVEP Verb Action. If there is one match, the word is disambiguated.

If the data organization categories of each global label match the essential component data organization category of the LNVEP Verb Action, then the word is ambiguous and user clarification is requested, as described below. These instances are rare outliers as the association of a word with its data organization categories defines its usage within LNVEP. For example, in some languages, there is fine distinction between the translation of "abandonment" and "desertion."

To resolve ambiguity of the set of essential components for an infinitive that associates with an input of an inflected verb in the third person, if the majority language is not one that requires a stated subject, the LNVEP Module continues with the function Disambiguate ThirdPerson Verb which accepts the third person inflected verb, the set of essential component data organization categories possible for the verb action, and the data organization categories of the set of essential components and compares the data organization categories to determine the inclusion or exclusion of the pronoun subject within the final set of essential components.

If a match occurs, the pronoun subject belongs to the LNVEP as an essential component. For example, the sequence "come la manzana" contains an inflected verb in the third person singular with incorporated pronoun subjects of "he", "she", "you," or "it" where "it" can also be an animal or physical thing. Therefore, the LNVEP possibilities for the infinitive "comer" are analyzed to determine how "apple" associates with the LNVEP possibilities of [person] [eat] [food], [person] [eat], [animal] [eat] [food] and [animal] [food]. Since "apple" is a [food] (not a [person] or [animal]), the LNVEP Module determines the pronoun subject must be included in the final set of essential components for a correct understanding of the sequence as [person] [eat] [food] or [animal] [eat] [food]. (Note, while the LNVEP is correctly determined, user clarification is requested to clarify the [person] as "he", "she", or "you." This has the technical advantage of avoiding bias. Existing technologies default to "he" which may be misleading, biased, and/or incorrect.)

If more than one LNVEP matches, then user clarification is requested to disambiguate the subject of the third person verb. For example, such as "come el tigre," since "tiger" is a [food] or [animal], the LNVEP possibilities are [person] [eat] [food] ("He is eating the tiger" where the "tiger" can be a food or a food shaped as a tiger), [animal] [eat] [food] ("The lion is eating the tiger") and/or [animal] [eat] ("The tiger is eating"). Therefore, the use of the third person verb is ambiguous and user clarification is required to reflect user intentions, as discussed below.

To automatically resolve an inaccurate word choice error in the input 118 (in other words, if a match of an LNVEP Initial or LNVEP Verb Action is not found), the LNVEP Module continues with the application of function FindSimiliarWord which accepts the final set of essential components and, by the one or more processing devices 114 (e.g., servers) accessing relational database Data Store 1, identifies if a similarly spelled word resides in the correct essential component data organization category of the verb action. As previously discussed, the LNVEP is the combination of essential component data organization categories and an infinitive or infinitive verb set phrase in the order required by the LNVEP that creates a verb expression using the infinitive or infinitive verb set phrase. Therefore, changing the words outside of the specific data organization categories changes the verb expression and changing the words to new data organization categories but keeping the same verb also changes the verb expression.

For example, the sequence "She eats the roasted truck" contains the inappropriate essential component of [truck]. However, since the verb action "eat" must have the essential component data organization category [food], the similarly spelled word to [truck] is determined to be [duck]. The function then calls the RequestUserClarification function (as described below) to interface with the user to convey a message such as "the essential components do not associate with the identified infinitive. Please select the corrected option or write-in a correction." If the user is unable to respond, the LNVEP system automatically overrides the essential component with the corrected finding. This function has the technical advantage of ensuring the text or speech sequence contains the appropriate words to convey appropriate (universally understandable) meanings.

While not required for the determination of the LNVEP within the input 118, the LNVEP system then identifies, to the user, any inconsistencies in word choice, as pertains to country of use, formality of words, usage of words in written and spoken formats, tone, and gender, such that the LNVEP system correctly understands and, then later, explains, the grammar and usage. For example, inputs may include mixtures of formal and informal words, mixtures of words used within different countries, mixture of tone, etc. For example, the sequence "Sir, wait right there, ok?" contains an inconsistent formality sequence of "formal+informal command+ informal tag" whereby the user can choose whether to convert to a formal sequence ("Sir, if you do not mind, please wait here") or an informal sequence ("Dude, wait right there, ok?").

The LNVEP Module continues with the application of function CheckCountryFormalityToneAndGender which accepts the LNVEP Verb Action, final set of essential components and the final global label of each token and then, by the one or more processing devices 114 (e.g., servers) accessing relational database Data Store 1, identifies the set of equivalent options for country of use, formality of use and use within written or spoken formats, tone, and/or gender usage. If inconsistencies are identified or if possible inconsistencies may exist whereby equivalent words can be used in more than one country or to in more than one format, the function then interfaces with the user to identify the inconsistencies and offer equivalent words that may be used in different countries, formality usage, and/or formats.

For the above instances when user clarification is required or requested, LNVEP Module continues with the application of function RequestUserClarification which interfaces with the user to identify to the user that clarification is either required or requested. Clarifying information for a verb indicative or subjunctive is, but not limited to, a choice of a nuanced choice of verb or verb set phrase that reflects the country of use, tone, formality, written or spoken formats, and underlying information implicitly expressed in the verb usage. Clarifying information for a verb copulative is, but not limited to, a choice of verb copulative dependent on nuance of meaning. Clarifying information for essential components is, but not limited to, country of usage, formality, written or spoken formats, tone, and/or a choice of corrections for incorrect or ambiguous inputs. Clarifying information for essential components of third person pronouns include but not limited to, country of usage, formality, written or spoken formats, tone, gender of a person or animal, and/or number of person or animal. The function displays options for clarification (with associated explanations) such that the user can choose an option or write-in a different option. FIG. 12B illustrates an output screen displaying the identification of and options for resolution of issues that arise regarding construction inconsistencies, ambiguities, grammatical construction and/or analysis. In this example, as described above, the LNVEP system identified and displayed options to clarify the verb usage depending on formality and degree of verb action as well as identified and displayed options to clarify the formality and gender of relationship between the speaker and the person with whom the speaker is directly communicating and the country of use. For example, the pronoun object (direct) of "the" is an informal pronoun reserved for when the speaker and the person to whom the speaker is directly communicating are familiar with each other, or are approximately the same age or have no reason to bestow a level of respect. The LNVEP system identifies the options of "la" if the speaker and the female person are not familiar with each other or are not approximately the same age or have some reason to bestow a level of respect or "lo" if the speaker and the male person are not familiar with each other or are not approximately the same age or have some reason to bestow a level of respect. The user selects the applicable option or writes in an override.

The LNVEP Module continues with the application of function ReceiveUserClarification which accepts the user clarification option.

The LNVEP Module continues with the application of function OverrideBasedOnUserClarification which accepts the user clarification and then overrides the original token which updates the essential component, phrase pattern, and EC Matrix. The result is the override set of essential components. The overrides clarify any inaccuracy, inconsistencies, or ambiguity within the user input 118 such the LNVEP system correctly understanding the user intention.

The LNVEP Module continues by using the override set of essential components and then calling the functions, as previously explained, IdentifyPossibleLNVEP IdentifyPossibleLNVEPEssentialComponentDataOrgCategories, DetermineMostSpecificEssentialComponentDataOrgCategory and CreatePermutationsLNVEP, and then calls DetermineLNVEPOverride which accepts the array of permutations and the set of matched essential component data organization categories and then, for each array of permutations, the function loops through the set of matched essential component data organization categories to find the correct combination of essential component data organization categories that create a unique match. The correct combination is the LNVEP Override.

This is the conclusion of the LNVEP Determination Process.

The LNVEP Module continues by repeating the LNVEP Determination Process for each infinitive or infinitive verb set phrase within the final set of infinitives of the final array, but reducing the set of essential components on the EC Matrix such that the essential components associated with the previously identified LNVEP are removed from the set of essential components available for successive LNVEP determination. As previously identified, if the essential component of the previous LNVEP is [infinitive] or [infinitive pronom], the infinitive or infinitive pronoun is the infinitive for determination of the LNVEP.

For each determined LNVEP, the set is labelled by successive numbers (LNVEP 2, LNVEP 3, LNVEP n).

If the query is the numeric representations of the input, the workflow 200B skips to the Construction Layer to generate an output of the numeric representations.

The LNVEP Module ends with returning the result of the set of LNVEP. Therefore, since the deconstruction layer deconstructs input 118 to the one or more verbs and its phrase patterns, the LNVEP system 160 has the technical advantage of understanding text or speech sequence of any length. For a long input 118 containing more than one verb, the input 118 is deconstructed to a series of LNVEP, reducing complexity and memory usage. In contrast, as the text or speech sequences become longer, the existing technologies are challenged with long text or speech sequences.

Reconstruction Layer

Architecture 300 includes Reconstruction Layer 600. The Reconstruction Layer 600 reconstructs the verb or verb set phrase and its phrase patterns into a new transformed sequence representing the grammatically correct construction of the LNVEP. Therefore, the Reconstruction Layer autocorrects any errors or omissions (in word order, gender and number agreement, and grammatical construction) within the input 118, ensuring correct understanding of the input 118 such that the Construction Layer can correctly perform the query of a language-based task. FIG. 12D illustrates an output display of the reconstruction of an input to a LNVEP Model, based on the identified verb type and its associated LNVEP Model, such that the reconstruction and the LNVEP provide the semantic and syntactic information required for a complete understanding of the input 118.

Ambiguity Resolution Module within the Reconstruction Layer

The Ambiguity Resolution Module determines how extraneous phrase patterns that provide additional, but not required, information not used within the determination of the LNVEP associate with either the LNVEP or an essential component within the LNVEP.

The workflow 200B continues with the Ambiguity Resolution Module which begins with the application of function RetrieveExtraneousPhrasePatterns which retrieves the set of extraneous phrase patterns from the set of phrase patterns.

The Ambiguity Resolution Module continues with the application of function IdentifyExtraneousPhrasePatternType which accepts the set of extraneous information phrase patterns and, by the one or more processing services 114 (e.g., servers) accessing relational database 3, identifies the type of extraneous phrase pattern. As an example, and not by way of limitation, the type may be such things, but not limited to, as "prepositional phrase," "adverbial phrase," or "adjectival phrase."

The Ambiguity Resolution Module continues with the application of function RetrievePrepositionalPhrase which retrieves the set of prepositional phrases from the set of extraneous phrase pattern types.

For each prepositional phrase within the set of prepositional phrases, the Ambiguity Resolution Module continues with the application of function IdentifyPreposition which accepts the prepositional phrase and then, by the one or more processing services 114 (e.g., servers) accessing relational database 3, identifies the preposition which heads the phrase pattern.

For each prepositional phrase within the set of prepositional phrases, the Ambiguity Resolution Module continues with the application of function IdentifyPrepositionType which accepts the identified preposition and then, by the one or more processing services 114 (e.g., servers) accessing relational database 1, identifies the preposition type. As an example, and not by way of limitation, the preposition type of preposition of the language neutral word "until" is "preposition time."

For each LNVEP within the set of LNVEP, the Ambiguity Resolution Module continues with the application of function DetermineWhetherLNVEPAllowsPrepositionType which accepts the LNVEP and the preposition type and then, by the one or more processing services 114 (e.g., servers) accessing relational database 2, determines if the preposition type is allowable by the LNVEP. As an example, and not by way of limitation, the LNVEP of [person] [see] [physical thing] allows the preposition type "preposition with" ("I see stars with a telescope.") but not the preposition type "preposition phrase reflexive" ("I see stars with myself.")

If the LNVEP allows the preposition, the LNVEP may be the referent but the LNVEP must also allow the data organization category of the essential component. To verify the association, for each prepositional phrase within the set of prepositional phrases, the Ambiguity Resolution Module continues with the application of function IdentifyPositionOfComponent which accepts the prepositional phrase, and then, by the one or more processing services 114 (e.g., servers) accessing relational database 3, determines the position of the extraneous component within the prepositional phrase. The Ambiguity Resolution Module then continues with the application of function IdentifyComponents WithinFinalArray which accepts the position of the extraneous component, the prepositional phrase and the final array and then, determines the extraneous component within the final array. The Ambiguity Resolution Module continues with the application of function IdentifyExtraneousComponentDataOrgCategories which accepts the extraneous component and then, by the one or more processing services 114 (e.g., servers) accessing relational database 1, identifies the one or more component data organization categories which associate with the extraneous component. The result is the set of extraneous component data organization categories for the extraneous component of the prepositional phrase.

The Ambiguity Resolution Module continues with the application of function DetermineWhetherLNVEPAllowsExtraneousComponentDataOrgCategories which accepts the LNVEP, the allowable preposition type and the set of extraneous component data organization categories for the extraneous component of the prepositional phrase and then, by the one or more processing services 114 (e.g., servers) accessing relational database 2, determines whether the extraneous component data organization categories associate with the allowable preposition type when the preposition is used with the LNVEP. If there is no match, the function returns 0 (the prepositional phrase does not associate with the LNVEP). If there is a match, the prepositional phrase is an adverbial phrase that modifies the action of the LNVEP and, therefore, refers to the verb within the LNVEP. (For example, the sequence "I purchased the apple with my credit card" contains the LNVEP of [person] [purchase] [physical thing] and the prepositional phrase "with my credit card" where the preposition type is "preposition with" and the extraneous component is [credit card] which associates with a data organization category of [money]. The LNVEP of [person] [purchase] [physical thing] associates with "preposition with" when the data organization category is [money] and, therefore, the prepositional phrase is an adverbial phrase which gives more information about the manner of the verb action. If the query is an identification of a referent with the input 118, the workflow 200B skips to the Construction Layer to generate a message.

If the LNVEP does not allow the preposition type, the LNVEP is not the referent of the prepositional phrase. The referent is, therefore, one of the essential components and the Ambiguity Resolution Module continues to determine which essential component is the referent. For each essential component in the final set of essential components associated with the LNVEP, the Ambiguity Resolution Module continues with the application of function DetermineWhetherEssentialComponentAllowsPrepositionType which accepts the essential component, the allowable preposition type and the set of extraneous component data organization categories for the extraneous component of the prepositional phrase and then, by the one or more processing services 114 (e.g., servers) accessing relational database 1, determines whether the extraneous component data organization categories associate with the allowable preposition type when the preposition is used with the essential component. If the essential component does not allow the preposition type, the essential component is not the referent of the prepositional phrase.

If one or more essential components allow the preposition, to determine the essential component referent, for each essential component in the set of essential components associated with the LNVEP, the Ambiguity Resolution Module continues with the application of function DetermineWhetherEssentialComponentAllowsComponentDataOrgCategories which accepts the essential component, the allowable preposition type and the set of extraneous component data organization categories for the extraneous component of the prepositional phrase and then, by the one or more processing services 114 (e.g., servers) accessing relational database 1, determines whether the extraneous component data organization categories associate with the preposition type when the preposition is used with the essential component. For example, the sequence "I purchased the apple with the stem" contains the LNVEP of [person] [purchase] [physical thing] and the prepositional phrase "with the stem" where the preposition type is "preposition with" and the extraneous component is [stem] which associates with a data organization category of [plant part]. The LNVEP of [person] [purchase] [physical thing] does associates with "preposition with" but not when the data organization category is [plant part]. The essential component [apple] does associates with "preposition with" when the data organization category is [plant part] and, therefore, the prepositional phrase is an adjectival phrase which gives more information about the essential component. If the query is an identification of a referent with the input 118, the workflow 200B skips to the Construction Layer to generate a message.

If there is no match, the function returns 0 (the prepositional phrase does not associate with the essential component). The function repeats for each essential component in associated with the LNVEP. If the preposition type and the extraneous component data organization categories are allowable by the essential component, the essential component is the referent of the prepositional phrase. If the query is an identification of a referent with the input 118, the workflow 200B skips to the Construction Layer to generate a message.

The functions to determine the prepositional phrase referent repeats for each LNVEP within the set of LNVEP and set of essential components associated with the LNVEP.

If the prepositional phrase is determined to refer to both the LNVEP and at least one of the essential components associated with the LNVEP, the referent of the prepositional phrase is ambiguous. The Ambiguity Resolution Module then continues with the application of functions, as previously described, RequestUserClarification, ReceiveUserClarification, and OverrideBasedOnUserClarification to explain the how and why the referent is either the LNVEP or one of the essential components. If the user is unable to respond, the LNVEP system displays the multiple options with clarifying explanations.

The functions to determine the prepositional phrase referent repeats for each prepositional phrase in the set of prepositional phrases.

When the input 118 is determined to contain more than one LNVEP and an extraneous information phrase pattern contains one or more adverbial phrase, the Ambiguity Resolution Module continues with the application of function IdentifyAdverbialPhrases which retrieves the one or more adverbial phrases from the set of types of extraneous information phrase patterns.

For each adverbial phrase, the Ambiguity Resolution Module continues with the application of function Identify AdverbType which accepts the adverb and then, by the one or more processing services 114 (e.g., servers) accessing relational database 1, identifies the adverb type.

For each LNVEP in the set of LNVEP, the Ambiguity Resolution Module ends with the application of function DetermineWhetherLNVEPAllowsAdverbType which accepts the adverb and the adverb type and then, by the one or more processing services 114 (e.g., servers) accessing relational database 2, determines if the adverb type is allowable by the LNVEP. If there is no match, the adverb does not associate with the LNVEP and the function repeats for the each LNVEP until the correct LNVP referent is determined. For example, the sequence "I want to eat the apples quickly" contains two LNVEP ([person] [want] [infinitive] and [person] [eat] [food]) with an adverb of [quickly] where the LNVEP system 160 determines the adverb type is "adverb speed" and the only LNVEP that can associate with adverb speed is [person] [eat] [food]. If the query is an identification of a referent with the input 118, the workflow 200B skips to the Construction Layer to generate a message.

Reconstruct Phrase Pattern Module within the Reconstruction Layer

The Reconstruct Phrase Pattern Module reconstructs the LNVEP phrase patterns and extraneous information phrase patterns into grammatically correct constructions that incorporate the identified overrides and prepositional phrases that refer to essential components (whereby the prepositional phrase are then adjectival phrases that modify the essential component). This reconstruction of phrase patterns ensures agreement for gender and number within phrase patterns as well as ensures grammatically correct word orders within the phrase pattern, thereby further correcting any errors or omissions in the input 118.

The workflow 200B continues with the Reconstruct Phrase Pattern Module which begins with the application of function CreatePhrasePatternMatrix which creates a matrix. Herein, the Phrase Pattern Matrix will be referred to as the "PP Matrix."

The Reconstruct Phrase Pattern Module continues with the application of function BuildPPMatrix which builds the PP Matrix by defining the first column as all possible global labels.

The Reconstruct Phrase Pattern Module continues with the application of function RetrievePhrasePatterns which retrieves the complete set of phrase patterns.

To build the second column of the PP Matrix, for each identified phrase pattern, the BuildPPMatrix function calls function IdentifyComponentWithinFinalArray to identify the set of components within the set of phrase patterns.

The function FillInPPMatrix then calls function OverrideEssentialComponent to accept overrides of the component based on the user identified clarifying information and the LNVEP system identified overrides. If no override is returned, the component remains unchanged. If an override is return, the component is replaced with the override.

To build the third column of the PP Matrix, for each identified phrase pattern, for each component, the BuildPPMatrix function calls function FillInPhrasePatterns which accepts the identified phrase patterns and the final array and returns each token of the final array to the corresponding global label of the phrase pattern. If the LNVEP system identified any prepositional phrases as adjectival phrases describing an essential component, the function overrides the phrase pattern to include the adjectival phrase. For example, for the above example of "I purchased the apple with the stem," the prepositional phrase "with the stem" is identified to associate with the essential component "apple," and, therefore, the function places, within the phrase pattern "the apple", "with" next to the corresponding global label "preposition", "the" next to the corresponding global label "article definite" and "stem" next to the corresponding global label "noun concrete singular 2."

Depending on the majority language, the essential or extraneous component is the basis for the agreement of gender and number of any modifiers. Therefore, any modifiers in the input 118 are discarding and replaced with the correction based on the component, thereby correcting any errors in the input 118. For example, the sequence "el mesa" autocorrects to "la mesa" such that the masculine modifier "el" changes to the feminine modifier "la" in order to agree with the feminine gender of the component "mesa." Or, the sequence "four ladder" autocorrects to "four ladders" such that the plural number of the component agrees with the plural number "four." Therefore, to reconstruct the phrase pattern whereby the words within the phrase patterns are in the grammatically correct form, for each component, the function FillInPhrasePatterns calls function IdentifyGender which accepts the component and, by the one or more processing services 114 (e.g., servers) accessing relational database 1, identifies the gender of the component and the calls function IdentifyNumber which accepts the component and, by the one or more processing services 114 (e.g., servers) accessing relational database 1, identifies the number of the component. The function FillInPhrasePatterns then calls function ReconstructWordForm which accepts the component, gender, and number and then, by the one or more processing services 114 (e.g., servers) accessing relational database 1, identifies required form of each word in the phrase pattern.

The function FillInPhrasePatterns ends with the application of function ReconstructPhrasePatterns which accepts the required form of each word and the set of autocorrected phrase patterns and then, for each autocorrected phrase pattern, substitutes the field of the autocorrected phrase pattern with the required form of each word. The result is the set of reconstructed phrase patterns. Each reconstructed phrase pattern is placed in the third column of next to its associated component whereby the phrase pattern is combined into one token.

Note that the Phrase Pattern Module previously autocorrected the word order of the phrase pattern to reflect the majority language, thereby autocorrecting for grammatically correct word order and inclusion of all required construction elements of the majority language. Therefore, all errors and omissions within the phrase patterns of the majority language are corrected. For example, for an input 118 that has a majority language of Spanish but a conversion of the English language tokens of "the apple red," the function autocorrects the phrase pattern of [article definite+adjective expected+noun concrete singular] to the majority language equivalent of [article definite+noun concrete singular+adjective describing].

Verb Type Module within the Reconstruction Layer

The workflow 200B continues with the Verb Type Module which begins with the application of function IdentifyVerbType which, for each LNVEP within the set of LNVEP, accepts the LNVEP and then, by the one or more processing devices 114 (e.g., servers) accessing relational database Data Store 2, identifies the verb type of each LNVEP within the set of LNVEP.

Each LNVEP has a verb type designation. Linguistic theory maintains the structure of a grammatically correct construction is governed by the "type of verb," with such types, but not limited to, as transitive, intransitive, or impersonal, whereby the "type of verb" generally identifies the required grammatical functions (for example, an English "transitive verb" requires the grammatical function of direct object). However, these traditional "type of verb" designations neither specify all of the required words and required elements nor the placement of those required words and required elements for a grammatically correct construction that is also universally understandable (not nonsense). Therefore, the LNVEP system improves the verb designation from "type of verb" to "verb type" whereby the verb type specifies all of the required words and required elements as well as the placement of those required words and required elements for a grammatically correct construction that is also universally understandable (not nonsense).

Moreover, the "type of verb" designation for a verb of one language may be different than another language, creating complicated movement between languages. Therefore, the LNVEP system designation of "verb type" enables the efficient movement between languages since the grammatical construction for each language is based on the identification of the verb type.

Majority Language Data Mapping Module within Reconstruction Layer

The workflow 200B continues with the Majority Language Data Mapping Module which begins with the application of function CreateInformationMatrix which creates a matrix of the information for the development of the LNVEP Models. The information matrix collects the information identified in the workflow 200B and uses that information to create additional information such that the input 118 is easily reconstructed into one or more data mappings, each representing a grammatically correct construction. In other words, the information contained in the information matrix replaces the data mapping fields of the LNVEP Models, resulting in a new, transformed sequence representing a grammatically correct construction of the input 118, based on the identified LNVEP, whereby the input is organized such that each field of the data mapping is represented in one token. For example, the input sequence "ti yo quiero" is transformed into a new sequence of "yo+the+quiero" where "yo" is token 1, "the" is token 2, and "quiero" is token 3 such that token 1 aligns with the data mapping of the LNVEP Model and information matrix as [ECC1 LNVEP 1], token 2 aligns with the data mapping of the LNVEP Model and information matrix as [ECC 2 LNVEP 2] and token 3 aligns with the data mapping of the LNVEP Model and information matrix as [verb LNVEP 1] for a data mapping for the LNVEP of "ECC 1 LNVEP 1+ECC 2 LNVEP 1+verb LNVEP 1."

The Majority Language Data Mapping Module continues with function BuildInformationMatrix which builds the information matrix. The first column is a defined list of global labels, verb labels, LNVEP essential components, prepositional phrases, and adverbs, punctuations, and other fields required by LNVEP Models, in an order of the successive LNVEP of the set of LNVEP.

The function BuildInformationMatrix continues by calling function IdentifyLNVEP which accepts the set of LNVEP and then labels the LNVEP by successive numbers (LNVEP 1, LNVEP 2, LNVEP 3, LNVEP [n]).

The function BuildInformationMatrix continues by accepting, for each LNVEP, the information within workflow 200B that corresponds to the information matrix column one, and then builds the second column. For example, the essential component of LNVEP 1 is placed in column two beside the field of column one labelled "ECC 1 LNVEP 1".

The function BuildInformationMatrix continues by accepting, for each LNVEP, the global label and the collected information, and then, by the one or more processing devices 114 (e.g., servers) accessing relational database Data Store 1, identifies the form of the component required by the global label and then builds the second column. For example, the essential component of EEC 1 LNVEP 1 is "yo," which has an associated global label form of "pronoun pronominal reflexive LNVEP 1" of "me." These additional forms may be required in the data mappings of LNVEP Models in the case of errors and/or omissions included within the text or speech sequence 118 as well as may be required within the other data mappings of LNVEP Models which may include global labels and construction elements not included in input 118.

The function BuildInformationMatrix continues by calling function IdentifyInflectedVerbForm to determine the correct inflected verb based on the LNVEP and the extraneous information. For each LNVEP, the function IdentifyInflectedVerbForm begins by calling function RetrieveInflectedVerb which retrieves the inflected verb associated with the LNVEP. The function IdentifyInflectedVerbForm continues by calling function IdentifyTense which accepts the initial inflected verb and, by the one or more processing devices 114 (e.g., servers) accessing relational database Data Store, 1 identifies the verb tense. If the input 118 contains an identified adverbial phrase, the function IdentifyTense continues by accepting the identified adverb that associates with the LNVEP and then, by the one or more processing devices 114 (e.g., servers) accessing relational database Data Store 1, identifies the required verb tense for the adverb. The function IdentifyTense continues by accepting the initial inflected verb tense and the required adverb tense and then overrides if the verb tense if the required verb adverb tense is different from the inflected verb tense. For example, the adverbial phrase "last night" requires the verb tense of "past tense completed."

The function IdentifyInflectedVerbForm continues by calling function IdentifyPersonAndNumber which accepts the inflected verb and, by the one or more processing devices 114 (e.g., servers) accessing relational database Data Store 1, identifies the verb person and number. The function IdentifyInflectedVerbForm continues by calling function IdentifyMood which accepts the inflected verb and, by the one or more processing devices 114 (e.g., servers) accessing relational database Data Store 1, identifies the verb mood. If the input 118 contains extraneous information, the function IdentifyMood continues by accepting the identified extraneous information that associates with the LNVEP and then, by the one or more processing devices 114 (e.g., servers) accessing relational database Data Store 1, identifies the required verb mood for the extraneous information. The function IdentifyMood continues by accepting the initial inflected verb tense and the required verd mood and then overrides if the verb mood if the required verb mood of the extraneous information is different from the inflected verb mood. For example, the conjunction subjunctive "perhaps" requires the verb mood of "mood subjunctive." The function IdentifyInflectedVerbForm ends by accepting the collected information, and, by the one or more processing devices 114 (e.g., servers) accessing relational database Data Store 1, identifies the corrected form of the inflected verb. The function IdentifyInflectedVerbForm repeats for each LNVEP in the set of LNVEP.

The function BuildInformation Matrix continues by calling function RetrieveAdverbType which, for each LNVEP, retrieves the adverb type, if any, associated with the LNVEP. If a prepositional phrase has been determined to be the referent of the LNVEP as an adverbial phrase, the prepositional phrase type is retrieved.

The function BuildInformationMatrix continues with the application of function DetermineLongSubject which, for each LNVEP, determines whether the EEC 1 is longer than EEC 2. If the EEC 1 is longer, EEC 1 is labelled as "long subject."

The function BuildInformationMatrix continues with the application of function DeterminesLongDirectObject which, for each LNVEP, determines whether the EEC 2 is longer than EEC1. If the EEC 2 is longer, EEC 2 is labelled as "long direct object."

The result is a complete Information Matrix for the majority language.

The Majority Language Data Mapping Module continues with the application of function IdentifyGenericModelForVerbType which, for each LNVEP within the set of LNVEP, accepts the verb type of the LNVEP and the determination of adverb type, long subject, and/or long direct object and then, by the one or more processing devices 114 (e.g., servers) accessing relational database Data Store 4, identifies the data mapping representing the Generic LNVEP Model that is specific to the verb type and the identified information. The data mapping of the Generic LNVEP Model specifically defines the grammatically correct sequence required by the verb type and the extraneous information, whereby the data mapping uses one token for each grammatical construction required by the verb type. For example, for an input 118 that has been deconstructed to determine the LNVEP which carries the verb type "verb transitive" and an identified extraneous phrase pattern of "adverb" with an adverb type of "adverb time," the Generic Base LNVEP Model is "ECC 1 LNVEP 1+verb LNVEP 1+ECC 2 LNVEP 1+adverb time LNVEP 1" which is mapped as follows:

| ECC 1 LNVEP 1 | Verb LNVEP 1 | ECC 2 LNVEP 1 | Adverb time LNVEP 1 |
|---|---|---|---|
| Token 1 | Token 2 | Token 3 | Token 4 |

In other words, a Generic LNVEP Model is the convergence of formal rules of grammatically correct constructions of how each verb type associates with extraneous information where the underling formal grammar rules of placement are incorporated within the data mapping of the Generic LNVEP Model, whereby the required sequences are predefined in Data Store 4. For example, according to formal grammar rules, an adverb of time must be placed at the end of the sentence as a base use of the adverb of time (no emphasis on the time or stylistic use of time) and the adverb of time is placed in the token 4 data mapping field. In other words, through the identification of the verb type of the LNVEP and the presence of extraneous information, the correct data mapping pertaining to the specific input is retrieved and, given each phrase pattern is one token within the information matrix, the information matrix is then utilized to efficiently reconstruct the input into the new transformed sequence:

| ECC 1 LNVEP 1 | Verb LNVEP 1 | ECC 2 LNVEP 1 | Adverb time LNVEP 1 |
|---|---|---|---|
| Token 1 The happy girl | Token 2 eats | Token 3 the rest of the cake | Token 4 at midnight |

Moreover, if an input 118 contains an omission in the required grammatical construction within a majority language for the verb type and extraneous information, the data mapping for Generic LNVEP Model uses the information matrix to include the omission, thereby autocorrecting for the omission. For example, the Spanish sequence of "yo quiero mi perro" contains the LNVEP of [person] [love] [animal] with the phrase pattern [adjective possessive short form+noun concrete singular] that uses the global label "adjective possessive short form" to specify a specific animal. Therefore, the sequence is grammatically incorrect and is automatically corrected, based on the data mapping, to "yo quiero a mi perro" (with the addition of "a" to nuance the meaning that the [animal] is a pet which the [person] has an emotional attachment [loves].

Likewise, if an input 118 contains an error in grammatical construction within a majority language, the data mapping for Generic LNVEP Model and the information matrix will autocorrect for the error. For example, the Spanish sequence of "yo quiero a un perro" contains the LNVEP of [person] [want] [animal] with the phrase pattern [article indefinite+noun concrete singular] that uses the global label "article indefinite" to indicate a not specific (vague) animal. Therefore, the sequence is grammatically incorrect and is automatically corrected to "yo quiero un perro" (where the omission of "a" indicates not only is no emotional attachment to the [animal] but also the verb action is [want]).

The function IdentifyGenericModelForVerbType repeats for each LNVEP within the set of LNVEP. The result is a successive set of Generic Base LNVEP Models.

The Majority Language Data Mapping Module continues with the application of function RetrieveConjunction which retrieves, from the Information Matrix, the one or more conjunctions, if any.

The Majority Language Data Mapping Module ends with the application of function StackGenericLNVEPModels which accepts the set of Generic Base LNVEP Models and the identified conjunctions, and then stacks the Generic Base LNVEP Models incorporating the identified conjunctions, if any. The result is the Generic LNVEP Base Model. For example, for an input 118 that has two LNVEP that both the verb type "transitive verb" and an identified extraneous phrase pattern of "adverb" with an adverb type of "adverb time," the stacked Generic Base LNVEP Model is "EEC 1 LNVEP 1+verb LNVEP 1+EEC 2 LNVEP 1+adverb time LNVEP 1+conjunction+EEC 1 LNVEP 2+verb LNVEP 2+EEC 2 LNVEP 2."

The verb type also determines whether additional data mappings are allowed whereby the additional data mappings express nuances of meaning of the Generic LNVEP Base Models. In other words, these multiple options express the basic meaning of the Generic LNVEP Base Model but also an additional layer of information. For example, one additional data mapping of the above example is "adverb time LNVEP 1+EEC 1 LNVEP 1+verb LNVEP 1+EEC 2 LNVEP 1+conjunction+EEC 1 LNVEP 2+verb LNVEP 2+EEC 2 LNVEP 2" where the adverb of time shifts to the head in order to emphasize the time. There are one or more LNVEP Variant Models for one verb type. These LNVEP Variant Models are the multiple options of the majority language that convey the base meaning with additional nuances of meaning.

The Majority Language Data Mapping Module continues by calling the functions IdentifyGenericModelForVerbType, RetrieveConjunction, and StackGenericLNVEPModels for all of the variants allowable by generic models of the verb types as defined in Data Store 4. If there are more than one allowable variant model, as defined in Data Store 4, the function repeats for each allowable variant model.

The result is a set of LNVEP Variant Models.

The set of LNVEP Base Model and LNVEP Variant Models is referred to as the LNVEP Models.

The Majority Language Data Mapping Module ends with the application of BuildLNVEPModelWith Words which accepts the set of LNVEP Models and the Information Matrix and then builds the LNVEP Models With Words. In other words, the LNVEP Models are the data mapping templates such that the identified information within the information matrix efficiently substitutes with the fields of the LNVEP Models With words to create LNVEP Models With Words Majority Language.

The result is a set of LNVEP Models With Words Majority Language whereby the input 118 relates to one of the LNVEP Models With Words Majority Language, either as an exact match or where all errors and omissions are corrected.

Construction Layer

Architecture 300 includes Construction Layer 700. The Construction Layer generates an output, based the information within Data Layer, Deconstruction Layer, Reconstruction Layer, and/or Construction Layer.

Well-Formed Sentence Detection Module within the Construction Layer

In response to a query to detect the grammatical correctness of the input 118 and/or correct the input 118, the Well-Formed Sentence Detection Module is called.

The Well-Formed Sentence Detection Module begins with the application of function Identify WellFormSentence which accepts the array of tokens of input 118 and the set of LNVEP Models With Words Majority Language and the compares the order of the words of the input 118 to the set of LNVEP Models With Words Majority Language to identify a matched LNVEP With Words Model Majority Language.

If a match is determined, the Well-Formed Sentence Detection Module ends with the application of the function DisplayToUser presents to the user a message such as "you entered a well-formed sentence."

If a match is not determined, the initial input 118 is grammatically incorrect, contains a verb or essential component that has been determined to require an override, contains an error or omission for a grammatically correct construction, and/or contains a word in an incorrect form. Therefore, the Well-Formed Sentence Detection Module continues with the application of function DetermineClosestInitialInputToLNVEPModels which accepts the array of tokens of input 118 and the set of LNVEP Models With Words Majority Language and then determines the closest matching sequence. The result is the closest match input majority language.

The Well-Formed Sentence Detection Module ends with the application of function DisplayToUser presents to the user a message such as "rammarg made corrections" and identifies to the user the closest matching LNVEP Model. FIG. 12C illustrates an output screen displaying the identification of whether the input is a well-formed sentence and the subsequent reconstruction. In this example, the input 118 is not a well-formed sentence.

Corrections Module in the Construction Layer

In response to a query to correct the input 118, the Corrections Module is called.

The Correction Module begins with the application of function IdentifyCorrections which accepts the closest match input majority language and the array of tokens of input 118 and then compares the sequence to identify the mismatched tokens.

The Correction Module ends with the application of function DisplayToUser which presents to the user a message such as "the corrections include [corrections]", whereby the corrections are displayed. FIG. 12C illustrates an output screen displaying the corrections and explanations for the corrections. In this example, the input 118 contains grammar errors related to the incorrect use of a similarly spelled word and incorrect word order of grammatical functions.

Target Language Data Mapping Module in the Construction Layer

In response to a query for a translation to a specified target language, the Target Language Data Mapping Module is called. The Target Language Data Mapping Module efficiently converts the data mapping of the new transformed sequence to an equivalent data mapping for the target language, through the use of the verb type, the LNVEP Models and phrase patterns contained in the repository, and the information matrix.

The Target Language Data Mapping Module begins with the application of function IdentifyLNVEPTargetLanguage which accepts the user specified target language and the set of LNVEP and then, for each LNVEP, by the one or more processing devices 114 (e.g., servers) accessing relational database Data Store 2, identifies the equivalent target language verb usage for the LNVEP. The result is the set of LNVEP Target Language. For example, the LNVEP [person] [interest in] [physical thing] requires the Spanish infinitive of [interesar] to replace [interest in].

The Target Language Data Mapping Module continues with the application of function RecreatePhrasePatternsTargetLanguage which accepts the phrase pattern matrix and then, for each phrase pattern, by the one or more processing devices 114 (e.g., servers) accessing relational database Data Store 1, recreates the equivalent target language phrase pattern in the target language. If the LNVEP system identified the referent of a prepositional phrase as one of the essential components and the preposition is the ambiguous "with" or "in", the meaning equivalent for the target language is identified by the one or more processing devices 114 (e.g., servers) accessing relational database Data Store 1, and the phrase pattern is recreated using the target language grammatically correct construction. For example, for the target language of Spanish, the equivalent of the preposition "with" is the global label sequence "relative pronoun+verb indicative "tener" in inflected form" ("the apple with the bruise" is the equivalent "la manzana que tiene la maca" for a literal translation of "the apple that has the bruise.")

The Target Language Data Mapping Module continues with the application of function RecreateInformationMatrixTargetLanguage accepts the information matrix and the majority language fields of the second column and, by the one or more processing devices 114 (e.g., servers) accessing relational database Data Store 1, identifies the target language equivalents and builds the third column of the information Matrix for the target language.

The Target Language Data Mapping Module continues with the application of function IdentifyGenericModelForVerbType which, for each LNVEP within the set of LNVEP, accepts the target language, verb type of the LNVEP and the determination of adverb type, long subject, and/or long direct object and then, by the one or more processing devices 114 (e.g., servers) accessing relational database Data Store 4, identifies the Generic LNVEP Model Target Language that is specific to the verb type and the identified information.

Indeed, it is the verb type associated with the LNVEP which enables the efficient method for generating the data mappings for the target language, thereby guaranteeing grammatically correct constructions. For example, the verb type associated with the LNVEP of [person 1] [bite] [person1] [nail] is "verb transitive verb reflexive body part" such that the vastly different grammatical construction of each language requires no computer programming of grammar rules, overrides, or other logic. The verb type simply identifies the data mapping of the target language such that the equivalent token on the information matrix is substituted for the field of the data mapping. For example,

| | | |
|---|---|---|
| LNVEP Model Spanish | [EEC 1 LNVEP 1] [pronoun pronominal reflexive subject LNVEP 1] [comer LNVEP 1] [definite article EEC 2 LNVEP 1] [EEC 2] | Yo me como las uñas |
| LNVEP Model English | [EEC 1 LNVEP 1] [bite LNVEP 1] [adjective possessive short form EEC 1 LNVEP 1] [EEC 2 LNVEP 1] | I bite my nails |

The function IdentifyGenericModelForVerbType repeats for each LNVEP within the set of LNVEP. The result is a successive set of Generic Base LNVEP Models Target Language.

The Target Language Data Mapping Module continues with the application of function RetrieveConjunction which retrieves, from the Information Matrix, the one or more conjunctions, if any.

The Target Language Data Mapping Module continues with the application of function StackGenericLNVEPModels which accepts the set of Generic Base LNVEP Models Target Language and the identified conjunctions, and then stacks the Generic Base LNVEP Models Target Language incorporating the identified conjunctions, if any. The result is the Generic LNVEP Base Model Target Language.

The Target Language Data Mapping Module continues by calling the functions IdentifyGenericModelForVerbType, RetrieveConjunction, and StackGenericLNVEPModels for all of the variants allowable by the verb types as defined in Data Store 4. If there are more than one allowable variant model, as defined in Data Store 4, the function repeats for each allowable variant model.

The result is a set of LNVEP Variant Models Target Language.

The set of LNVEP Base Model Target Language and LNVEP Variant Models Target Language is referred to as the LNVEP Models Target Language.

The Target Language Data Mapping Module continues with the application of BuildLNVEPModelWith Words which accepts the set of LNVEP Models Target Language and the Information Matrix and then builds the LNVEP Models With Words Target Language. In other words, the LNVEP Model Target Language is the template such that the identified information within the Information Matrix efficiently substitutes with the fields of the LNVEP Model With Words to create LNVEP Model With Words Target Language.

The result is a set of LNVEP Models With Words Target Language.

The Target Language Data Mapping Module continues with the application of function TranslateInput which accepts the matched or closest match LNVEP Model With Words Majority Language and the set of LNVEP Models Majority Language and then identifies the associated LNVEP Model with Words Target Language. This is the translation.

The Target Language Data Mapping Module continues with the application of function DisplayToUser which presents to the user the translation. FIG. 12E illustrates the translation of the input 118.

The Target Language Data Mapping Module ends with the application of function DisplayToUser presents to the user the additional LNVEP Models With Words that have the same translation. Indeed, since languages use word order to express nuances, there may be more than one LNVEP Model With Words that yields the same translation. These additional LNVEP Models With Words are referred to as "multiple options". FIG. 12E illustrates an output screen displaying a sample of the multiple options for expressing the majority language input that yield the same one translation to the target language. FIG. 12E also illustrates an output screen displaying the grammar explanation of the nuances of meaning, including word order usage, format of usage of each of the multiple options (formal or informal format and written or spoken) as well as which element, if any, is emphasized or the focus and other underlying information implied in the word order, the country of use, tone and whether the use is common or uncommon.

In other words, for one majority language input, there may be multiple options for translation to the target language that convey the base translation, but with nuances that are conveyed in the majority language use of vocal stress or written italics, as identified via the verb type. For example, for the majority language English sequence of "I am eating the apples," which contains a verb type of "verb transitive consumption," there are multiple options for translations to the target language of Spanish, whereby each translation conveys a nuance, depending on emphasis and focus and/or informal or formal structures.

|  | I ate the apples |
|---|---|
| Spanish Translation 1 | Yo comí las manzanas |
| Spanish Translation 2 | comí las manzanas |
| Spanish Translation 3 | comí las manzanas yo |
| Spanish Translation 4 | las manzanas yo las comí |
| Spanish Translation 5 | las manzanas las comí |

Moreover, the LNVEP system displays multiple options for translation whereby target languages, depending on the verb type, utilize grammatical markers to convey nuances of information. For example, the target language uses a grammatical marker for verb type of "verb transitive consumption" of a special type of pronoun (called a "pronominal pronoun") to nuance the meaning of "I ate the apples" to "I ate {all of} the apples:"

| Spanish Translation 6 | yo me comí las manzanas |
|---|---|
| Spanish Translation 7 | me comí las manzanas |
| Spanish Translation 8 | me comí las manzanas yo |
| Spanish Translation 9 | las manzanas yo me las comí |
| Spanish Translation 10 | las manzanas me las comí |

Therefore, through the use of the verb type and the data mappings, translation is the efficient conversion of the reconstructed input majority language into the target language equivalent, whereby the verb type uncovers the LNVEP Variant Models that associate with the LNVEP, for the majority language and the target language.

Figure 13F:
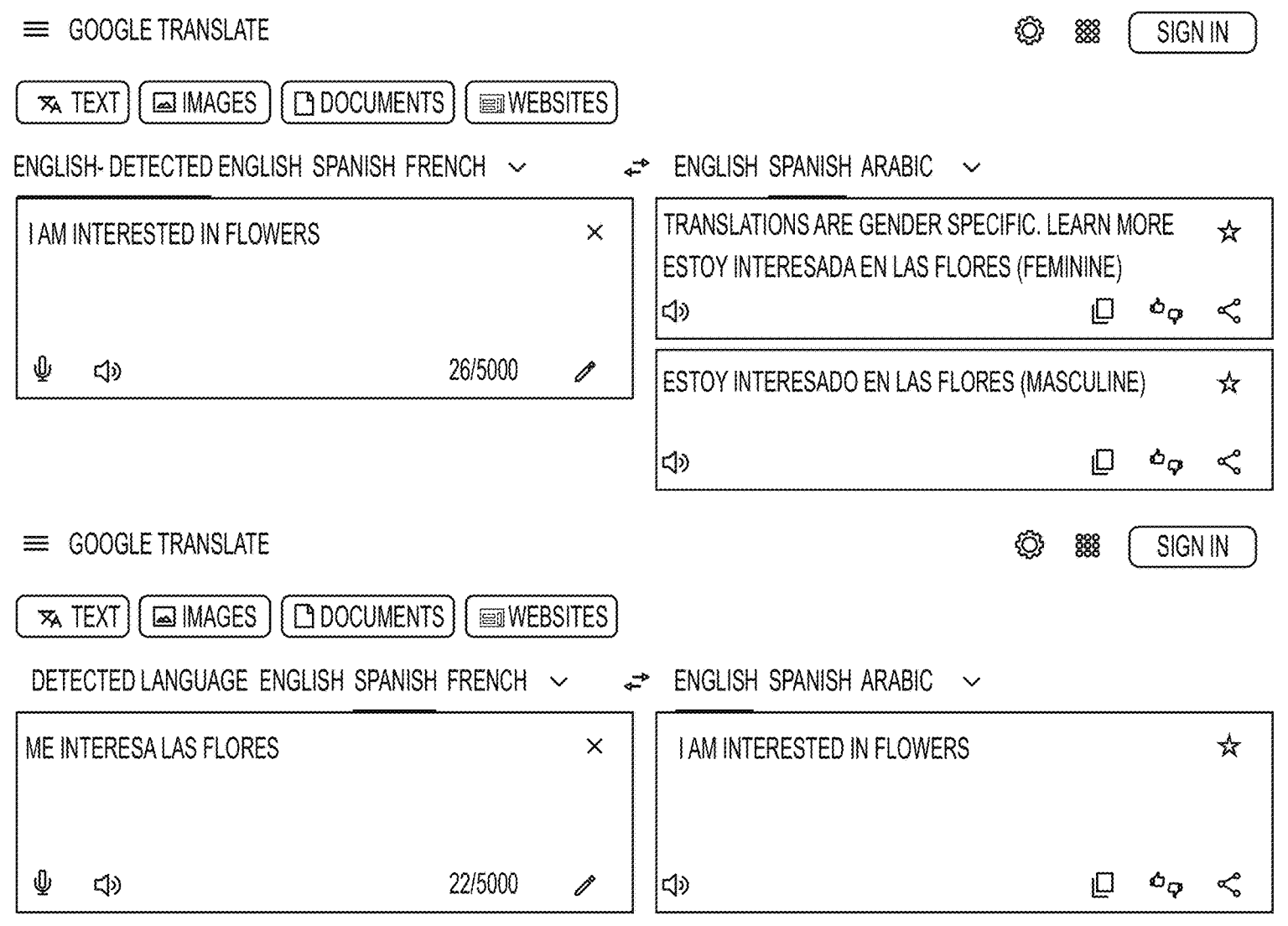

Moreover, the improvement to understanding an input via the deconstruction to determine the LNVEP and the associated verb type has the technical advantage of not defaulting to a word-by-word understanding of text or speech sequences. Specifically, the deconstruction layer reconfigured the identified language neutral word set phrases and infinitive verb set phrase into one token, driving the understanding of the input through the lens of the verb action. For example, in the sequence "I am interested in flowers," the initial reconfiguration identified the language neutral verb expression of "interest in" which enables the determination of the LNVEP of [person] [interest in] [physical thing]. Furthermore, the LNVEP verb type is identified as "transitive phrasal verb personal interest," creating the data mapping of the LNVEP Base Model Majority Language of [ECC 1] [verb transitive phrasal] [ECC 2] for a new transformed sequence of [I] [am interested in] [flowers]. The verb type has a direct equivalent to the data mapping of the LNVEP Base Model Target Language of [ECC 1] [EEC 3] [verb transitive phrasal] [article definite] [ECC 2] whereby the Information Matrix contains the corresponding words for the LNVEP Model with Words Target Language equivalent of "yo me interesa las flores." Therefore, the initial reconfiguration of the input into the new transformed sequence, including set phrases as one token and the subsequent grouping of grammatical constructions within the data mapping into one token enables the LNVEP system to have the technical advantage of not defaulting to a word-by-word understanding of text or speech sequences. FIG. 13F illustrates the existing technologies default to word-by-word translation.

Grammar Explanation Module within the Construction Layer

In response to a query to identify and explain the grammar rules for an input, correction, one or all of the LNVEP Models and phrase pattern constructions majority language, translation, and/or one or all of the LNVEP Model and phrase pattern constructions target language, the Grammar Explanation Module is called. A grammar explanation is a description, specific to the LNVEP Model of the Majority Language or Target Language, of the formal and informal grammar rules associated with the function, placement, and/or form of a word, phrase, or whole construction.

If the user selects information on the input, correction, LNVEP Model and phrase pattern constructions majority language, translation, and/or LNVEP Model and phrase pattern constructions target language, the Grammar Explanation Module begins with the application of function RetrieveGrammarExplanation which accepts the query of a general information request and then, (1) if the query is specific to a word, by the one or more processing devices 114 (e.g., servers) accessing relational database Data Store 1, retrieves the grammar explanation associated with user query, (2) if the query is specific to a LNVEP, by the one or more processing devices 114 (e.g., servers) accessing relational database Data Store 2, retrieves the grammar explanation associated with user query, (3) if the query is specific to a phrase pattern, by the one or more processing devices 114 (e.g., servers) accessing relational database Data Store 3, retrieves the grammar explanation associated with user query, and/or (4) if the query is specific to a LNVEP Model, by the one or more processing devices 114 (e.g., servers) accessing relational database Data Store 4, retrieves the grammar explanation associated with user query.

If the user specifies via write-in option a query on information on the input, correction, LNVEP Model and phrase pattern constructions majority language, translation, and/or LNVEP Model and phrase pattern constructions target language, the Grammar Explanation Module begins with the application of function SearchForGrammarExplanation which accepts the query of a specific information request and then, by using a search mechanism such as, not limited to, keyword search, retrieves only the specific portion of the grammar explanation, as identified above.

The Grammar Explanation Module ends with the application of function DisplayToUser which generates a display of the grammar explanations related to either the general or specific query. FIG. 12F illustrates an output screen displaying the capability provide an answer of the specific grammar explanation related to a specific question queried by a user.

FIG. 12G illustrates an output screen displaying the identification and explanation of all of the specific grammar rules associated with one of the LNVEP Models, as selected by the user. FIG. 12G further illustrate an output screen displaying the identification and explanation of all of the specific grammar rules associated with one of the phrase patterns within the LNVEP Model, as selected by the user. The grammar explanation includes an identification of the grammatical functions, an explanation, pertinent to the grammatical construction of the verb type of the rules of placement nuances and requirements, an explanation of the word order of the grammatical functions, and an explanation of the word and/or phrase pattern construction and form required within the construction.

The framework within the LNVEP system enables this technical advantage of identifying, explaining, and displaying the grammar explanations, for a specific input, down to the usage of a specific word within the specific input. In contrast, existing technologies default to a general answer that may or may not apply to the specific input. The LNVEP system achieves this technical advantage through the convergence of the determination of the LNVEP within the input, the association of the LNVEP with a verb type, and a maintenance of tokens throughout the LNVEP system. Indeed, not only is the input is reconfigured into one token for each identified word or set phrase, but also each phrase pattern is also grouped into one token. And, since the data mappings are also by token, the LNVEP Models With Words use the information matrix to efficient substitute the token of the LNVEP Model with the token on information matrix. Therefore, since Data Store 1 contains words with their global labels such that the global label usage for each language has predefined grammar explanations, Data Store 2 contains LNVEP with predefined grammar explanations for each language, Data Store 3 contains phrase patterns for each language with predefined grammar explanations for the global sequence as a whole and the individual fields within the global label sequence, and Data Store 4 contains LNVEP Models organized by verb type with the grammatically correct sequences required by each language with predefined grammar explanations for each field of the grammatically correct sequences, the rules of grammar for any piece of the workflow 200B are accessible, without using grammar logic rules or dependency parsing. Therefore, since the LNVEP system uses the convergence of patterns and repositories and does not use probability algorithms, the LNVEP system has the technical advantage of being full traceable (in other words, there is a continuously traceback to the input or the associated overrides). In contrast, the most current technology operates in a operate in a "black box" where decisions are neither traceable nor explainable.

As such, the LNVEP system differentiates grammar explanations based on the identified LNVEP within the input and its associated verb type. For example, the Spanish sequences "yo me como las manzanas" and "yo me como las uñas" have only one word that is different but, since the LNVEP within each sequence are different, the grammar explanation is also different. In fact, the same word ("me") within one LNVEP Model has a different grammatical use and meaning, depending on the LNVEP Model. For example, as described above, the Spanish sequence "Yo me como las manzanas" contains the LNVEP of [person] [eat] [food] where the LNVEP has an associated verb type of "verb transitive consumption" which allows a grammatical marker of a pronoun pronominal consumption ("me") which nuances the meaning of the verb action of "eat" as the total consumption of the food is unexpected and surprising, as well as indicates the format of use is confined to spoken and informal formats. In contrast, while the Spanish sequence "yo me como las uñas" also contains the word "me" in the same position before the same verb of "comer," the meaning of "me" is markedly different, based on the LNVEP and the associated (and different) verb type. In this case, the LNVEP is [person] [bite] [person] [nail] which has the verb type of "verb transitive reflexive body part" where "me" is a grammatical marker of a reflexive action which conveys the verb action of "comer" is done by and to the subject "yo" as well as the format of use is in all formats (informal or formal, written and spoken). This information is critical for a complete understanding of the text or speech sequence. (In contrast, FIG. 13G illustrates the existing technology applies the same meaning and grammatical function to both sequences.)

Explain Ambiguity Resolution Module within the Construction Layer

In response to a query to identify, resolve, or explain the referent of a word or grammatical function, the Explain Ambiguity Resolution Module is called.

In the case of a query of the referent of a prepositional phrase, if the preposition type and the extraneous component data organization categories are allowable by the essential component as identified in the Ambiguity Resolution Module, the Explain Ambiguity Resolution Model begins and ends with the application of function DisplayToUser which presents to the user a message such as "the [essential component] is the referent of [prepositional phrase] because the prepositional phrase conveys [data organization category match]."

If the preposition type and the extraneous component data organization categories are allowable by an essential component, as identified in the Ambiguity Resolution Module, the Explain Ambiguity Resolution Model begins and ends with the application of function DisplayToUser which presents to the user a message such as "the [essential component] is the referent of [prepositional phrase] because the prepositional phrase conveys [data organization category match]."

If the user is unable or does not respond to the function RequestUserClarification as required in the Ambiguity Resolution Module, the Explain Ambiguity Resolution Model initiates a repetition of the LNVEP system for each ambiguous identification. The Explain Ambiguity Resolution Model ends with the application of function DisplayToUser which presents to the user the two ambiguous options with explanations.

In response to a query of the referent of an adverb, as identified in the Ambiguity Resolution Module, the Explain Ambiguity Resolution Model begins and ends with the application of function DisplayToUser which presents to the user a message such as "the adverb is the referent of [LNVEP #] because the LNVEP allows [adverb type]."

In response to a query of the referent of a word, the Explain Ambiguity Resolution Model begins by calling the set of LNVEP Models. The Explain Ambiguity Resolution Model begins with the application of function Match Word WithDataMapping which accepts the word, the Information Matrix and the Data Mappings of the LNVEP Models and then retrieves the referent. For example, the referent of the word "ate" in the sequence "I ate the apple yesterday" is via the identification of the field of the LNVEP Model of "EEC 1 LNVEP 1+verb LNVEP 1+EEC 2 LNVEP 1+adverb time LNVEP 1." The Explain Ambiguity Resolution Model ends with the application of function DisplayToUser which presents to the user a message such as "the [word] is the referent of [LNVEP #] where [word] is the [essential component/ verb/global label] associating with [EEC/verb/component] with a form of [form]. In the above example, the function DisplayToUser presents to the user a message such as "the word [ate] is the referent of [LNVEP 1] where [ate] is the [verb in the indicative form] that associates with [EEC 1] with a form of [matches the number and gender of EEC 1 and the tense of the adverb of time that requires the past tense]."

In response to a query for the referent of a pronoun within a sequence of two or more LNVEP, the Explain Ambiguity Resolution Model begins with the application of function IdentifyPronounReferent which uses the same logic as described in the Ambiguity Resolution Module in order to determine the pronoun association with the LNVEP and its associated LNVEP Model. A pronoun is a word such as "she", "her", "it", "hers", "this", "that", "those", among others, that replaces a previously mentioned noun in order to not redundantly repeat the name of the noun. For example, in the sequence "The ball bounced in the hole because it was small," the pronoun is "it." The LNVEP system determines the verb action is "bounce into" for a determination of the LNVEP 1 of [physical thing] [bounce into] [place] and LNVEP 2 of [physical thing] [copulative] [size] (with an extraneous information phrase pattern of "conjunction subordinating" of the type of cause [because]). The pronoun referent is resolved, by the one or more processing devices 114 (e.g., servers) accessing relational database Data Store 1, identifying the preposition "into" has an associated logic sequence of data organization categories of "[physical thing] [into] [place]" as well as a logic sequence of "[small] [into] [large]." Therefore, the [physical thing] of [ball] goes into the [place] of [hole] which aligns with the [small] is [physical thing] and the [large] is [hole]. The function ends with the function DisplayToUser presents to the user a message such as "the pronoun refers to the ball which is smaller than the hole." FIG. 13H illustrates the performance of existing technology which determines "because of the hole's small size, the ball was able to bounce into the hole" (i.e., the referent of "it" is the "hole").

Numeric Representation Module Majority Language within the Construction Layer

In response to a query for the numeric representations of words within the input 118, the Numeric Representation Module Majority Language is called.

The Numeric Representation Module Majority Language function begins with the application of function GenerateNumericRepresentations which accepts the final array, the one or more LNVEP, the verb type and the information in the Information Matrix, and, by the one or more processing devices 114 (e.g., servers) accessing relational database Data Store 1, generates the numeric representation of the words of the final array, with identified overrides. The Numeric Representation Module Majority Language function ends with the application of function ReturnNumericRepresentations which returns the set of numeric representations to the user.

The numeric representation of words is a technique such that computer models (such as AI-powered Models) receive and use numbers (rather than words) as an input. The numeric representations generated by the LNVEP system convey the meaning and grammatical function of each word, as it associates with the LNVEP and LNVEP Models. For example, in the previously discussed example of "the bank eroded," the numeric representation of "bank" would reflect its use with the essential component data organization category of [dirt] such the meaning of "bank" can only be interpreted by the computer model as a "riverbank".

Furthermore, the LNVEP system for generating numeric representation has several technical advantages: 1) since LNVEP express both the frequent and nuanced uses of language, the LNVEP system for numeric representations capture the meaning of words, regardless of frequency of co-occurrence and/or formality of use, 2) since the LNVEP system is deterministic, the LNVEP system removes reliance on probability to understand the text or speech sequence, 3) the LNVEP system simplifies the training for recognized patterns (once the LNVEP are learned, there is no additional training on those LNVEP), thereby significantly reducing training (and fine-tuning) time and expense, and 4) the LNVEP system simplifies the initial understanding of the text or speech sequence. Moreover, since the LNVEP are based on language-neutral understandings with language equivalents, the LNVEP system is particularly advantageous for understanding languages that do not have sufficient quantities of training examples.

Training Module of Construction Layer

In response to a query to provide the training data for training a language learner AI-powered Model, the Training Module is called.

The Training Module begins with the application of function TeachLNVEP which accepts the verb action and then, by the one or more processing devices 114 (e.g., servers) accessing relational database Data Store 2, identifies the set of LNVEP and verb type that express the verb action. The Training Module ends with the application of function DisplayToUser which presents the information as a complete integration of the when, why, and how of sentence construction for each verb action, including the formal and informal constructions.

The LNVEP system identifies the vocabulary required within LNVEP (where words which associate with the essential component data organization categories replace the LNVEP essential components) and the associated LNVEP Models identify the patterns of construction, without having to learn (and then apply) complicated grammar rules. (However, since the LNVEP is fully explainable, the "but why" learner use LNVEP system 160 to investigate the underlying grammatical structure through the investigation of a specific sentence to understand the specific grammar rules, for that input.)

Definitions

"Existing technology" and/or "existing technologies" may herein refer to any one or more technologies that use one or more text or speech sequences as the input into a computer model.

"Infinitive" may herein be used to refer to the form of a verb that does not express subject pronoun, subject number, subject gender, action tense, action mood, action aspect, and/or other information.

"Infinitive Verb Set Phrase" may herein refer to an infinitive that combines with set following words such that the meaning and/or use of the infinitive alone is different from the infinitive in an infinitive verb set phrase. While the infinitive can be replaced by an inflected verb, the other words in the infinitive verb set phrase remain the same and form in order to convey the distinct meaning of the set phrase.

"Inflected verb" and/or "inflected verbs" may herein be used to refer to the form of the infinitive whereby the inflected form includes an inflected ending that expresses, depending on the language, the subject pronoun, subject number, subject gender, action tense, action mood, action aspect, and/or other information.

"Language-based task" and/or "language-based tasks" may herein refer to tasks performed on one or more text or speech sequences such as, but not limited to, well-formed sentence detection services, sentence autocorrection services, grammar and sentence ambiguity detection services, grammar and sentence ambiguity resolver services, cross-language pattern mapping services, translation, textual, audio, audible, and visual translation services, language-learning services, tutor services, dependency parsing, linguistics-learning services, and so forth.

"Majority Language" may herein refer to the highest occurring language of the text or speech sequence. While the LNVEP system is used for any language that uses verbs, since English and Spanish are the most common languages, to illustrate the LNVEP System, the presently disclosed embodiments will use English and Spanish as the example majority languages.

"Text or speech sequence," "text or speech sequences," "sequence" and/or "sequences" may herein be used to refer to any one or more text sequence or representation that can be converted to a text sequence, such as audio or speech sequence, visual language sequence (e.g., sign language), and/or visual representation, such as within displayed webpage, an e-book, an audiobook, an image, a video, a physical book, or other physical document or electronic file that includes one or more written or verbal languages or one or more visual images that can be interpreted into text.

"Target Language" may herein refer to the language that is identified by the user as the language for translation. While the LNVEP system is used for any language that uses verbs, since English and Spanish are the most common languages, to illustrate the LNVEP System, the presently disclosed embodiments will use English and Spanish as the example target languages.

"Verb" and/or "verbs" may herein be used to refer to a verb in the inflected form and/or infinitive form. An inflected verb is a verb with endings including, but not limited to, tense, aspect, mood, number, or person.

"Word" and/or "words" may herein refer to an individual word and/or words that combine into a set phrase. A set phrase is more than one word whereby the combined words produce a meaning that is different from the individual word meanings.

"Word Set Phrase" may herein refer to words that combine with or more additional word to create a word set phrase that carries a global label that is distinct from the words in the individual usage.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a user having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a user having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, by a computing system, comprising:
receiving, by the computing system, a first language sequence;
analyzing, by the computing system, and utilizing global labels, the first language sequence to identify one or more verbs;
analyzing, by the computing system, and utilizing phrase patterns, the first language sequence to identify essential components;
determining, by the computing system, a valid language neutral verb expression pattern (LNVEP) that associates with each of the identified one or more verbs and data organization categories associated with the identified essential components;
generating, by the computing system, based on the LNVEP, an output of a numeric representation of words within the first language sequence;
analyzing, by the computing system, and utilizing the phrase patterns, any remaining words within the first language sequence to identify extraneous components;
determining, by the computing system, and utilizing the LNVEP and data organization categories associated with the identified extraneous components, a valid relationship of extraneous components with the first language sequence; and
generating, by the computing system, an output of an identification and an explanation of correct referents of dependencies.

2. The method of claim 1, further comprising:
analyzing, by the computing system, and utilizing the phrase patterns, any remaining words within the first language sequence to identify extraneous components;
determining, by the computing system, and utilizing the LNVEP and data organization categories associated with the identified extraneous components, a valid relationship of extraneous components with the first language sequence; and
generating, by the computer system, an output of a resolution of ambiguities.

3. The method of claim 1, further comprising identifying, by the computing system, one or more of user inconsistencies, inaccuracies, or ambiguities within the first language sequence.

4. The method of claim 1, further comprising receiving, by the computing system, clarifying information from a user, the clarifying information being associated with inconsistencies, inaccuracies, or ambiguities of the first language sequence.

* * * * *